(12) United States Patent
Hinchey et al.

(10) Patent No.: US 7,992,134 B2
(45) Date of Patent: Aug. 2, 2011

(54) SYSTEMS, METHODS AND APPARATUS FOR MODELING, SPECIFYING AND DEPLOYING POLICIES IN AUTONOMOUS AND AUTONOMIC SYSTEMS USING AGENT-ORIENTED SOFTWARE ENGINEERING

(75) Inventors: Michael G. Hinchey, Bowie, MD (US); Joaquin Penn, Seville (ES); Roy Sterritt, Newtownabbey (GB)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1342 days.

(21) Appl. No.: 11/536,969

(22) Filed: Sep. 29, 2006

(65) Prior Publication Data
US 2007/0074182 A1 Mar. 29, 2007

Related U.S. Application Data

(63) Continuation-in-part of application No. 11/532,800, filed on Sep. 18, 2006, now Pat. No. 7,886,273, which is a continuation-in-part of application No. 11/461,669, filed on Aug. 1, 2006, which is a continuation-in-part of application No. 11/203,590, filed on Aug. 12, 2005, now Pat. No. 7,739,671, which is a continuation-in-part of application No. 10/533,376, filed on Apr. 29, 2005, now Pat. No. 7,484,688.

(60) Provisional application No. 60/789,627, filed on Mar. 28, 2006.

(51) Int. Cl.
*G06F 9/45* (2006.01)
(52) U.S. Cl. ...................................................... 717/126
(58) Field of Classification Search .................... 717/126
See application file for complete search history.

(56) References Cited

U.S. PATENT DOCUMENTS

| | | | | |
|---|---|---|---|---|
| 6,901,494 B2 * | 5/2005 | Zumkehr et al. | ............ | 711/167 |
| 7,406,683 B2 * | 7/2008 | Kalidindi et al. | ............ | 717/137 |
| 7,587,711 B2 * | 9/2009 | Fausak | ......................... | 717/139 |

* cited by examiner

*Primary Examiner* — John Chavis
(74) *Attorney, Agent, or Firm* — Heather Goo

(57) ABSTRACT

Systems, methods and apparatus are provided through which in some embodiments, an agent-oriented specification modeled with MaCMAS, is analyzed, flaws in the agent-oriented specification modeled with MaCMAS are corrected, and an implementation is derived from the corrected agent-oriented specification. Described herein are systems, method and apparatus that produce fully (mathematically) tractable development of agent-oriented specification(s) modeled with methodology fragment for analyzing complex multiagent systems (MaCMAS) and policies for autonomic systems from requirements through to code generation. The systems, method and apparatus described herein are illustrated through an example showing how user formulated policies can be translated into a formal mode which can then be converted to code. The requirements-based programming systems, method and apparatus described herein may provide faster, higher quality development and maintenance of autonomic systems based on user formulation of policies.

27 Claims, 51 Drawing Sheets

SYSTEMS, METHODS AND APPARATUS FOR MODELING, SPECIFYING AND DEPLOYING POLICIES IN AUTONOMOUS AND AUTONOMIC SYSTEMS USING AGENT-ORIENTED SOFTWARE ENGINEERING

RELATED APPLICATIONS

This application claims the benefit of U.S. Provisional Application Ser. No. 60/789,627 filed Mar. 28, 2006 under 35 U.S.C. 119(e). This application is a continuation-in-part of co-pending U.S. application Ser. No. 11/532,800 filed Sep. 18, 2006 entitled "Systems, Methods and Apparatus for Generating a Formal Specification from Informal Requirements via Pattern Matching," which is a continuation-in-part of co-pending U.S. application Ser. No. 11/461,669 filed Aug. 1, 2006 entitled "Systems, Methods and Apparatus for Procedure Development and Verification," which is a continuation in-part of co-pending U.S. application Ser. No. 11/203,590 filed Aug. 12, 2005 entitled "Systems, Methods & Apparatus For Implementation Of Formal Specifications Derived From Informal Requirements," which is a continuation-in-part of co-pending U.S. application Ser. No. 10/533,376 filed Feb. 25, 2004 entitled "System and Method for Deriving a Process-based Specification."

ORIGIN OF THE INVENTION

The invention described herein was made by employees of the United States Government and may be manufactured and used by or for the Government of the United States of America for governmental purposes without the payment of any royalties thereon or therefor.

FIELD OF THE INVENTION

This invention relates generally to computer software development processes and more particularly to validating a system implemented from requirements expressed in policies.

BACKGROUND OF THE INVENTION

High dependability and reliability is a goal of all computer and software systems. Complex systems in general cannot attain high dependability without addressing crucial remaining open issues of software dependability. The need for ultra-high dependability systems increases continually, along with a corresponding increasing need to ensure correctness in system development. Correctness exists where the implemented system is equivalent to the requirements, and where equivalence can be mathematically proven.

The development of a system may begin with the development of a requirements specification, such as a formal specification or an informal specification. A formal specification might be encoded in a high-level language, whereas requirements in the form of an informal specification can be expressed in restricted natural language, "if-then" rules, graphical notations, English language, programming language representations, flowcharts, scenarios, goal-directed requirement documents, or even using semi-formal notations such as unified modeling language (UML) use cases.

Natural language scenarios can be constructed in terms of individual scenarios written in a structured natural language. Different scenarios can be written by different stakeholders of the system, corresponding to the different views the stakeholders have of how the system will perform, including alternative views corresponding to higher or lower levels of abstraction. Natural language scenarios can be generated by a user with or without mechanical or computer aid. The set of natural language scenarios provides the descriptions of actions that occur as the software executes. Some of these actions will be explicit and required, while others can be due to errors arising, or as a result of adapting to changing conditions as the system executes.

For example, if the system involves commanding space satellites, scenarios for that system can include sending commands to the satellites and processing data received in response to the commands. Natural language scenarios might be specific to the technology or application domain to which the natural language scenarios can be applied. A fully automated general purpose approach covering all domains is technically prohibitive to implement in a way that is both complete and consistent. To ensure consistency, the domain of application might be specific-purpose. For example, scenarios for satellite systems might not be applicable as policies for systems that manufacture agricultural chemicals.

After completion of an informal specification that represents domain knowledge, the system is developed. A formal specification is not necessarily used by the developer in the development of a system.

In the development of some systems, computer readable code may be generated. The generated code is typically encoded in a computer language, such as a high-level computer language. Examples of the languages include Java, C, C Language Integrated Production System (CLIPS), and Prolog.

One step in creating a system with high dependability and reliability can be verification and validation that the executable system accurately reflects the requirements. Validation of the generated code is sometimes performed through the use of a domain simulator, a very elaborate and costly approach that is computationally intensive. This process of validation via simulation rarely results in an unambiguous result and rarely results in uncontested results among systems analysts. In some examples, a system is validated through parallel mode, shadow mode operations with a human operated system. This approach can be very expensive and exhibit severely limited effectiveness. In some complex systems, this approach leaves vast parts of possible execution paths forever unexplored and unverified.

During the life cycle of a system, requirements typically evolve. Manual change to the system creates a risk of introducing new errors and necessitates retesting and revalidation, which can greatly increase the cost of the system. Often, needed changes are not made due to the cost of verifying/validating consequential changes in the rest of the system. Sometimes, changes can be simply made in the code and not reflected in the specification or design, due to the cost or due to the fact that those who generated the original specification or design are no longer available.

Procedures, considered as the essential steps or actions to achieve a result, can be used for the assembly of materials in factories, for servicing of spacecraft (whether by astronauts, robots, or a combination), for business operation, and for experiments in a laboratory, to name but a few. Procedures can be very complex, involving many interactions, may involve many actions happening in parallel, and may be subject to significant constraints such as the ordering in which activities must happen, the availability of resources, etc. In many complex procedures, human error commonly results in the entire procedure needing to be repeated ab initio. In some cases, such as servicing a spacecraft, recovery from some of the more serious errors that may occur may not be possible.

As a rapidly growing field, autonomic systems (autonomic computing and autonomic communications) is a promising new approach for developing large-scale complex distributed' computer-based systems. In autonomic computing, the needs of large scale systems management has been likened to that of the human autonomic nervous system (ANS). The ANS, through the self-regulation, is able to effectively monitor, control and regulate the human body without the need for conscious thought. The self-regulation and separation of concerns provides human beings with the ability to concentrate on high level objectives without having to micro-manage the specific details involved.

The vision and metaphor of autonomic computing is to apply the same principles of self-regulation and complexity-hiding to the design of computer-based systems, in the hope that eventually computer systems can achieve the same level of self-regulation as the human ANS. The majority of conventional systems address the "how" of autonomic systems involving the low-level internal implementation, such as defining autonomic managers that together with the component that is to be managed make up an autonomic element to exist in a collaborative autonomic environment to provide self-management of the system. However, these efforts do not directly address the high-level requirements of the systems that drive autonomic systems.

For the reasons stated above, and for other reasons stated below which will become apparent to those skilled in the art upon reading and understanding the present specification, there is a need in the art to produce a system that is a provably correct implementation of agent-oriented specification, with or without autonomic properties, and that assures the consistency of such agent-oriented specifications throughout the implementation, that precludes major discrepancies, and that does not require use of a theorem-prover to establish correctness of the implementation. There is a further need for a convenient way of generating a new system when an agent-oriented specification changes. There is also a need for an automated, mathematics-based process for validation of agent-oriented specification that does not require large computational facilities.

BRIEF DESCRIPTION OF THE INVENTION

The above-mentioned shortcomings, disadvantages and problems are addressed herein, which will be understood by reading and studying the following discussion.

The systems, methods and apparatus described herein follow an agent-oriented software-engineering (AOSE)-based approach for modeling autonomous and autonomic properties of a system. The systems, methods and apparatus described herein support models at different levels of abstraction that composes models to obtain a particular structural organization. Models involved in a new policy can be composed and deployed. One benefit of the systems, methods and apparatus described herein may be that, as models can be developed at different levels of abstraction, policies can be specified for autonomous and autonomic systems at different levels of abstraction that provide abstraction of intelligent behaviors because the procedures performed inside and interaction can be described internally by way of neural networks, fuzzy logic, etc., which in turn provides specification of policies over implementations.

Systems, methods and apparatus described herein can provide automated analysis, validation, verification, and generation of complex procedures, often implemented as policies.

The systems, methods and apparatus may include inferring an equivalent formal model from one or more policies. Such a model can be analyzed for contradictions, conflicts, use of resources before the resources are available, competition for resources, and so forth. From such a formal model, an implementation can be automatically generated in a variety of notations. An implementation may include traditional programming language code, machine language code, scripts, and/or procedures. The approach can improve the resulting implementation, which may be provably equivalent to the policies described at the outset. In "reverse engineering" mode, the systems, methods and apparatus can be used to retrieve meaningful descriptions (in English, uses cases, graphical notations, or whatever input notations are supported) of existing policies that implement complex procedures, which may solve the need in the prior art to improve the policy of autonomic systems. Moreover, two or more policies can be translated to appropriate formal models, the models can be combined, and the resulting combination checked for conflicts. Then, the combined, error-free model can be used to generate a new (single) policy that combines the functionality of the original separate policies, and may be more likely to be correct.

In other embodiments, a system may include an inference engine and a translator, the translator being operable to receive policy information and to generate in reference to an inference engine, an implementation. The system may also include an analyzer operable to perform model verification/checking and determine existence of omissions, deadlock, livelock, and race conditions or other problems and inconsistencies in either the formal specification or the policy information.

In yet other embodiments, a method may include translating requirements expressed informally in policy statement to a formal specification, and analyzing the formal specification or policy statement.

Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which can be practiced. These embodiments are described in sufficient detail to enable those skilled in the art to practice the embodiments, and other embodiments are understood as utilized and that logical, mechanical, electrical and other changes can be made without departing from the scope of the embodiments. The following detailed description is, therefore, not to be taken in a limiting sense.

System Level Overview

Figure 1:
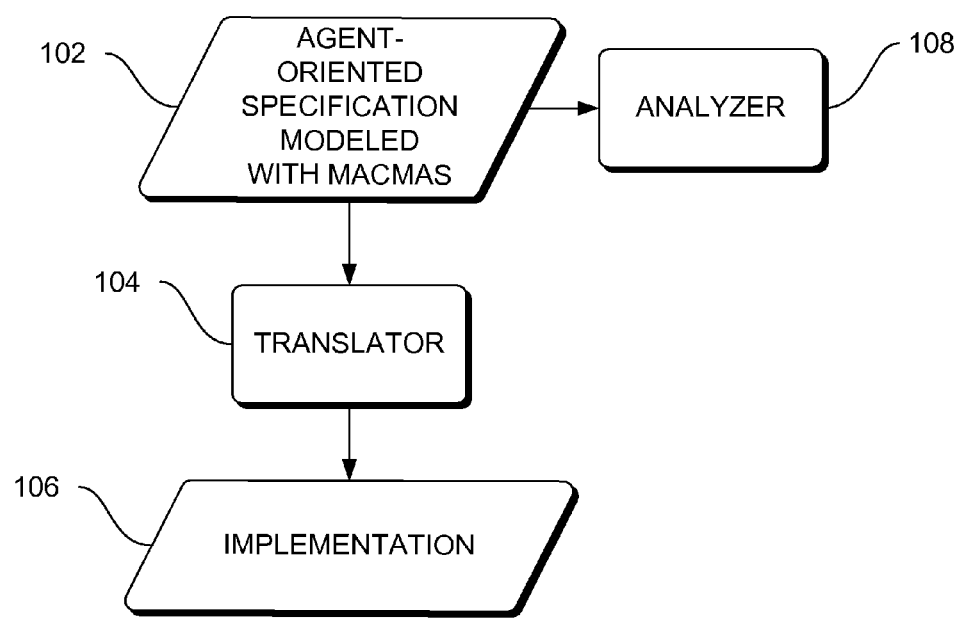
FIG. 1 is a block diagram that provides an overview of a system to engineer and verify an implementation from an agent-oriented specification modeled with methodology fragment for analyzing complex multiagent systems (MaC-MAS), according to an embodiment.

FIG. 1 is a block diagram that provides an overview of a system to engineer and verify an implementation from an agent-oriented specification modeled with methodology fragment for analyzing complex multiagent systems (MaCMAS), according to an embodiment. System 100 may solve the need in the art for an automated, generally applicable way to verify that an implementation is a provably correct implementation of one of more agent-oriented specifications modeled with MaCMAS.

MaCMAS is an agent-oriented software engineering (AOSE) methodology. MaCMAS is specially tailored to model complex acquaintance organizations. MaCMAS can provide explicit support for Multiagent System Product Lines (MAS-PLs).

Some embodiments of the system 100 may be a software development system that may include a data flow and processing points for the data. According to the disclosed embodiments, system 100 can convert one or more agent-oriented specifications that can be modeled with MaCMAS into an implementation on which model checking and other mathematics-based verifications can then be performed.

MaCMAS is a methodology fragment for analyzing complex multiagent systems. A software agent is a piece of software that exhibits autonomy, reactivity, pro-activity and social ability. A multi-agent organization can exist where there is interaction between participants, either through direct communication or through the environment. MaCMAS is described in greater detail below.

In system 100, an agent-oriented specification can be modeled with MaCMAS 102 or another AOSE that can be translated by translator 104 into an implementation 106. MaCMAS and AOSE are described in greater detail below. In some embodiments, no manual intervention in the translation may be provided. The implementation 106 can take other forms, such as a script, described in FIG. 14 below, or an executable program as described in FIG. 15 below. Those skilled in the art will readily understand that other appropriate notations and/or languages exist that are within the scope of the systems, method and apparatus described herein.

In some embodiments, system 100 can include an analyzer 108 to determine various properties of the agent-oriented specification that can be modeled with MaCMAS 102, such as the existence of omissions, deadlock, livelock, and race conditions, as well as other conditions, in the agent-oriented specification that can be modeled with MaCMAS 102, although one skilled in the art will recognize that other additional properties can be determined by the analyzer 108. The analyzer 108 may solve the need in the prior art to reduce errors.

In some embodiments, the implementation 106 can be mathematically and provably equivalent to the agent-oriented specification(s) that can be modeled with MaCMAS 102. Mathematically equivalent does not necessarily mean mathematically equal. Mathematical equivalence of A and B means that A implies B and B implies A. Note that the implementation 106 of some embodiments can be mathematically equivalent to, rather than necessarily equal to, the agent-oriented specification modeled with MaCMAS 102.

In some embodiments, the agent-oriented specification that can be modeled with MaCMAS 102 of system 100 can specify allowed situations, events and/or results of a software system. In that sense, the agent-oriented specification modeled with MaCMAS 102 can provide an abstract specification of the software system and the agent-oriented specification modeled with MaCMAS 102 can also provide detailed specifications.

Some embodiments of system 100 can be operational for a wide variety of rules, computer instructions, computer languages and applications; thus, system 100 can be considered generally applicable. Such applications can include, without limitation, space satellite control systems, distributed software systems, sensor networks, robot operations, complex scripts for spacecraft integration and testing, chemical plant operation and control, autonomous systems, electrical engineering applications such as chip design and other electrical circuit design, business management applications in areas such as workflow analysis, artificial intelligence applications in areas such as knowledge-based systems and agent-based systems, highly parallel and highly-distributed applications involving computer command and control and computer-based monitoring, and any other area involving process, sequence or algorithm design. Hence, one skilled in the art will recognize that any number of other applications not listed can fall within the scope of the systems, methods and apparatus described herein.

Some embodiments of the system 100 can provide mechanical or automatic generation of the implementation 106, in which human intervention may not required. In at least one embodiment of the system 100, all that can be required to update the implementation 106 is a change in the agent-oriented specification modeled with MaCMAS 102, in which case the changes and validation can ripple through the entire system without human intervention when system 100 operates. Changing and validating systems according to system 100 can provide cost effectively development of competing designs for a product and implementing each competing design to determine the best design.

Figure 27:
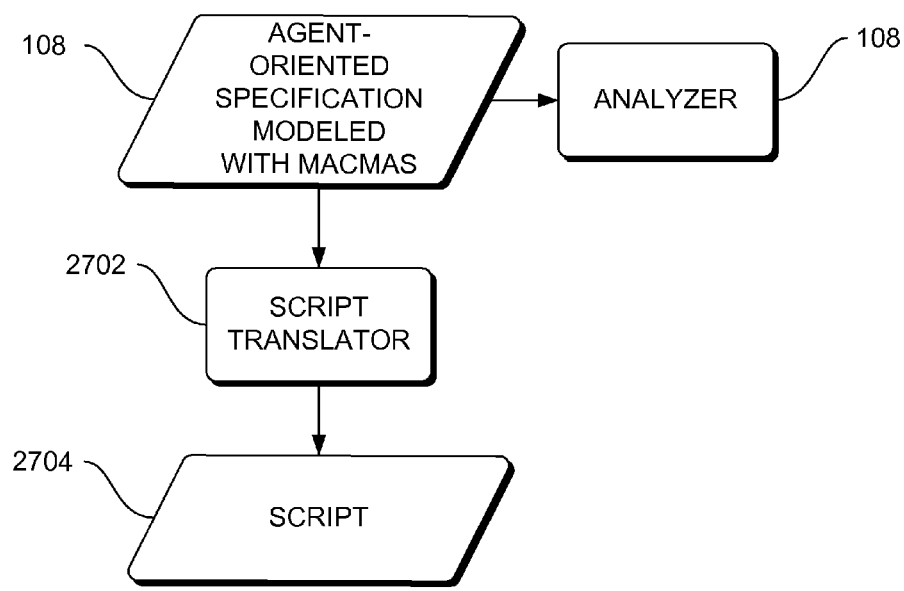
FIG. 27 is a block diagram of a system to engineer a script or procedure from agent-oriented specification(s) modeled with MaCMAS, according to an embodiment.
Figure 38:
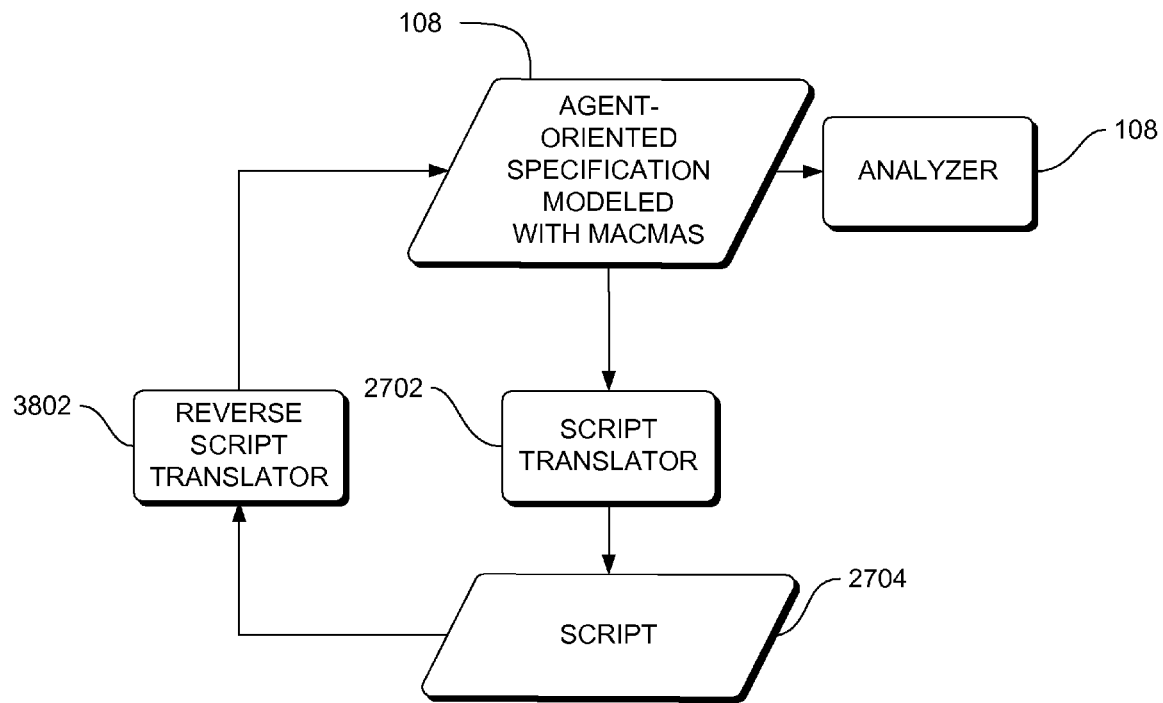
FIG. 38 is a block diagram of a particular implementation of an apparatus capable of translating agent-oriented specification(s) modeled with MaCMAS to a script, according to an embodiment.
Figure 39:
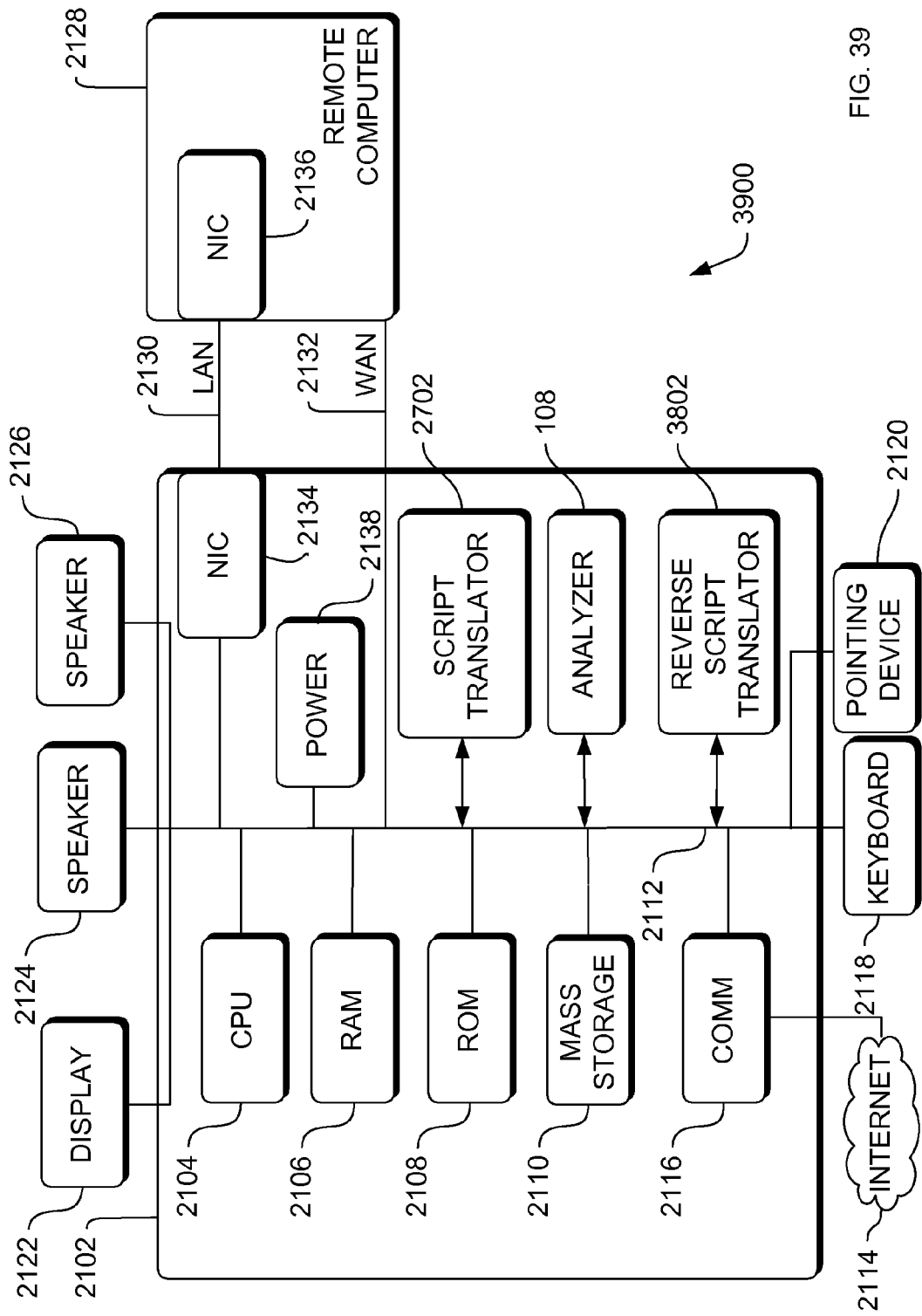
FIG. 39 is a block diagram of a hardware and operating environment of a particular implementation of FIG. 38, according to an embodiment.

Thus, in regards to scripts and complex procedures, automatic code generation of system 100 can generate procedures/scripts, such as shown in FIG. 27, in suitable scripting language or device control language (such as for a robot) that can provide the procedures, once validated, to be automatically transformed into an implementation. Additionally, system 100 can be used to "reverse engineer" existing procedures/scripts so that the existing procedures/scripts can be analyzed and corrected and recast in a format and form that can be more easily understood, such as shown in FIG. 38 and FIG. 39. System 100 also can be used to reverse engineer multiple existing procedures/scripts (even written in different languages) to a single agent-oriented specification(s) modeled with MaCMAS by which the procedures/scripts are combined, analyzed for conflicts, and regenerated as a single procedure/script (in the same or a different procedure/scripting language) such as shown in FIG. 38.

Figure 21:
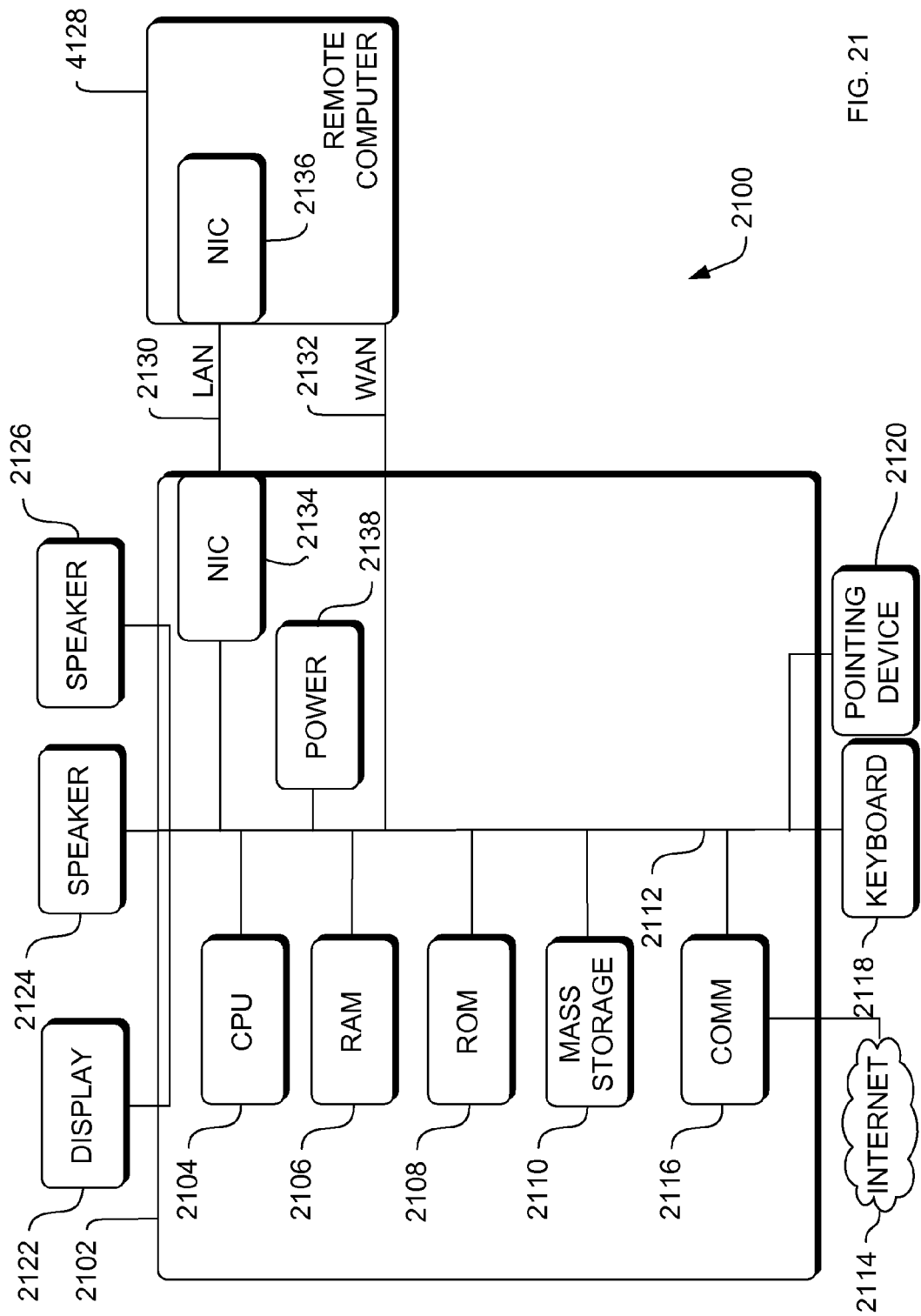
FIG. 21 is a block diagram of a hardware and operating environment in which different embodiments can be practiced.

Some embodiments of system 100 may operate in a multi-processing, multi-threaded operating environment on a computer, such as the computer 2102 illustrated in FIG. 21. While the system 100 is not limited to any particular agent-oriented specification that can be modeled with MaCMAS 102, translator 104, implementation 106, analyzer 108, for sake of clarity, embodiments of simplified particular agent-oriented specification that is modeled with MaCMAS 102, translator 104, implementation 106, analyzer 108 are described.

In some embodiments, the system 100 can be a software development system that can include a data flow and processing points for the data. System 100 can be representative of (i) computer applications and electrical engineering applications such as chip design and other electrical circuit design, (ii) business management applications in areas such as workflow analysis, (iii) artificial intelligence applications in areas such as knowledge-based systems and agent-based systems, (iv) highly parallel and highly-distributed applications involving computer command and control and computer-based monitoring, and (v) any other area involving process, sequence or algorithm design. One skilled in the art, however, will recognize that other applications can exist that are within the purview of the systems, methods and apparatus described herein. According to the disclosed embodiments, system 100 can, without human intervention, convert different types of policies into formal specifications on which model checking and other mathematics-based verifications are performed, and then optionally convert the specification into code.

System 100 can be operational for a wide variety of languages for expressing requirements, and thus system 100 can be generally applicable. Such applications may include, without limitation, distributed software systems, sensor networks, robot operation, complex scripts for spacecraft integration and testing, chemical plant operation and control, and autonomous systems. One skilled in the art will understand that these applications are cited by way of example and that other applications can fall within the scope of the invention.

MaCMAS is one example of agent-oriented software engineering (AOSE). AOSE has arisen to address methodological aspects and other issues related to the development of complex multiagent systems. AOSE is a new software engineering paradigm that augurs much promise in enabling the successful development of more complex systems than is achievable with current Object-Oriented approaches which use agents and organizations of agents as the main abstractions. The organizational metaphor has been proven to be one of the most appropriate tools for engineering multi-agent systems (MAS). The metaphor can be used by many researchers to guide the analysis and design of MAS.

A MAS organization can be observed from two different points of view, namely an acquaintance point of view, which shows the organization as the set of interaction relationships between the roles placed by agents, and a structural point of view, which shows agents as artifacts that belong to sub-organizations, groups and teams. In the structural point of view, agents can also be structured into hierarchical structures showing the social structure of the system.

Both the acquaintance point of view and the structural point of view can be intimately related, but the two views show the organization from radically different viewpoints. Because any structural organization must include interactions between agents of the structural organization in order to function, the acquaintance organization can be commonly contained in the structural organization. Therefore, if first the acquaintance organization is determined, and then the constraints required for the structural organization can be defined, a natural map can be formed between the acquaintance organization and the corresponding structural organization. Thus, roles can be assigned to an agent and, any acquaintance organization can be modeled orthogonally to the structural organization of the acquaintance organization.

In some embodiments, the separation of the acquaintance point of view and the structural point of view can specify policies at the acquaintance organization level, and deploy the policies over the structural organizational of the running system. The scope of policies can usually imply features of several acquaintance sub-organizations. In such cases, first the acquaintance sub-organizations can be composed, added or modified, while being guided by the policy specification, to deploy the process later.

MaCMAS is an AOSE methodology that can be extended and/or adapted to specify and deploy policies. MaCMAS is specially tailored to model complex acquaintance organizations. The main advantages of MaCMAS can be observed from three aspects: 1) in the modeling aspect, the main advantage may be in providing an interaction abstraction to enable the modeling of unpredictable behaviors, and providing a notation in a unique UML 2.0-based approach dedicated to modeling the acquaintance organization abstractly, 2) in the techniques aspect, semi-automatic techniques can be provided for decomposing and composing models basing on goal-oriented requirements and on dependencies, which is unique in the field, and 3) in the software process aspect, a software process can be provided that covers top-down and bottom-up development approaches, as well as criteria for deciding between them.

MaCMAS provides UML-based models which can be the de-facto standard in modeling, and which can decrease the learning-curve for engineers. MaCMAS also provides modeling at different levels of abstraction, which provides specification of policies at any level. MaCMAS also provides techniques to compose acquaintance models, which can be helpful for policies that imply several system-goals and for deploying an acquaintance model that specifies a policy over a structural organization; in other words, composition of roles.

The MaCMAS/UML modeling process can be focused on interactions/acquaintance organization which can be the main source of complexity. Interactions can be represented abstractly by multi-Role Interactions (mRI). These mRIs can be helpful modeling elements and can be used as the minimum building block for modeling. Use of mRIs can be helpful in performing an incremental layered modeling approach since mRIs can be described internally by use of finer-grain mRIs, or several mRIs can be abstracted by a coarser-grain one.

An mRI can be a pattern of interaction that abstractly represents the fulfillment of a system goal without detailing how fulfillment can be achieved. Thus, using an mRI as the minimum modeling element, accounting for all of the details required to fulfill a complex system goal and the messages that can be exchanged at stages where these details have not been identified clearly, are not known, or are not even necessary. Abstract models may be provided where intelligent behavior can be carried out by use of neural networks, fuzzy logic, and so forth, without the necessity of dealing with all the details. In addition, the direct correlation between system goals and mRIs can provide establishment of a clear traceability between goal-oriented requirement documents and analysis models. Policies usually verse about system goals, and thus the MaCMAS can manage the relation between requirements, analysis models, and policies. The analysis model can help in simplifying which policies can be specified, and be deployed in the system at runtime. These mRIs can be represented with UML 2.0 collaborations extended with some extra information detailed above. Three views of acquaintance organization can be implemented: two for representing static and dynamic aspects of the organization, and a third for representing the relation between models in different abstraction layers, as follows:

a) Static Acquaintance Organization View can show static interaction relationships between roles in the system and the knowledge processed by the roles. The Static Acquaintance Organization View may include the following UML models:

a) 1) Role Models can show an acquaintance sub-organization as a set of roles collaborating by use of several mRIs. As mRIs allow abstract representation of interactions, role models may represent autonomous and autonomic properties of the system at any level of abstraction.

a) 2) Ontology can show the ontology shared by roles in a role model. Ontology can be used to add semantics to the knowledge owned and exchanged by roles. Ontology can also be important for deploying policies.

b) Behavior of Acquaintance Organization View can show the sequencing of mRIs in a particular role model. The sequencing may be represented by two equivalent models:

b) 1) Plan of a Role separately can represent the plan of each role in a role model showing how the mRIs of the role sequence. The Plan of a Role can be represented using UML 2.0 ProtocolStateMachines. The Plan of a Role can be used to focus on a certain role, while ignoring others.

b) 2) Plan of a Role Model can represent the order of mRIs in a role model with a centralized description. The Plan of a Role Model may be represented using UML 2.0 StateMachines and can be used to facilitate easy understanding of the whole behavior of a sub-organization.

c) Traceability View model can show how models in different abstraction layers relate. The Traceability View can show how mRIs can be abstracted, composed or decomposed by way of classification, aggregation, generalization or redefinition. UML packages can also be used to group such mRIs that can be present in the context of a role model. Note that usually only the relations between interactions are shown because the relations can be the focus of modeling, but all the elements that compose an mRI can also be related. Finally, since an mRI presents a direct correlation with system goals, traceability models can clearly show how a certain requirement system goal can be refined and materialized.

According to some embodiments, a policy can describe one or more potential executions of a system, such as describing what happens in a particular situation and what range of behaviors can be expected from or omitted by the system under various conditions.

Different policies can be written by different stakeholders of the system, corresponding to the different views the stakeholders can have of how the system will perform, including alternative views corresponding to higher or lower levels of abstraction. Policies can be generated by a user with or without mechanical or computer aid. Policies can provide the descriptions of actions that occur as the software executes. Some of these actions can be explicit and required, while others can be due to errors arising, including those that are as a result of adapting to changing conditions as the system executes.

Method Embodiments

In the previous section, a system level overview of the operation of an embodiment is described. In this section, the particular methods of such an embodiment are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware can also be composed of computer-executable instructions. Methods 200-2000 can be performed by a program executing on, or performed by, firmware or hardware that can be a part of a computer, such as computer 2102 in FIG. 21.

Figure 2:
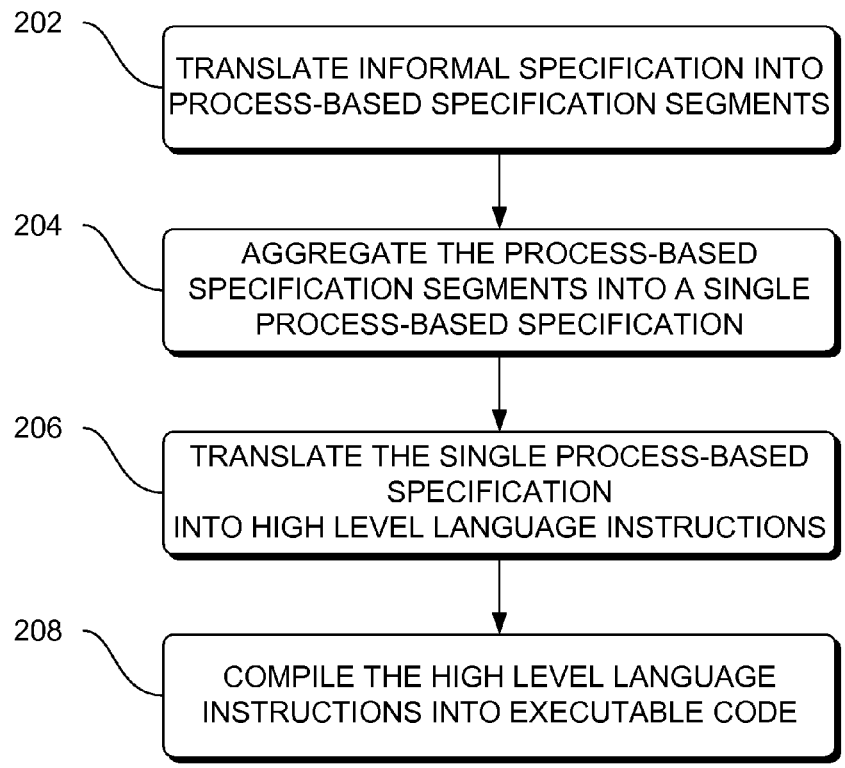
FIG. 2 is a flowchart of a method to generate an executable system from an informal specification, according to an embodiment.

FIG. 2 is a flowchart of a method 200 to generate an executable system from an informal specification, according to an embodiment. Method 200 may solve the need in the art to generate executable computer instructions from requirements with neither the time involved in manually writing the executable computer instructions, nor the mistakes that may arise in manually writing the executable computer instructions, without using a theorem-prover.

Figure 3:
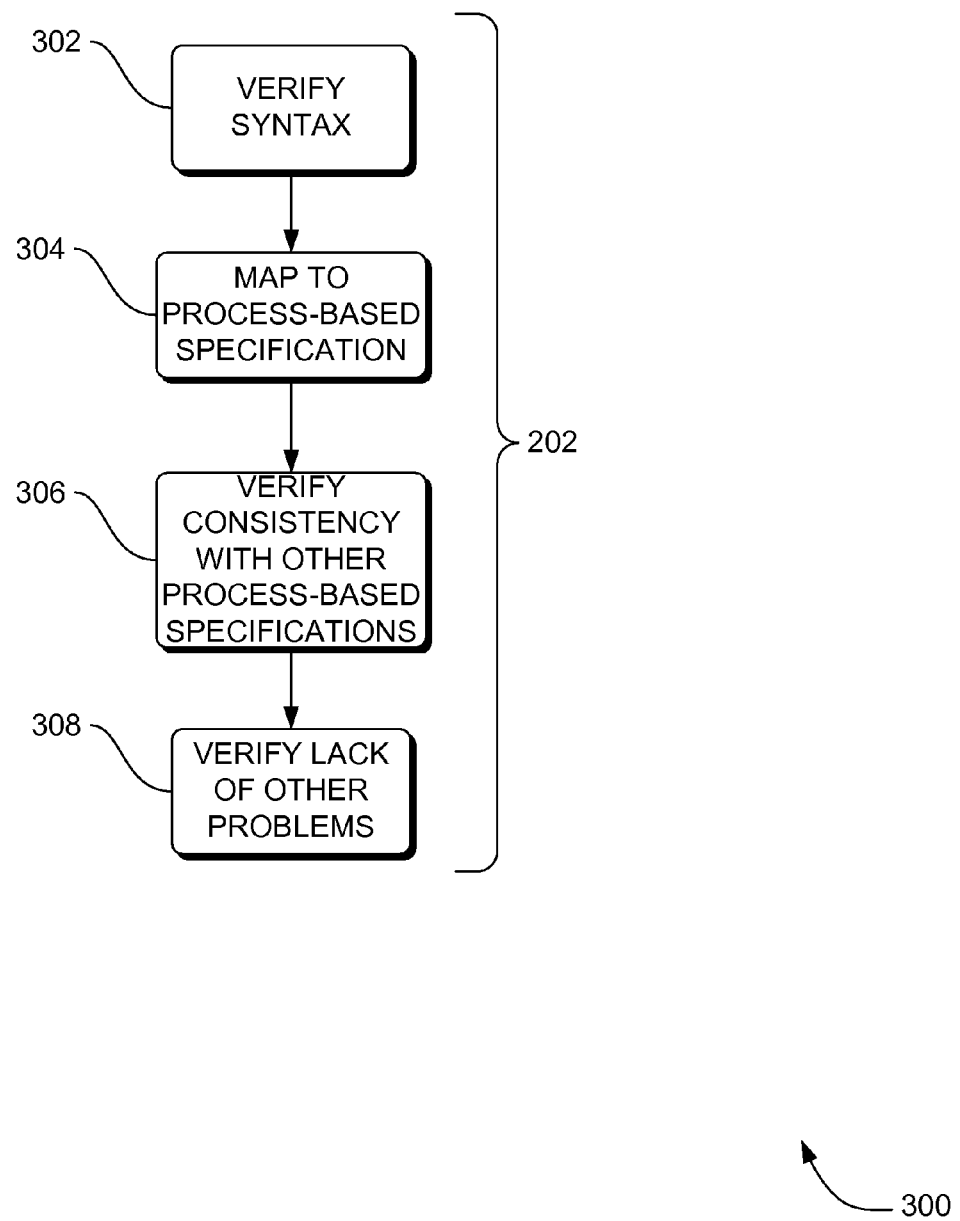
FIG. 3 is a flowchart of a method to translate informal specifications into process-based specification segments, according to an embodiment.

Method 200 may include translating 202 mechanically each of a plurality of requirements of the informal specification to a plurality of process-based specification segments. In some embodiments, the translating 202 may include inferring the process-based specification segments from the informal specification. One embodiment of translating 202 is shown in FIG. 3 below.

In some embodiments, the process-based specification can be process algebra notation. Such embodiments may satisfy the need in the art for an automated, mathematics-based process for requirements validation that does not require large computational facilities.

Thereafter, some embodiments of method 200 may include aggregating 204 the plurality of process-based specification segments into a single process-based specification model.

Subsequently, method 200 may include translating 206 the single process-based specification model to instructions encoded in the Java computer language or some other high-level computer programming language. Thereafter, method 200 may include compiling 208 the instructions encoded in the Java computer language into a file of executable instructions.

In some embodiments, method 200 may include invoking the executable instructions, which can provide a method to convert informal specifications to an application system without involvement from a computer programmer.

Some embodiments of method 200 may not include invoking a theorem-prover to infer the process-based specification segments from the informal specification.

FIG. 3 is a flowchart of a method to verify the syntax of a set of scenarios, translate the set of scenarios to a process-based specification, verify the consistency of the process-based specification, and verify the absence of other problems in the process-based specification, according to an embodiment. Method 300 is an example of one embodiment of translating 202 in FIG. 2.

According to some embodiments, method 300 may include verifying 302 the syntax of the plurality of requirements of the informal specification. Thereafter, method 300 may include mapping 304 the plurality of requirements of the informal specification to a process-based specification.

In some embodiments, method 300 subsequently may also include verifying 306 consistency of the process-based specification with at least one other process-based specification. In some embodiments, method 300 may subsequently also include verifying 308 lack of other problems in the process-based specification. One example of other problems may be unreachable states in the process defined in the process-based specification.

Figure 4:
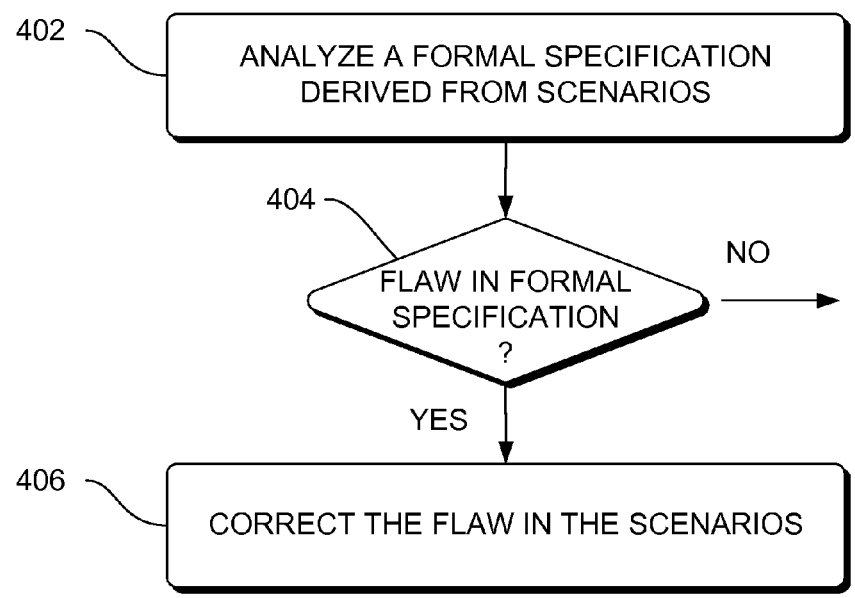
FIG. 4 is a flowchart of a method to validate/update scenarios of a system, according to an embodiment.

FIG. 4 is a flowchart of a method 400 to validate/update scenarios of a system, according to an embodiment. Method 400 may solve the need in the prior art to reduce errors in scripts.

Method 400 can include analyzing 402 a script or specification, such as script 2314, of the system 2300, the script having been previously derived from the rules of the system.

Thereafter, a determination 404 can be made as to whether or not the analyzing 402 indicates that the script contains a flaw. If a flaw does exist, then the rules can be corrected 406 accordingly.

In some embodiments, the analyzing 402 can include applying mathematical logic to the script in order to identify a presence or absence of mathematical properties of the script. Mathematical properties of the script that can be determined by applying mathematical logic to the script can include, by way of example:

1) whether or not the script implies a system execution trace that includes a deadlock condition, and 2) whether or not the script implies a system execution trace that includes a livelock condition.

In some embodiments, the above two properties may be domain independent. One skilled in the art will note that there are many other possible flaws that could be detected through the analysis of the model, many or even most of which might be domain dependent. An example of a domain dependent property would be represented by the operational principle that "closing a door that is not open is not a valid action." This example would be applicable in the domain of the Hubble Space Telescope on-orbit repair.

Because in some embodiments the script can be provably equivalent to the scenarios by virtue of method 400, if a flaw is detected in the script, then the flaw could be corrected by changing (correcting) the scenarios. Once the correction is made, then the corrected scenarios can be processed by system 2300 in FIG. 23 or method 500 in FIG. 5 to derive a new script from the corrected scenarios. According to at least one embodiment, the new script can be processed by method 400, and the iterations of method 500 and method 400 can repeat until there are no more flaws in the script generated from the scenarios, at which point the scenarios have no flaws because the script is provably equivalent to the scenarios from which it was derived. Thus, iterations of methods 500 and 400 can provide verification/validation of the scenarios.

Thereafter, the new script can be used to generate an implementation of the system.

Figure 5:
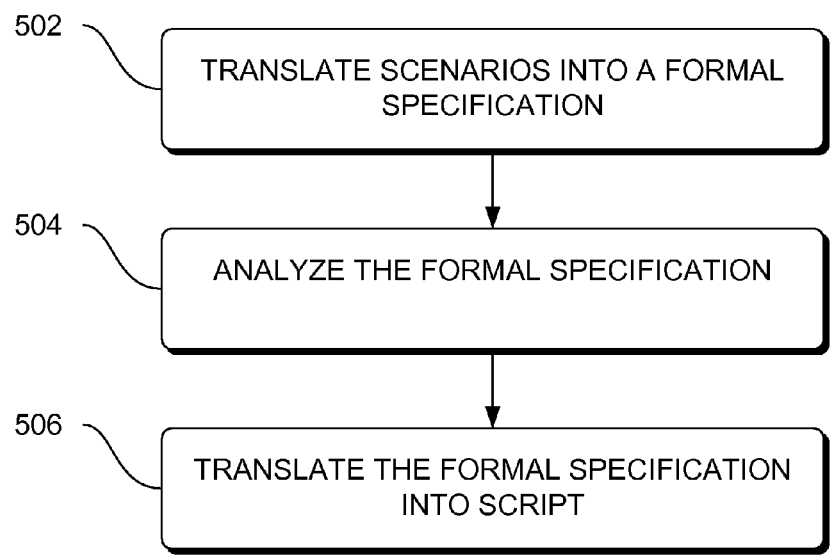
FIG. 5 is a flowchart of a method to translate each of a plurality of scenarios into a script, according to an embodiment.

FIG. 5 is a flowchart of a method to translate each of a plurality of scenarios into a script, according to an embodiment. Embodiments of the method 500 can include translating 502 scenarios 2302 into a script 2314 without human intervention.

Thereafter, method 500 can include optionally analyzing 504 the formal model or specification. The analyzing 504 can be a verification/validation of the scenarios 2302. In some embodiments, the analyzing 504 may determine various properties such as existence of omissions, deadlock, livelock, and race conditions in the script 2314, although one skilled in the art will know that analyzing the formal specification can determine other properties not specifically listed, which are contemplated by this invention. In some embodiments, the analyzing 504 can provide a mathematically sound analysis of the scenarios 2302 in a general format that doesn't require significant understanding of the specific rules of the scenarios 2302. Further, the analyzing 504 can warn developers of errors in their scenarios 2302, such as contradictions and inconsistencies, but equally importantly it can highlight rules or sets of rules that are underspecified or over-specified and need to be corrected for the scenarios 2302 to operate as intended. Thus, in some embodiments no knowledge of the scenarios 2302 is required, but instead significant analysis, verification, testing, simulation and model checking of the scenarios 2302 using customized tools or existing tools and techniques is provided.

Thereafter, in some embodiments, method 500 can include translating 506 the formal specification to a script 2314. Thus, in at least one embodiment, the method 500 can provide a method to convert scenarios to scripts without involvement from a computer programmer.

Some embodiments of the method 500 may not include invoking an automated logic engine, such as a theorem-prover, to infer the script 2314 from the scenarios 2302.

In certain embodiments of method 500, informal representations of requirements for procedures/scripts that represent the operation of a system can be mechanically converted to a mathematically sound specification that can be analyzed for defects and used for various transformations, including automatic translation into executable form and automatic regeneration of procedures/scripts into other notations/representations. In other embodiments, the method disclosed herein can be used to automatically reverse engineer existing procedures and scripts to formal models from which the method can be used to produce customer-readable representations of procedures/scripts or machine-processable scripts in any of various scripting languages.

Mathematically sound techniques can be used to mechanically translate an informal procedure/script requirement into an equivalent formal model. The model may be mechanically (that is, with no manual intervention) manipulated, examined, analyzed, verified, and used in a simulation.

Figure 6:
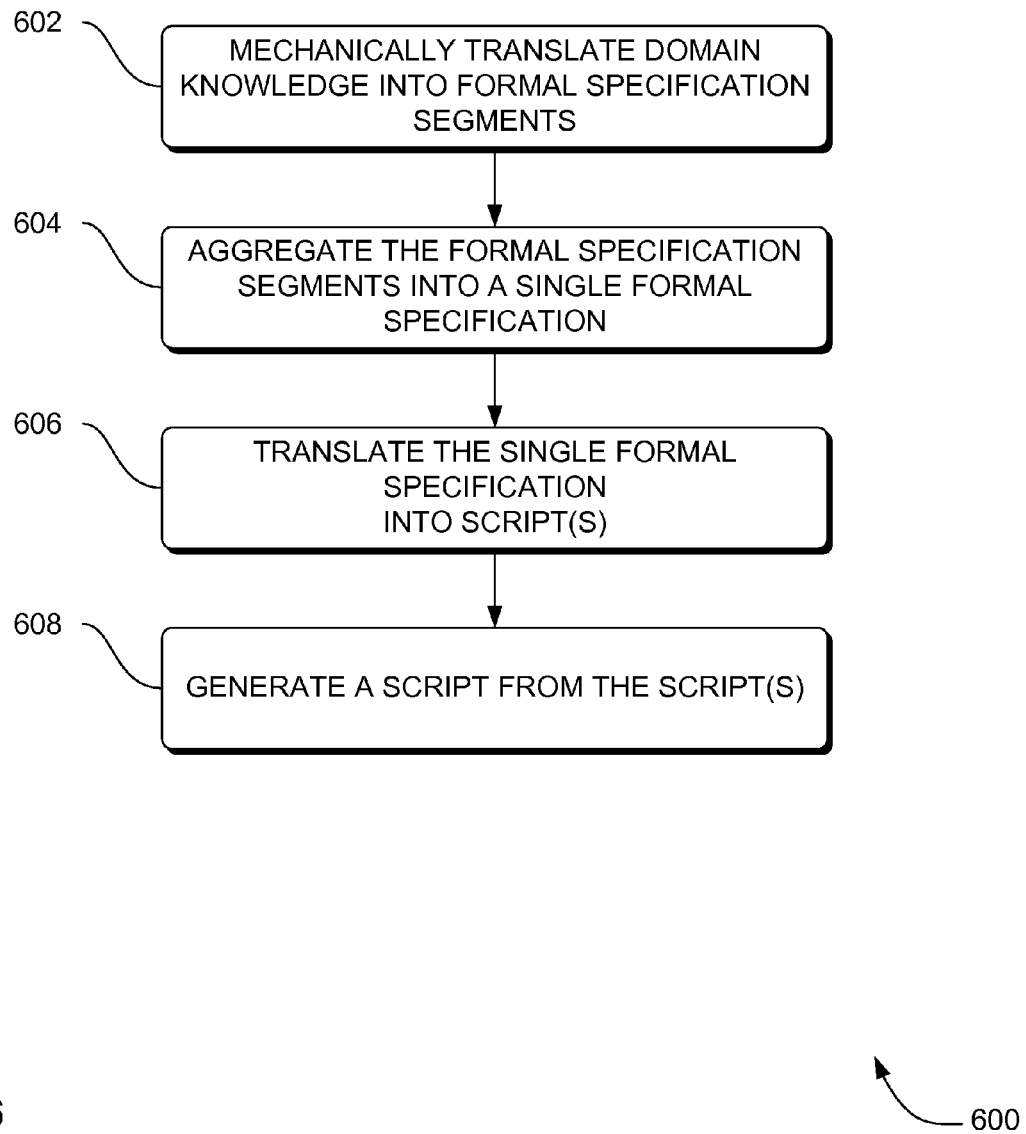
FIG. 6 is a flowchart of a method to translate domain knowledge into a script, according to an embodiment.

FIG. 6 is a flowchart of a method 600 to translate domain knowledge into a script, according to an embodiment. Method 600 may solve the need in the art to generate scripts from requirements with neither the time involved in manually writing the scripts, nor the mistakes that can arise in manually writing the scenarios, without using an automated logic engine.

Figure 7:
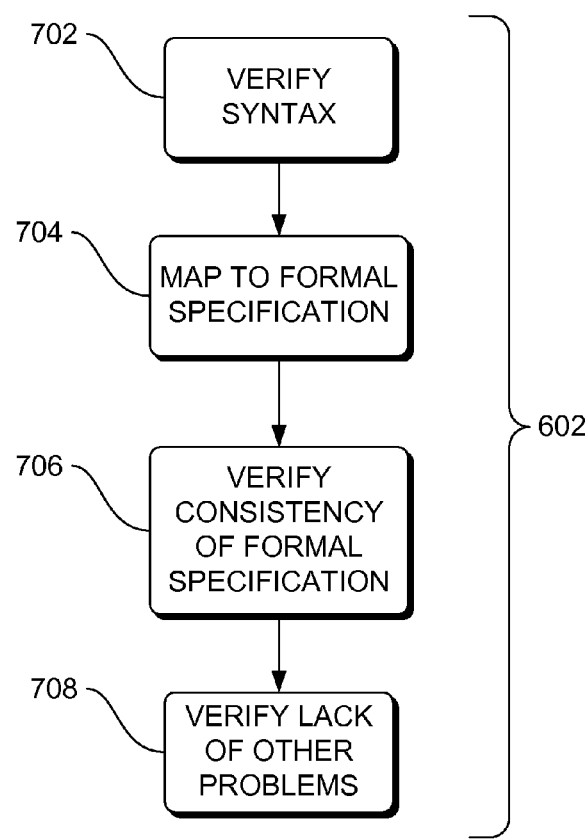
FIG. 7 is a flowchart of a method to translate domain knowledge into formal specification segments, according to an embodiment.

Method 600 can include mechanically translating 602 each of a plurality of scenarios or domain knowledge to a plurality of formal specification segments. The translation can be done without human intervention. One embodiment of translating 602 is shown in FIG. 7 below.

Thereafter, method 600 can include aggregating 604 the plurality of formal specification segments into a single formal model or specification.

Subsequently, method 600 can include translating 606 the single formal specification to multiple scripts as output from translating 606. Thereafter, method 600 can include generating 608 a script from the scripts that were accepted from translating 606. Thus, method 600 may provide an embodiment of a method to convert a script to an application system without involvement from a computer programmer.

Some embodiments of method 600 may not include invoking a theorem-prover or any other automated logic engine to infer the formal specification segments from the scenarios.

FIG. 7 is a flowchart of a method 700 to verify the syntax of a set of scenarios, translate the set of scenarios to a formal specification, verify the consistency of the formal specification, and verify the absence of other problems in the formal specification, according to an embodiment. Method 500 is an example of one embodiment of translating 602 in FIG. 6. As indicated, such translation can be accomplished without human intervention.

In some embodiments, the method 700 can include verifying 702 the syntax of the plurality of scenarios. Thereafter, method 700 can include mapping 704 the plurality of scenarios to a script or specification.

In some embodiments, method 700 can subsequently also include verifying 706 consistency of the formal specification. In some embodiments, method 700 may subsequently also include verifying 708 a lack of other problems in the formal specification. One example of other problems might be unreachable states in the process defined in the formal specification, although one skilled in the art will understand that yet other problems are contemplated.

Figure 8:
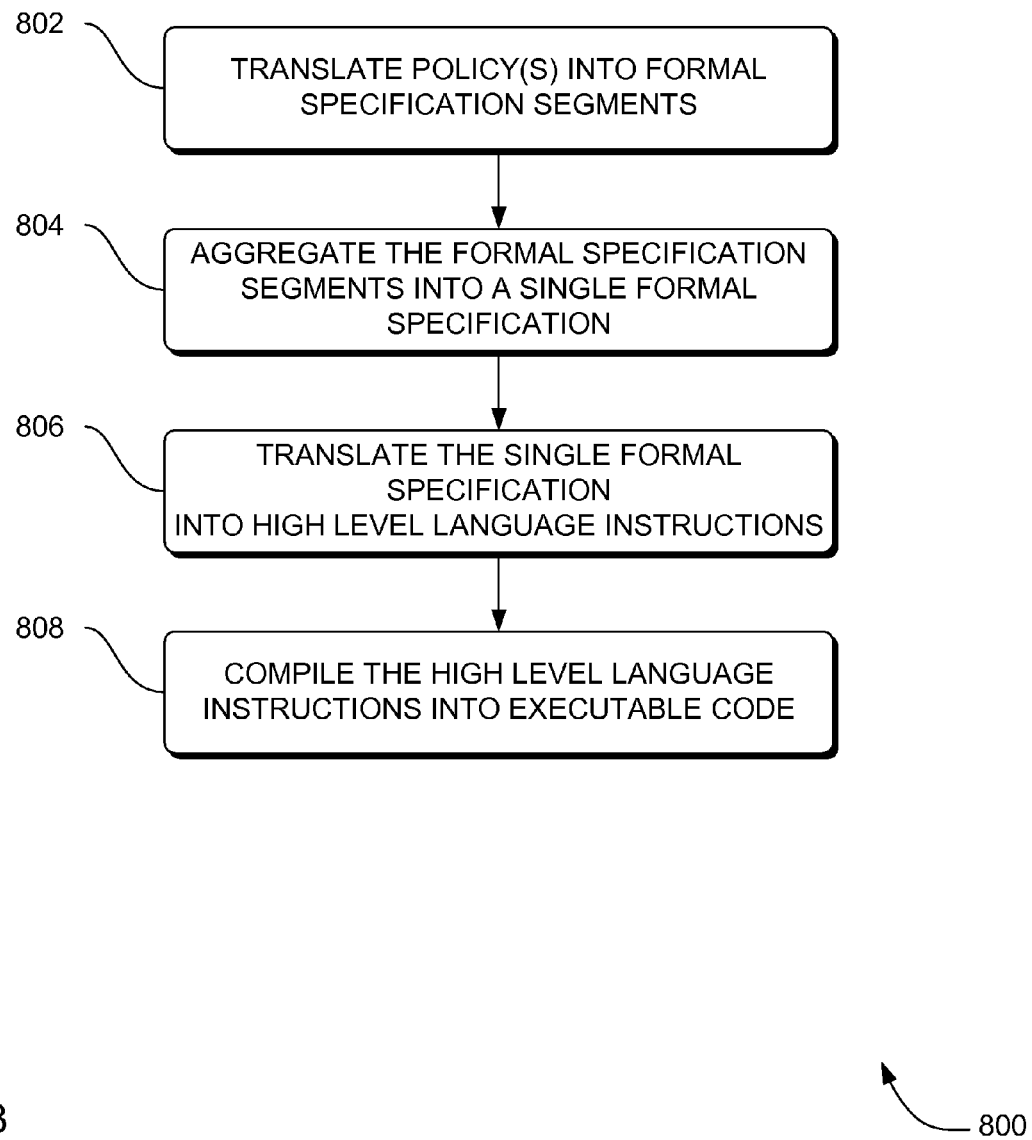
FIG. 8 is a flowchart of a method to generate an executable system from a policy, according to an embodiment.

FIG. 8 is a flowchart of a method 800 to generate an executable system from a policy, according to an embodiment. Method 800 may solve the need in the art to generate executable computer instructions from policy with neither the time nor the mistakes involved in manually writing the executable computer instructions, without using a theorem-prover.

Figure 9:
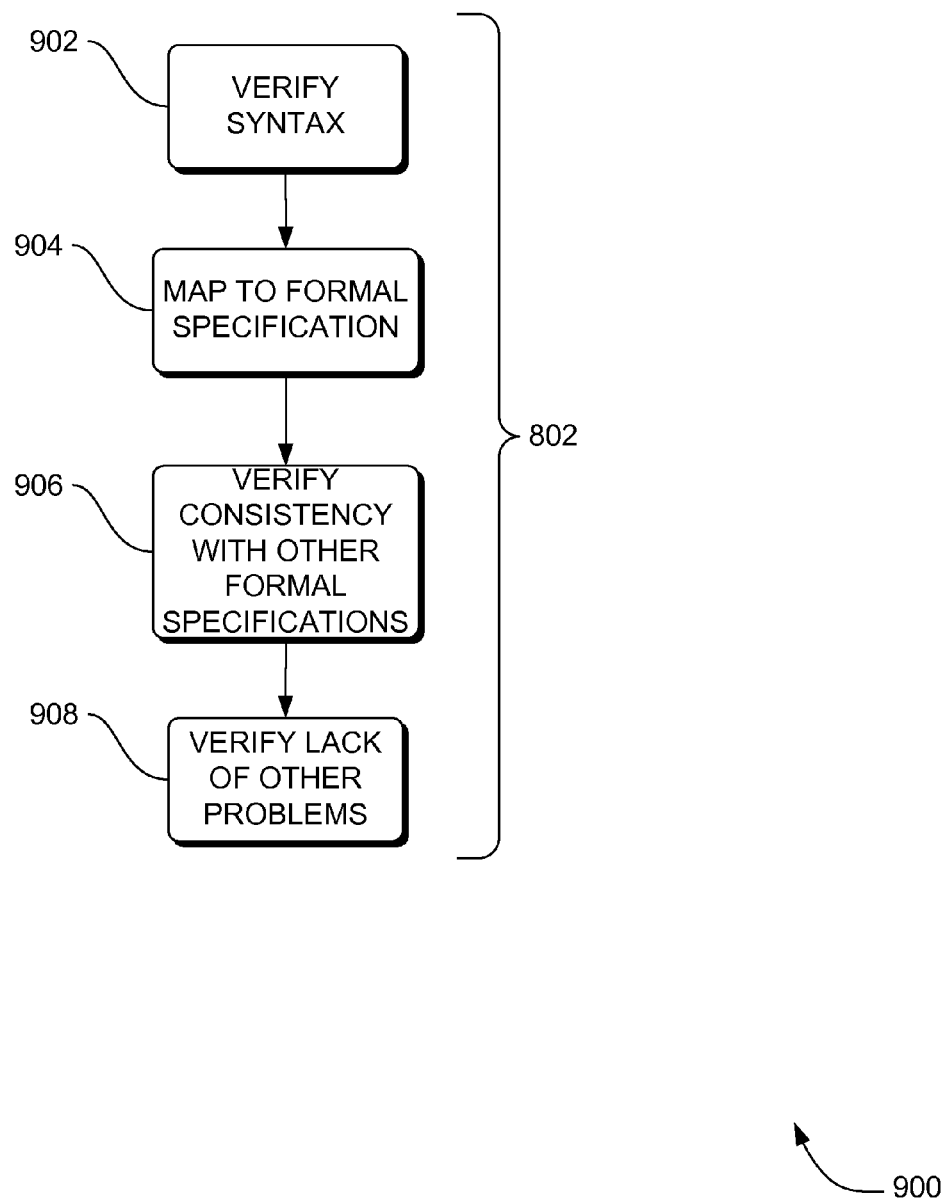
FIG. 9 is a flowchart of a method to translate policies into formal specification segments, according to an embodiment.

In some embodiments, method 800 may include translating 802 mechanically each of a plurality of requirements of the policy to a plurality of formal specification segments. In some embodiments, the translating 802 may include inferring the formal specification segments from the policy. One embodiment of translating 802 is shown in FIG. 9 below.

In some embodiments, the formal specification may be process algebra notation. Such embodiments may satisfy the need in the art for an automated, mathematics-based process for policy validation that does not require large computational facilities.

Thereafter, method 800 may include aggregating 804 the plurality of formal specification segments into a single formal specification or model.

Subsequently, method 800 may include translating 806 the single formal specification to instructions encoded in the Java computer language or some other high-level computer programming language. Thereafter, method 800 may include compiling 808 the instructions encoded in the high-level computer language into a file of executable instructions or code.

In some embodiments, method 800 may include invoking the executable instructions, which provides a method to convert policies to an application system without involvement from a computer programmer.

Some embodiments of method 800 may not include invoking a theorem-prover to infer the formal specification segments from the policy.

FIG. 9 is a flowchart of a method 900 to verify the syntax of a set of policies, translate the set of policies to a formal specification, verify the consistency of the formal specification, and verify the absence of other problems in the formal specification, according to an embodiment. Method 900 is an example of an embodiment of translating 802 in FIG. 8.

In some embodiments, method 900 may include verifying 902 the syntax of the plurality of requirements of the policy. Thereafter, method 900 may include mapping 904 the plurality of requirements of the policy to a formal specification.

In some embodiments, method 900 may subsequently also include verifying 906 consistency of the formal specification with at least one other formal specification. In some embodiments, method 900 may subsequently also include verifying 908 a lack of other problems in the formal specification. One example of other problems can be unreachable states in the process defined in the formal specification, although one skilled in the art will recognize that other problems fit within the scope of this invention.

Figure 10:
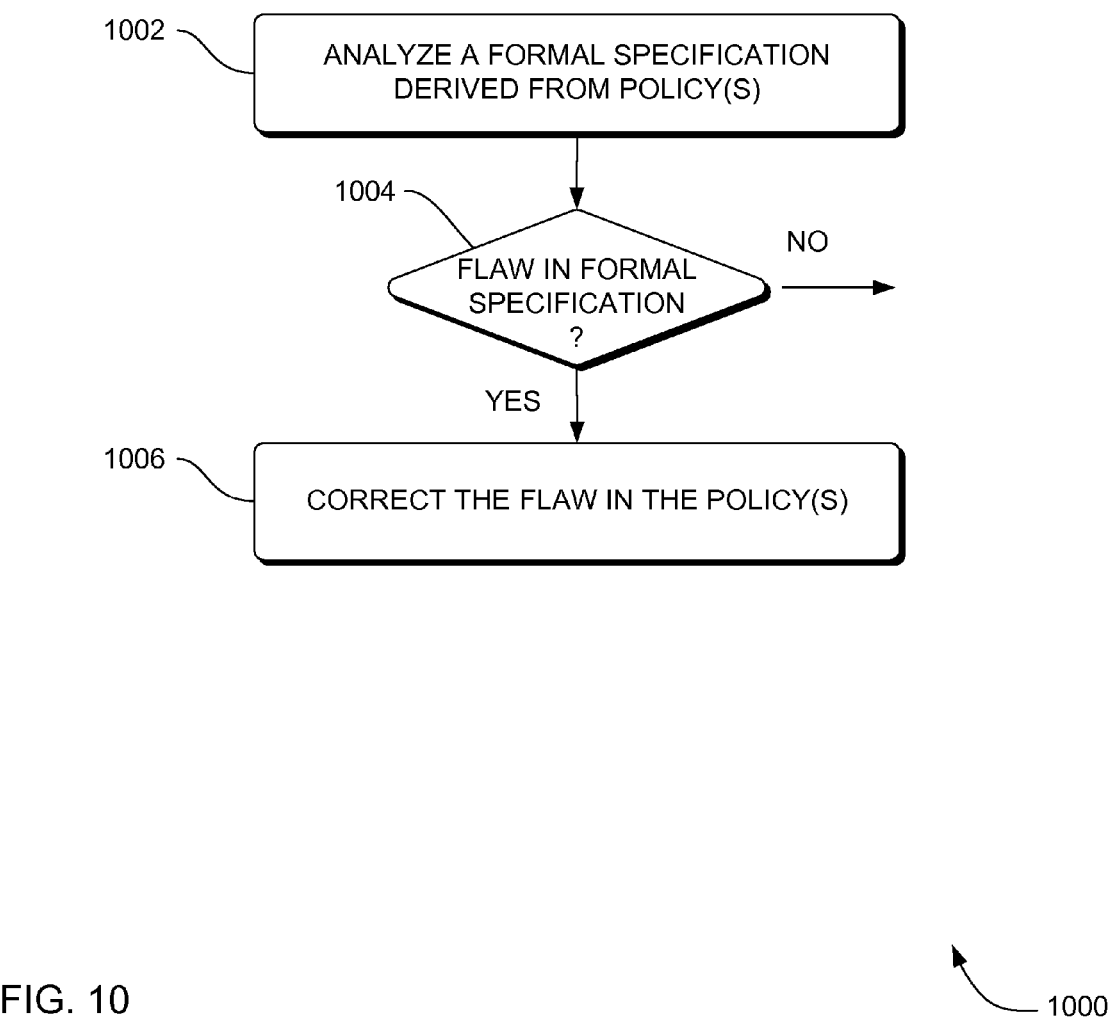
FIG. 10 is a flowchart of a method to validate/update policies of a system, according to an embodiment.

FIG. 10 is a flowchart of a method 1000 to validate/update policies of a system, according to an embodiment. Method 1000 may solve the need in the prior art to reduce errors in implementations.

Method 1000 can include analyzing 1002 a formal specification, such as formal specification 2406, of the system, the formal specification 2406 having been previously derived from the policies of the system.

In some embodiments, the analyzing 1002 can include applying mathematical logic to the formal specification 2406 in order to identify a presence or absence of mathematical properties of the formal specification 2406. Mathematical properties of the formal specification 2406 that can be determined by applying mathematical logic to the formal specification 2406 can include, by way of example:

1) whether or not the formal specification 2406 implies a system execution trace that includes a deadlock condition, and 2) whether or not the formal specification 2406 implies a system execution trace that includes a livelock condition.

The above two properties can be domain independent. One skilled in the art will note that there are many other possible flaws that could be detected through the analysis of the model, many or even most of which might be domain dependent. An example of a domain dependent property could be represented by the operational principle that "closing a door that is not open is not a valid action." This example would be applicable in the domain of the Hubble Space Telescope on-orbit repair.

Thereafter, a determination 1004 can be made as to whether or not the analyzing 1002 indicates that the formal specification 2406 contains a flaw. If a flaw does exist, then the policies can be corrected 1006 accordingly.

Figure 11:
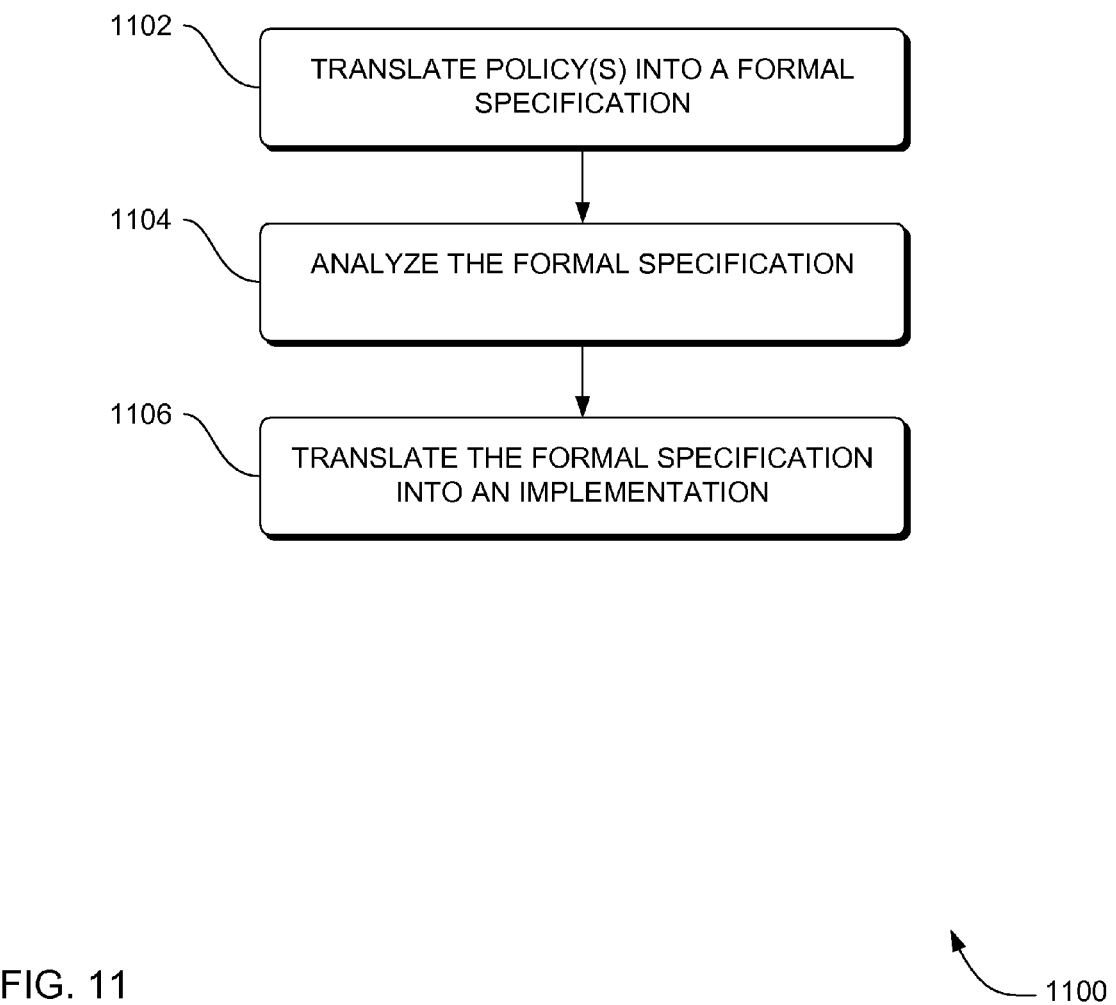
FIG. 11 is a flowchart of a method to translate one or more policies of a system into an implementation, according to an embodiment.
Figure 25:
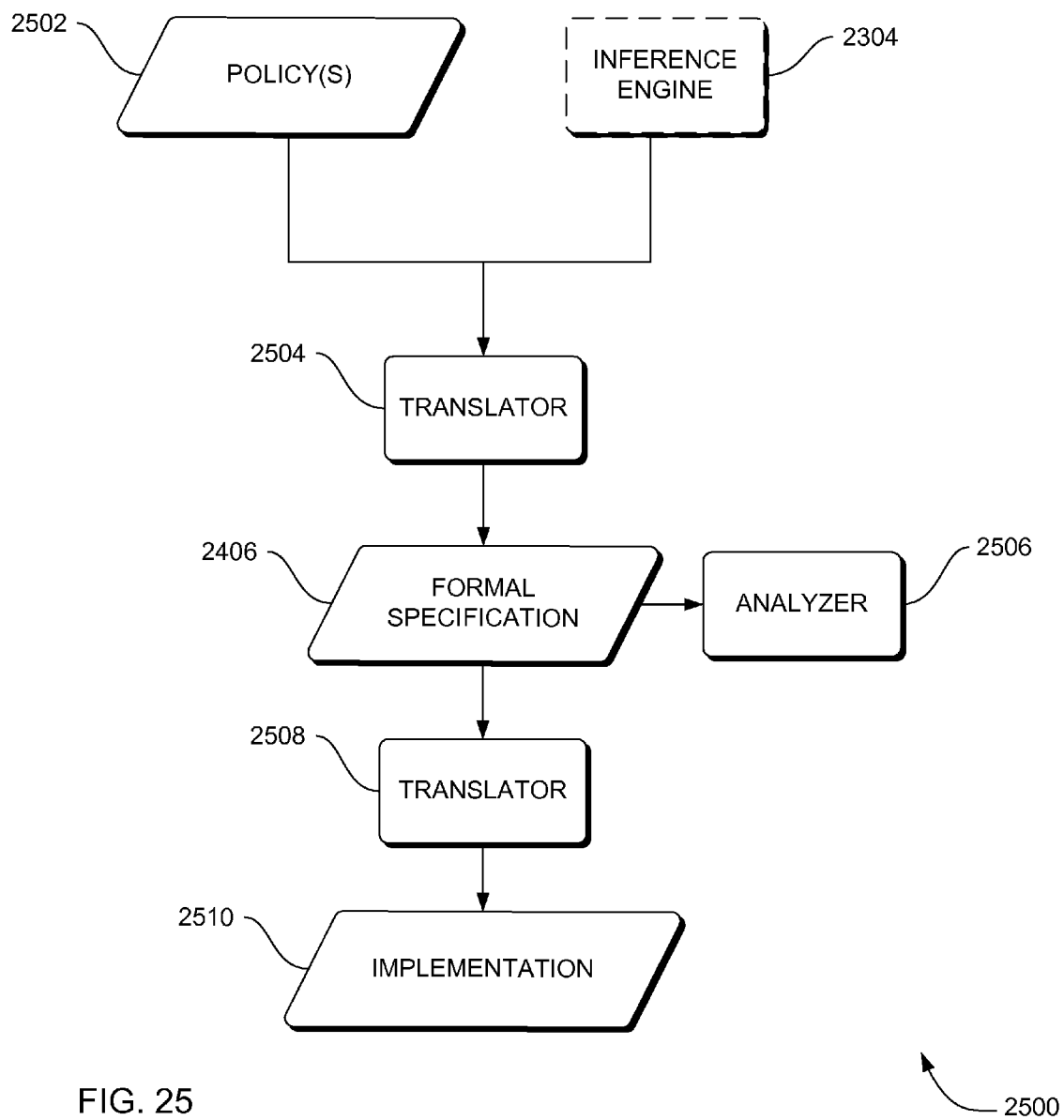
FIG. 25 is a block diagram of an apparatus to engineer an implementation from one of more policies, according to an embodiment.

Once a correction is made, then the corrected policies can be processed by system 2500 in FIG. 25 or method 1100 in FIG. 11 to derive a new implementation from the corrected policies. According to at least one embodiment, the new policy(s) 2502 can be processed by method 1000, and the iterations of method 1100 and method 1000 can repeat until there are no more flaws in the implementation 2510 generated from the policies, at which point the policies have no flaws because the implementation 2510 is provably equivalent to the policy from which it was derived. Thus, iterations of method 1100 and 1000 can provide verification/validation of the policies.

FIG. 11 is a flowchart of a method to translate one or more policies of a system to an implementation, according to an embodiment. The method 1100 can include translating 1102 policies 2502 into a formal specification 108 without human intervention.

Thereafter, method 1100 can include optionally analyzing 1104 the formal specification 108. The analyzing 1104 can be a verification/validation of the policies 2502. In some embodiments, the analyzing 1104 may determine various properties such as existence of omissions, deadlock, livelock, and race conditions in the formal specification 2406, although one skilled in the art will know that analyzing the formal specification 2406 can determine other properties not specifically listed, which are contemplated by this invention. In some embodiments, the analyzing 1104 can provide a mathematically sound analysis of the policies 2502 in a general format that doesn't require significant understanding of the specific rules of the policies 2502. Further, the analyzing 1104 can warn developers of errors in their policies 2502, such as contradictions and inconsistencies, but equally importantly it can highlight rules or sets of rules that are underspecified or over-specified and need to be corrected for the policies 2502 to operate as intended. Thus, no knowledge of the policies 2502 may be required, but instead significant analysis, verification, testing, simulation and model checking of the policies 2502 using customized tools or existing tools and techniques may be provided.

Thereafter, in some embodiments, method 1100 can include translating 1106 the formal specification to an implementation 2510. Thus, in at least one embodiment, the method 1100 can provide a method to convert policies 2502 to an implementation 2510 without involvement from a computer programmer.

Some embodiments of the method 1100 may not include invoking an automated logic engine, such as a theorem-prover, to infer the implementation 2510 from the policies 2502.

In some embodiments of method 1100, one or more policies 2502 that represent the operation of a system can be mechanically converted to a mathematically sound formal 2406 specification that can be analyzed for defects and used for various transformations including automatic translation into executable form and automatic regeneration of procedures/scripts into other notations/representations. In other embodiments, the method disclosed herein can be used to automatically reverse engineer existing implementations 2510 to formal specification 2406 from which the method can be used to produce customer-readable representations of policy(s) 2502 or machine-processable implementations 2510.

Mathematically sound techniques may be used to mechanically translate one or more policy(s) 2502 into an equivalent formal specification 2406. The formal specification 2406 may be mechanically (that is, with no manual intervention) manipulated, examined, analyzed, verified, and used in a simulation.

Figure 12:
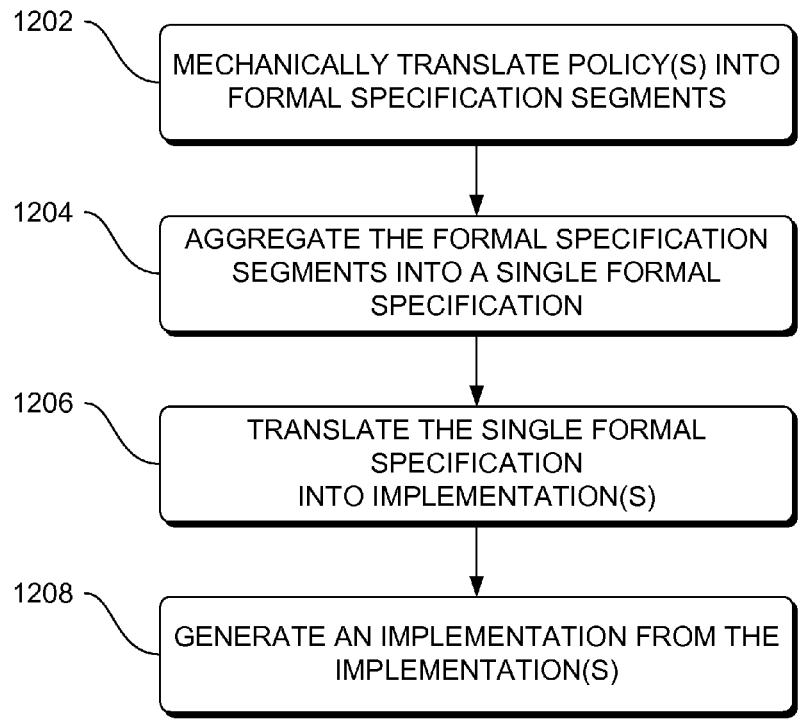
FIG. 12 is a flowchart of a method to translate each of a plurality of policies to an implementation, according to an embodiment.

FIG. 12 is a flowchart of a method 1200 to translate each of a plurality of policy(s) to an implementation, according to an embodiment. Method 1200 may solve the need in the art to generate implementations from policy with neither the time involved in manually writing the scripts, nor the mistakes that can arise in manually writing the implementation, without using an automated logic engine.

Figure 13:
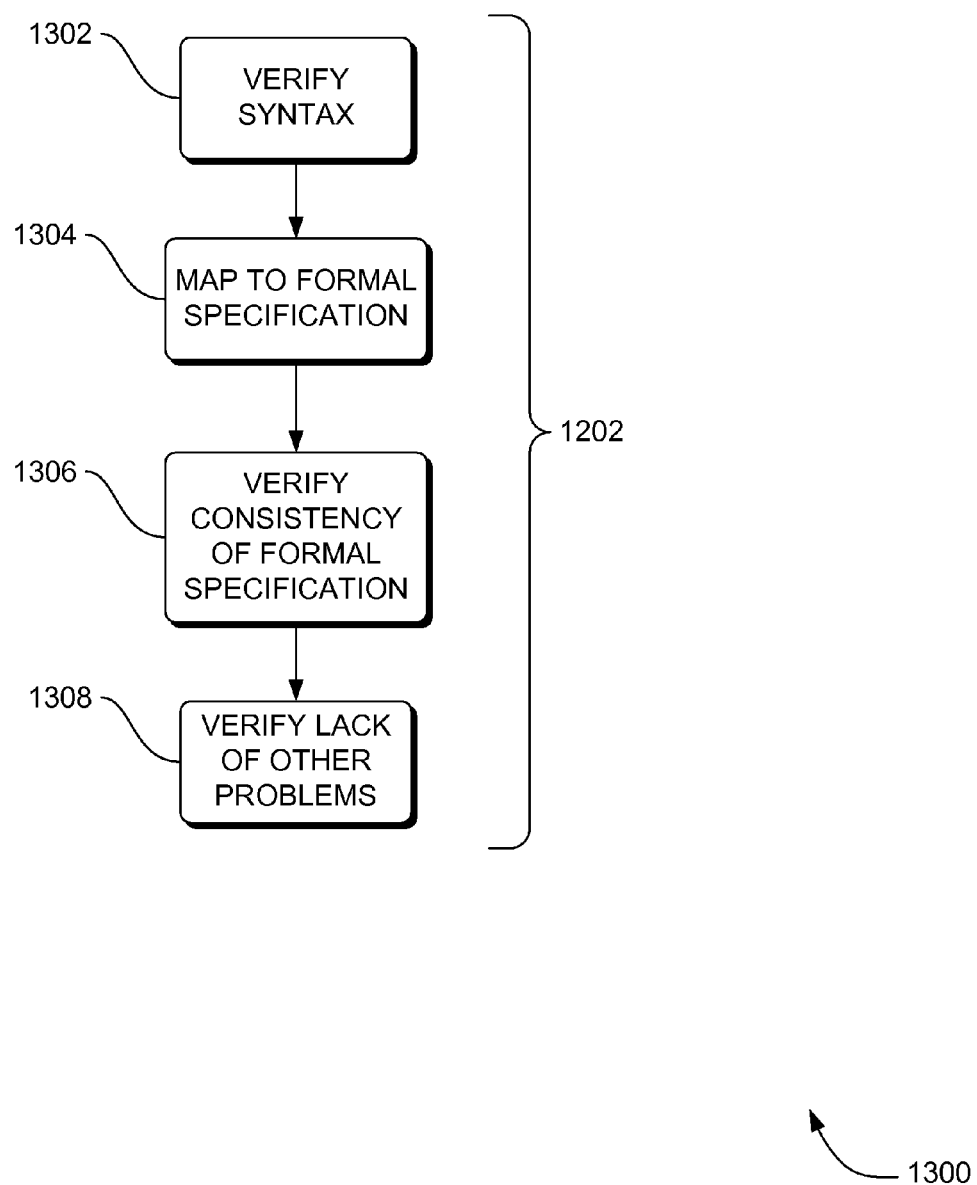
FIG. 13 is a flowchart of a method to translate policies into formal specification segments, according to an embodiment.

Method 1200 can include mechanically translating 1202 each of a plurality of policies 2502 into a plurality of formal specification segments. The translation may be done without human intervention. One embodiment of translating 1202 is shown in FIG. 13 below.

Thereafter, method 1200 can include aggregating 1204 the plurality of formal specification segments into a single formal model or specification.

Subsequently, method 1200 can include translating 1206 the single formal specification or model to multiple implementations. Thereafter, method 1200 can include generating 1208 a singular implementation from the implementations. Thus, method 1200 may provide at least one embodiment of a method to convert a policy 2502 to an application system without involvement from a computer programmer.

Some embodiments of method 1200 may not include invoking a theorem-prover or any other automated logic engine to infer the formal specification segments from the policies.

FIG. 13 is a flowchart of a method 1300 to verify the syntax of a set of scenarios, translate the set of scenarios to a formal specification, verify the consistency of the formal specification, and verify the absence of other problems in the formal specification, according to an embodiment. Method 1300 is one embodiment of translating 1202 in FIG. 12. As indicated, such translation can be accomplished without human intervention.

In some embodiments, the method 1300 can include verifying 1302 the syntax of the plurality of policies. Thereafter, method 1300 can include mapping 1304 the plurality of policies to a formal specification.

In some embodiments, method 1300 subsequently can also include verifying 1306 consistency of the formal specification. In some embodiments, method 1300 subsequently can also include verifying 1308 a lack of other problems in the formal specification. One example of other problems might be unreachable states in the process defined in the formal specification, although one skilled in the art will understand that yet other problems are contemplated.

Figure 14:
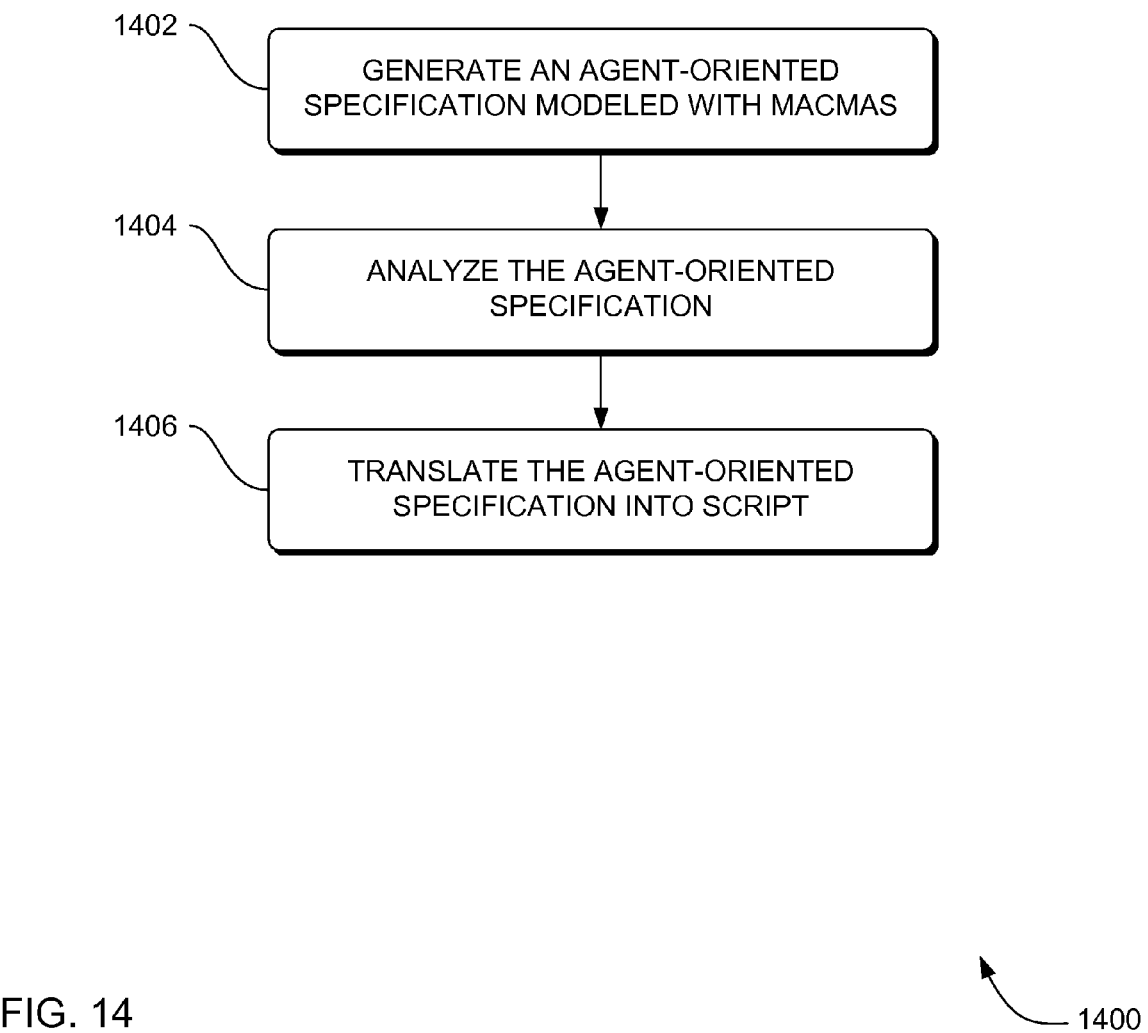
FIG. 14 is a flowchart of a method to validate/update an agent-oriented specification modeled with MaCMAS of a system, according to an embodiment.

FIG. 14 is a flowchart of a method to validate/update an agent-oriented specification modeled with methodology fragment for analyzing complex multiagent systems (MaCMAS) of a system, according to an embodiment.

Method 1400 can include generating 1402 an agent-oriented specification modeled with MaCMAS without human intervention.

Thereafter, method 1400 can include optionally analyzing 1404 the agent-oriented specification modeled with MaCMAS 102. The analyzing 1404 can be a verification/validation of the agent-oriented specification modeled with MaCMAS 102. In some embodiments, the analyzing 1404 may determine various properties such as existence of omissions, deadlock, livelock, and race conditions in the agent-oriented specification modeled with MaCMAS 102, although one skilled in the art will know that analyzing the agent-oriented specification modeled with MaCMAS 102 can determine other properties not specifically listed, which are contemplated by the systems, methods and apparatus described herein. In some embodiments, the analyzing 1404 can provide a mathematically sound analysis of the agent-oriented specification modeled with MaCMAS 102 in a general format that doesn't require significant understanding of the specific rules of the agent-oriented specification modeled with MaCMAS 102. Further, the analyzing 1404 can warn developers of errors in the agent-oriented specification modeled with MaCMAS 102, such as contradictions and inconsistencies, but equally importantly, rules or sets of rules can be highlighted that can be underspecified or over-specified and need to be corrected for the agent-oriented specification modeled with MaCMAS 102 to operate as intended. Thus, no knowledge of the agent-oriented specification modeled with MaCMAS 102 may be required, but instead significant analysis, verification, testing, simulation and model checking of the agent-oriented specification modeled with MaCMAS 102 using customized tools or existing tools and techniques is provided.

Thereafter, in some embodiments, method 1400 can include translating 1406 the agent-oriented specification modeled with MaCMAS 102 to an implementation. Thus, in at least one embodiment, the method 1400 may provide a method to convert agent-oriented specification modeled with MaCMAS 102 to an implementation without involvement from a computer programmer.

Some embodiments of the method 1400 may not include invoking an automated logic engine, such as a theorem-prover, to infer the implementation 106 from the agent-oriented specification modeled with MaCMAS 102.

In method 1400, an agent-oriented specification modeled with MaCMAS 102 that represents the operation of a system can be analyzed for defects and used for various transformations, including automatic translation into executable form and automatic regeneration of implementations/procedures/scripts into other notations/representations. In other embodiments, the method disclosed herein can be used to automatically reverse engineer existing procedures and scripts to agent-oriented specification(s) modeled with MaCMAS from which the method can be used to produce customer-readable representations of procedures/scripts or machine-processable scripts in any of various scripting languages as shown in FIG. 38 and FIG. 39.

Mathematically sound techniques can be used to mechanically translate an agent-oriented specification modeled with MaCMAS 102 into an implementation 106. The specification may be mechanically (that is, with no manual intervention) manipulated, examined, analyzed, verified, and used in a simulation.

The terms "scripts" and "procedures" can be used interchangeably. Scripts can encompass not only in instructions written programming languages (such as Python, awk, etc., as described) but also languages for physical (electro-mechanical) devices and even in constrained natural language instructions or actions or checklists to be carried out by human beings such as, but not limited to, an astronaut.

Scripting languages can be computer programming languages initially used only for simple, repeated actions. The name "scripting languages" comes from a written script such as a screenplay, where dialog can be repeated verbatim for every performance. Early script languages were often called batch languages or job control languages. A script can be interpreted rather than compiled, but not always. Scripting languages are also known as scripting programming languages or script languages.

Many such languages can be quite sophisticated and have been used to write elaborate programs, which are often still called scripts even though the applications of scripts are well beyond automating simple computer tasks. A script language can be found at almost every level of a computer system. Besides being found at the level of the operating system, scripting languages appear in computer games, web applications, word processing documents, network software and more. Scripting languages favor rapid development over efficiency of execution; scripting languages can be implemented with interpreters rather than compilers; and scripting languages can be effective in communication with program components written in other languages.

Many scripting languages emerged as tools for executing one-off tasks, particularly in system administration. One way of looking at scripts can be as "glue" that puts several components together, and thus scripts can be widely used for creating graphical user interfaces or executing a series of commands that might otherwise have to be entered interactively through a keyboard at the command prompt. The operating system usually can offer some type of scripting language by default, widely known as a shell script language.

Scripts can be stored in plain text form (as ASCII) and interpreted, or compiled each time prior to being invoked.

Some scripting languages are designed for a specific domain, but often writing more general programs in that language is possible. In many large-scale projects, a scripting language and a lower level programming language can be used together, each lending particular strengths to solve specific problems. Scripting languages are often designed for interactive use, having many commands that can execute individually, and often have very high level operations (for example, in the classic UNIX shell (sh), most operations are programs.

Such high level commands simplify the process of writing code. Programming features such as automatic memory management and bounds checking can be taken for granted. In a 'lower level' or non-scripting language, managing memory and variables and creating data structures tends to consume more programmer effort and lines of code to complete a given task. The additional effort is often worth the benefit of the resulting fine-grained control. The scripter typically has less flexibility to optimize a program for speed or to conserve memory.

For the reasons noted above, programming in a scripting language can be faster, and script files can be typically much smaller than programs with equivalent functionality in conventional programming languages such as C.

Scripting languages fall into eight primary categories: Job control languages and shells, macro languages, application-specific languages, web programming languages, text processing languages, general-purpose dynamic languages, extension/embeddable languages, and extension/embeddable languages.

In regards to job control scripting languages and shells, a major class of scripting languages has grown out of the automation of job control—starting and controlling the behavior of system programs. Many of these languages' interpreters double as command-line interfaces, such as the Unix shell or the MS-DOS COMMAND.COM. Others, such as AppleScript, add scripting capability to computing environments lacking a command-line interface. Examples of job control scripting languages and shells include AppleScript, ARexx (Amiga Rexx), bash, csh, DCL, 4NT, JCL, ksh, MS-DOS batch, Windows PowerShell, REXX, sh, and Winbatch.

In regards to macro scripting languages, from the advent of Graphical user interfaces there arose a specialized kind of scripting language for controlling a computer. These languages, usually called Macro languages, interact with the same graphic windows, menus, buttons and such that a person does. Macro language scripts can be used to automate repetitive actions or configure a standard state. Macro language scripts can be used to control any application running on a GUI-based computer, but in practice the support for such languages depend on the application and operating system. Examples of macro scripting languages include AutoHotkey, AutoIt, and Expect.

In regards to application-specific scripting languages, many large application programs include an idiomatic scripting language tailored to the needs of the application user. Likewise, many computer game systems use a custom scripting language to express the programmed actions of non-player characters and the game environment, which can be designed for a single application and, while application-specific scripting languages can superficially resemble a specific general-purpose language (e.g. QuakeC, modeled after C), application-specific scripting languages have custom features which distinguish the application-specific scripting languages. Examples of application-specific scripting languages include, Action Code Script, ActionScript, AutoLISP, BlobbieScript, Emacs Lisp, HyperTalk, IRC script, Lingo, Cana Embedded Language, mIRC script, NWscript, QuakeC, UnrealScript, Visual Basic for Applications, VBScript, and ZZT-oop.

In regards to web programming scripting languages, an important type of application-specific scripting language can be one used to provide custom functionality to internet web pages. Web programming scripting languages can be specialized for Internet communication and use web browsers as a user interface. However, most modern web programming scripting languages are powerful enough for general-purpose programming. Examples of web programming scripting language include ColdFusion (Application Server), Lasso, Miva, and SMX.

In regards to text processing scripting languages, the processing of text-based records is one of the oldest uses of scripting languages. Many text processing languages, such as Unix's awk and, later, PERL, were originally designed to aid system administrators in automating tasks that involved Unix text-based configuration and log files. PERL is a special case—originally intended as a report-generation language, PERL has grown into a full-fledged applications language. Examples of text processing scripting languages include awk, PERL, sed and XSLT.

In regards to general-purpose dynamic scripting languages, some languages, such as PERL, began as scripting languages but developed into programming languages suitable for broader purposes. Other similar languages—frequently interpreted, memory-managed, dynamic—have been described as "scripting languages" for these similarities, even if general-purpose dynamic scripting languages are more commonly used for applications programming. Examples of general-purpose dynamic scripting languages include APL, Dylan, Groovy, MUMPS (M), newLISP, PERL, PHP, Python, Ruby, Scheme, Smalltalk, SuperCard, and Tool Command Language (TCL). TCL was created as an extension language but has come to be used more frequently as a general purpose language in roles similar to Python, PERL, and Ruby.

In regards to extension/embeddable languages, a small number of languages have been designed for the purpose of replacing application-specific scripting languages, by being embeddable in application programs. The application programmer (working in C or another systems language) includes "hooks" where the scripting language can control the application. These languages serve the same purpose as application-specific extension languages, but with the advantage of allowing some transfer of skills from application to application. Examples of extension/embeddable script languages include Ch (C/C++interpreter), ECMAScript a.k.a. DMDScript, JavaScript, JScript, GameMonkeyScript, Guile, ICI, Squirrel, Lua, TCT, and REALbasic Script (RBScript).

JavaScript began as and primarily still is a language for scripting inside of web browsers, however, the standardization of the language as ECMAScript has made JavaScript widely adopted as a general purpose embeddable language.

Other scripting languages include BeanShell (scripting for Java), CobolScript, Escapade (server side scripting), Euphoria, F-Script, Ferite, Groovy, Gui4Cli, To, KiXtart, Mondrian, Object REXX, Pike, Pliant, REBOL, ScriptBasic, Shorthand Language, Simkin, Sleep, StepTalk, and Visual DialogScript.

Figure 15:
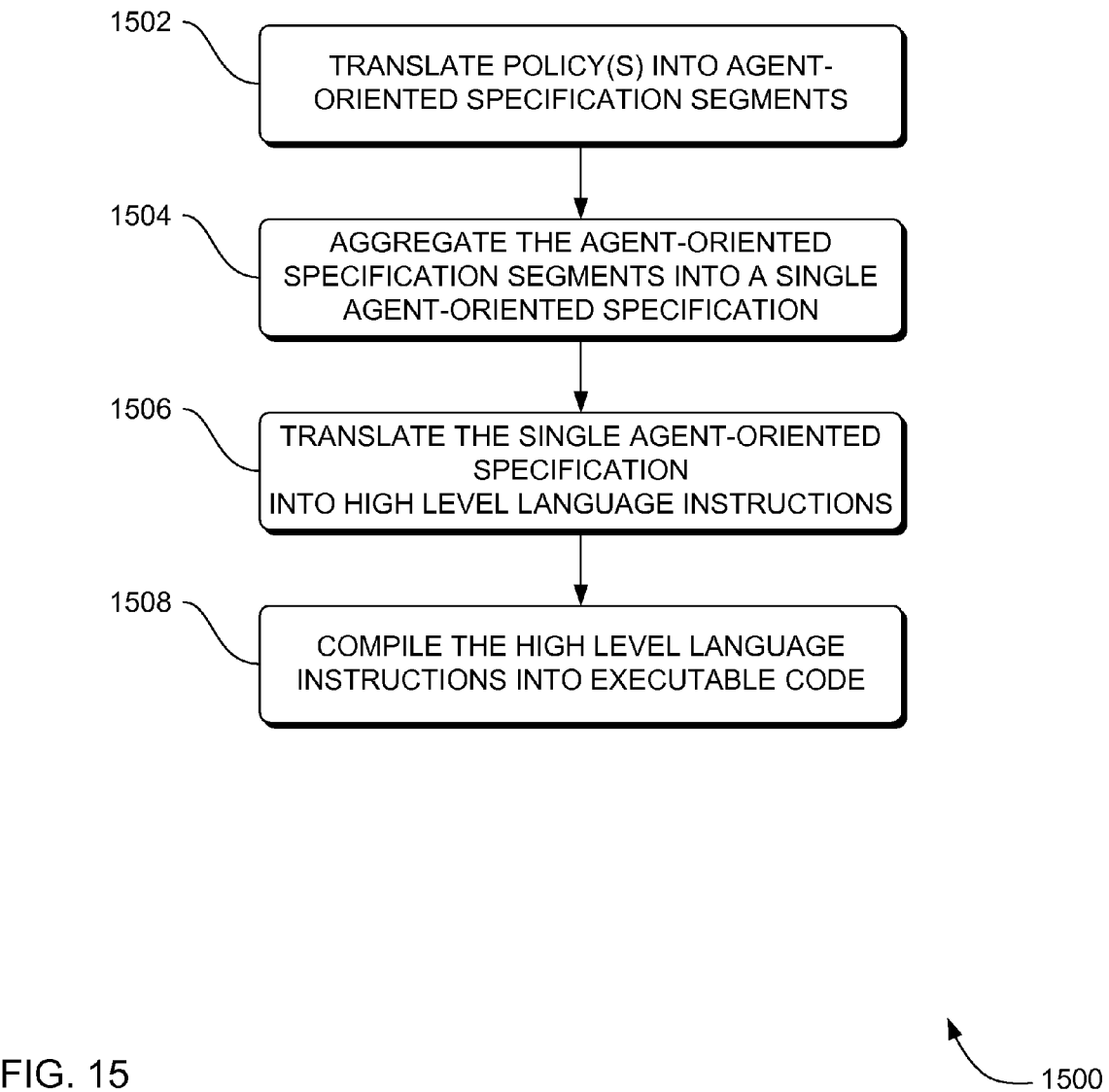
FIG. 15 is a flowchart of a method to generate an executable system from a policy, using an intermediate agent-oriented specification, according to an embodiment.

FIG. 15 is a flowchart of a method 1500 to generate an executable system from a policy, using an intermediate agent-oriented specification modeled with MaCMAS, according to an embodiment. Method 1500 may solve the need in the art to generate executable computer instructions from policy with neither the time nor the mistakes involved in manually writing the executable computer instructions, without using a theorem-prover.

Figure 16:
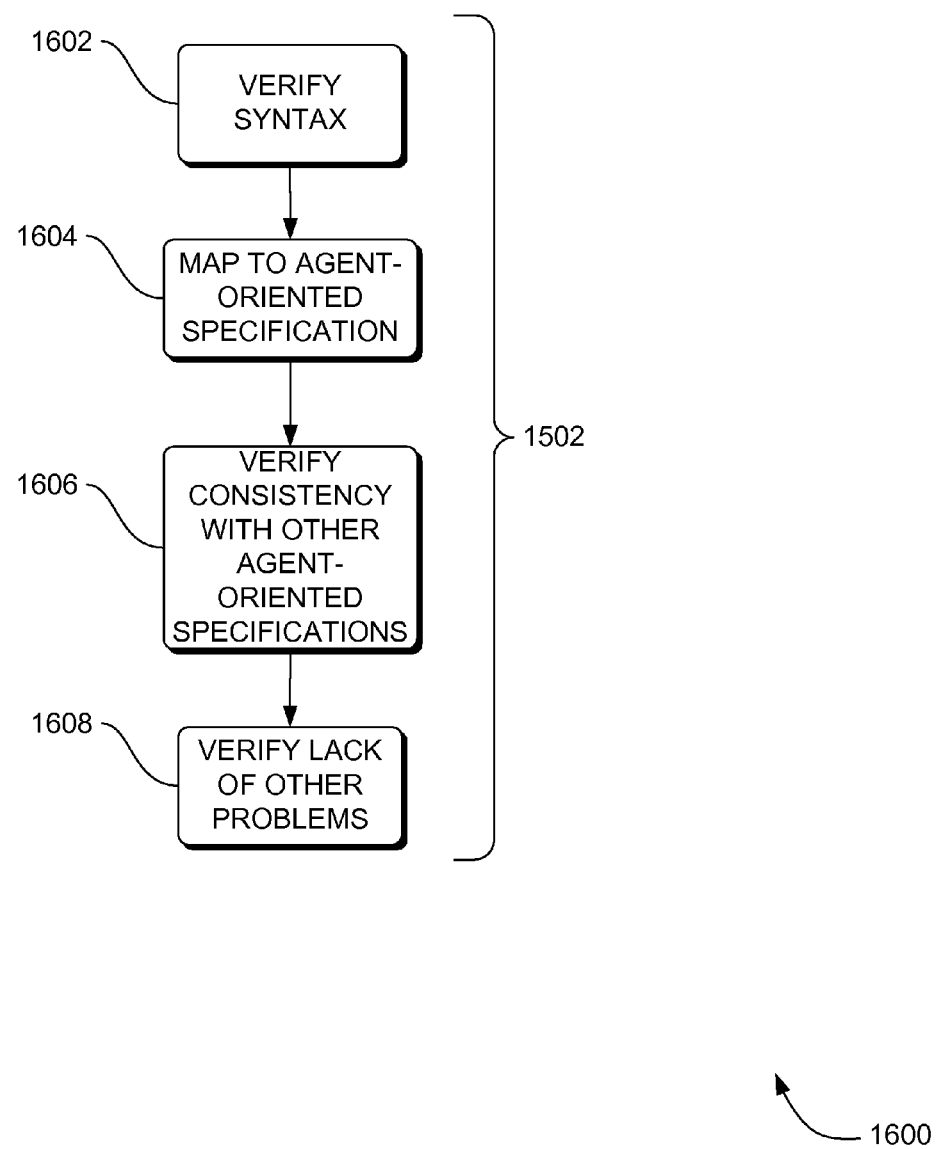
FIG. 16 is a flowchart of a method to translate policies into agent-oriented specification segments, according to an embodiment.

Method 1500 may include translating 1502 mechanically each of a plurality of requirements of the policy to a plurality of agent-oriented specification segments that can be modeled with MaCMAS 102. In some embodiments, the translating 1502 can include inferring the agent-oriented specification segments modeled with MaCMAS 102 from the policy. One embodiment of translating 1502 is shown in FIG. 16 below.

In some embodiments, the agent-oriented specification modeled with MaCMAS 102 can be translated in a process algebra notation. Those embodiments may satisfy the need in the art for an automated, mathematics-based process for policy validation that does not require large computational facilities.

Thereafter, method 1500 may include aggregating 1504 the plurality of agent-oriented specification segments modeled with MaCMAS 102 into a single agent-oriented specification modeled with MaCMAS.

Subsequently, method 1500 may include translating 1506 the single agent-oriented specification modeled with MaCMAS to instructions encoded in the Java computer language or some other high-level computer programming language, or some other implementation. Thereafter, method 1500 may include compiling 1508 the instructions encoded in the Java computer language into a file of executable instructions.

In some embodiments, method 1500 may include deploying and invoking the executable instructions, which can provide a method to convert policies to an application system without involvement from a computer programmer.

In some embodiments, method 1500 may not include invoking a theorem-prover to infer the agent-oriented specification segments modeled with MaCMAS 102 from the policy.

FIG. 16 is a flowchart of a method 1600 to verify the syntax of a set of scenarios, translate the set of scenarios to an agent-oriented specification segments modeled with MaCMAS, verify the consistency of the agent-oriented specification segments modeled with MaCMAS, and verify the absence of other problems in the agent-oriented specification segments modeled with MaCMAS, according to an embodiment. Method 1600 is one embodiment of translating 1502 in FIG. 15.

Method 1600 may include verifying 1602 the syntax of the plurality of requirements of the policy. Thereafter, method 1600 may include mapping 1604 the plurality of requirements of the policy to an agent-oriented specification modeled with MaCMAS 102.

In some embodiments, method 1600 subsequently may also include verifying 1606 consistency of the agent-oriented specification modeled with MaCMAS 102 with at least one other agent-oriented specification modeled with MaCMAS 102. In some embodiments, method 1600 may subsequently also include verifying 1608 lack of other problems in the agent-oriented specification modeled with MaCMAS 102. One example of other problems might be unreachable states in the process defined in the agent-oriented specification modeled with MaCMAS 102.

Figure 17:
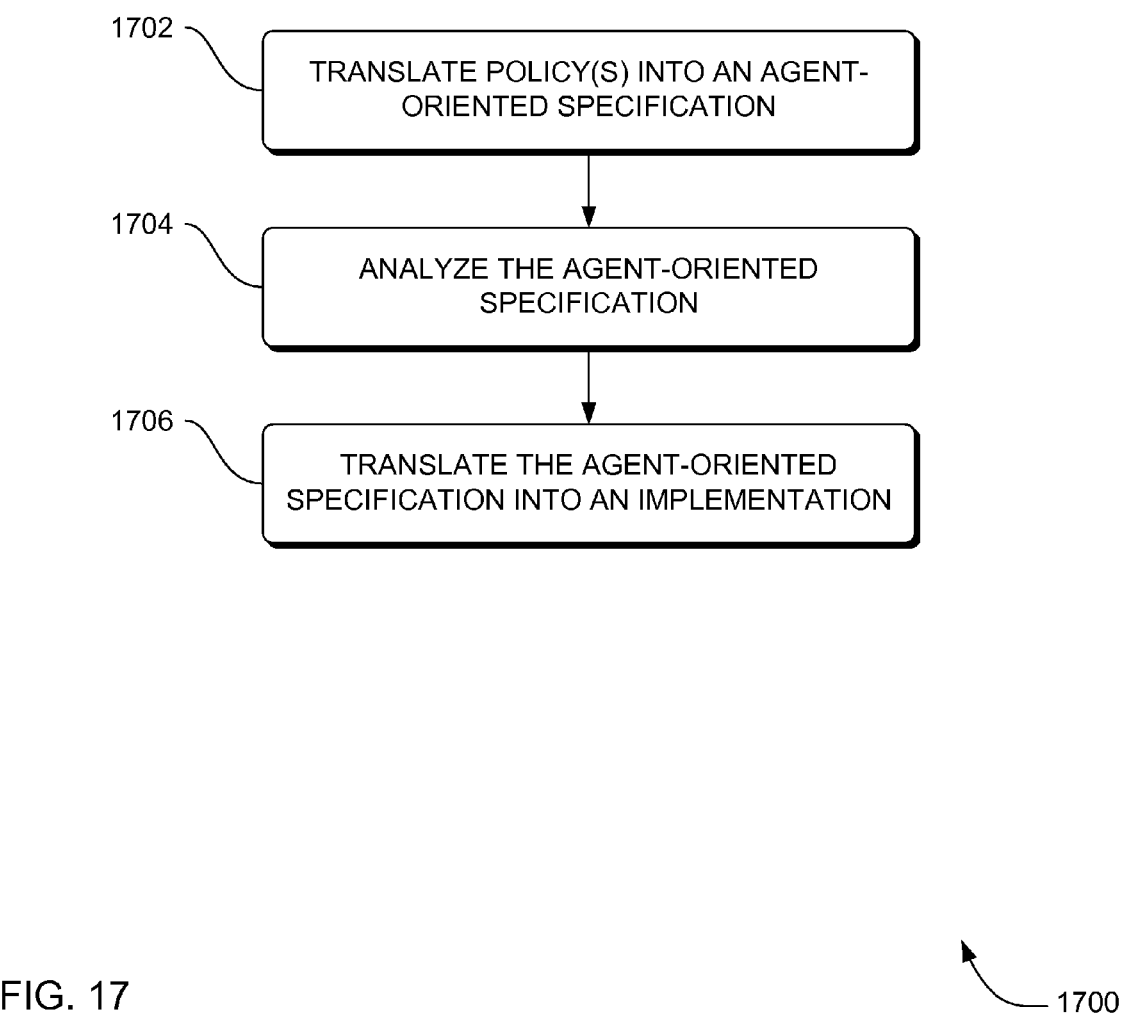
FIG. 17 is a flowchart of a method to translate one or more policies of a system to an implementation, using an intermediate agent-oriented specification modeled with MaCMAS according to an embodiment.

FIG. 17 is a flowchart of a method to translate one or more policies of a system to an implementation, using an intermediate agent-oriented specification modeled with MaCMAS, according to an embodiment. The method 1700 can include translating 1702 policies into an agent-oriented specification modeled with MaCMAS 102 without human intervention.

Thereafter, method 1700 can include optionally analyzing 1704 the agent-oriented specification modeled with MaCMAS 102. The analyzing 1704 can be a verification/validation of the policies. In some embodiments, the analyzing 1704 can determine various properties such as existence of omissions, deadlock, livelock, and race conditions in the agent-oriented specification modeled with MaCMAS, although one skilled in the art will know that analyzing the agent-oriented specification modeled with MaCMAS can determine other properties not specifically listed, which are contemplated by the systems, methods and apparatus described herein. In some embodiments, the analyzing 1704 can provide a mathematically sound analysis of the policies in a general format that doesn't require significant understanding of the specific rules of the policies. Further, the analyzing 1704 can warn developers of errors in the policies, such as contradictions and inconsistencies, but equally importantly the warning can highlight rules or sets of rules that can be underspecified or over-specified and need to be corrected for the policies to operate as intended. Thus, no knowledge of the policies may be required, but instead significant analysis, verification, testing, simulation and model checking of the policies using customized tools or existing tools and techniques can be provided.

Thereafter, in some embodiments, method 1700 can include translating 1706 the formal specification to an implementation 106. Thus, in at least one embodiment, the method 1700 can provide a method to convert policies to an implementation 106 without involvement from a computer programmer.

Some embodiments of the method 1700 may not include invoking an automated logic engine, such as a theorem-prover, to infer the implementation 106 from the policies.

In method 1700, one or more policies that represent the operation of a system can be mechanically converted to a mathematically sound agent-oriented specification modeled with MaCMAS 102 that can be analyzed for defects and used for various transformations including automatic translation into executable form and automatic regeneration of procedures/scripts into other notations/representations. In other embodiments, the method disclosed herein can be used to automatically reverse engineer existing implementations 106 to policies from which the method can be used to produce customer-readable representations of policy(s) or machine-processable implementations 106.

Mathematically sound techniques can be used to mechanically translate one or more policy(s) into an equivalent implementation 106, using an intermediate agent-oriented specification modeled with MaCMAS. The agent-oriented specification modeled with MaCMAS may be mechanically (that is, with no manual intervention) manipulated, examined, analyzed, verified, and used in a simulation.

Figure 18:
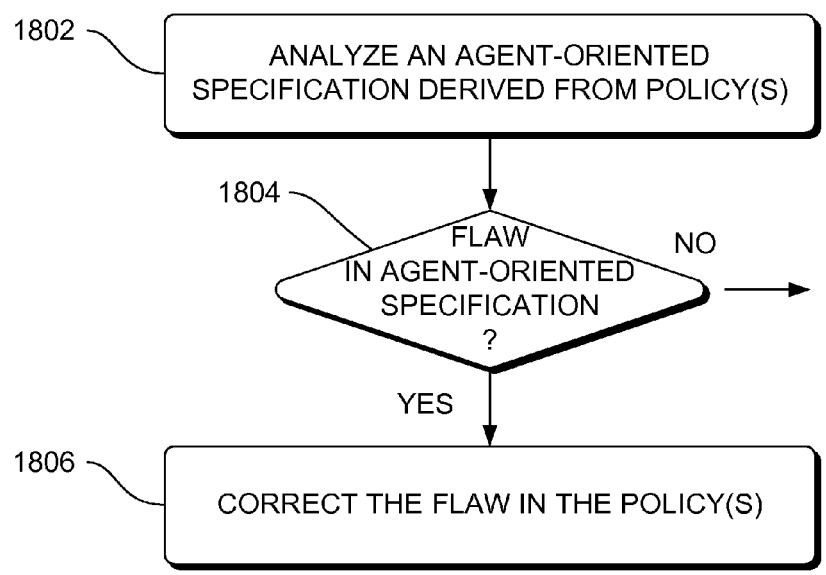
FIG. 18 is a flowchart of a method to validate/update an agent-oriented specification modeled with MaCMAS, according to an embodiment.

FIG. 18 is a flowchart of a method 1800 to validate/update an agent-oriented specification modeled with MaCMAS, according to an embodiment. Method 1800 may solve the need in the prior art to reduce errors in implementations.

Method 1800 can include analyzing 1802 an agent-oriented specification modeled with MaCMAS, such as MaCMAS 102, in which the agent-oriented specification modeled with MaCMAS has been previously derived from the policies of the system.

In some embodiments, the analyzing 1802 can include applying mathematical logic to the agent-oriented specification modeled with MaCMAS in order to identify a presence or absence of mathematical properties of the agent-oriented specification modeled with MaCMAS. Mathematical properties of the agent-oriented specification modeled with MaCMAS that can be determined by applying mathematical logic to the agent-oriented specification modeled with MaCMAS can include, by way of example:

1) whether or not the agent-oriented specification modeled with MaCMAS implies a system execution trace that includes a deadlock condition, and 2) whether or not the agent-oriented specification modeled with MaCMAS implies a system execution trace that includes a livelock condition.

The above two properties can be domain independent. One skilled in the art will note, however, that there can be many other possible flaws that could be detected through the analysis of the agent-oriented specification modeled with MaCMAS, many or even most of which might be domain dependent. An example of a domain dependent property can be represented by the operational principle that "closing a door that is not open is not a valid action." The domain dependent property example can be applicable in the domain of the Hubble Space Telescope on-orbit repair.

Thereafter, a determination 1804 can be made as to whether or not the analyzing 1802 indicates that the agent-oriented specification modeled with MaCMAS contains a flaw. If a flaw does exist, then the policies can be corrected 1806 accordingly.

Figure 19:
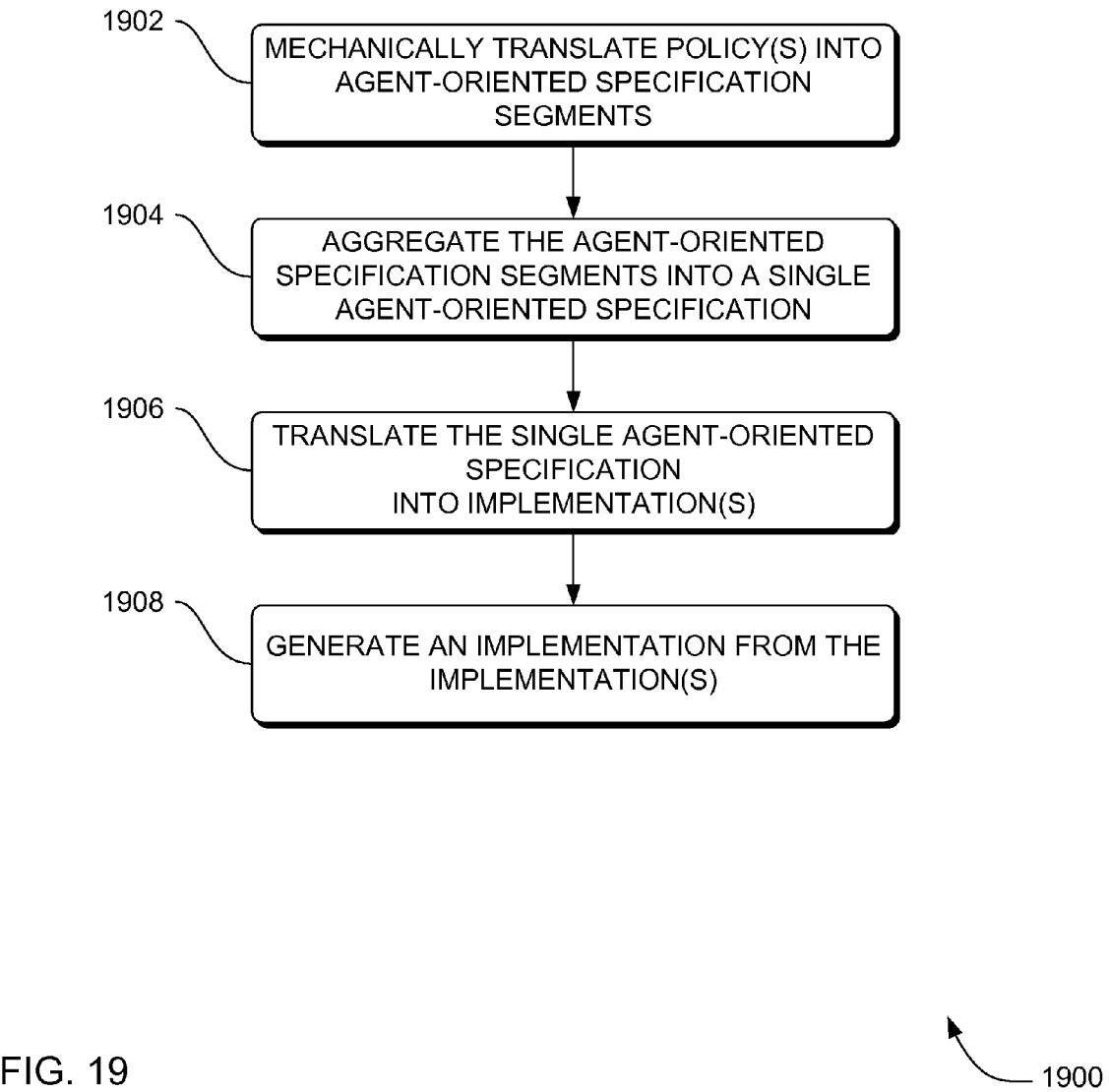
FIG. 19 is a flowchart of a method to translate each of a plurality of policy(s) into an implementation, with intermediate agent-oriented specification segments modeled with MaCMAS, according to an embodiment.

Once a correction is made, then the corrected policies can be processed by method 1500 in FIG. 15, method 1800 in FIG. 18 or method 1900 in FIG. 19 to derive a new implementation from the corrected policies. According to at least one embodiment, the new policy(s) can be processed by method 1700, and the iterations of method 1700 and method 1800 can repeat until no more flaws exist in the implementation 106 generated from the policies, at which point the policies have no flaws because the implementation 106 can be provably equivalent to the policy from which the implementation 106 was derived. Thus, iterations of method 1700 and 1800 can provide verification/validation of the policies.

FIG. 19 is a flowchart of a method 1900 to translate each of a plurality of policy(s) into an implementation, with intermediate agent-oriented specification segments modeled with MaCMAS, according to an embodiment. Method 1900 may solve the need in the art to generate implementations from policy with neither the time nor the mistakes involved in manually writing the agent-oriented specification modeled with MaCMAS, without using an automated logic engine.

Figure 20:
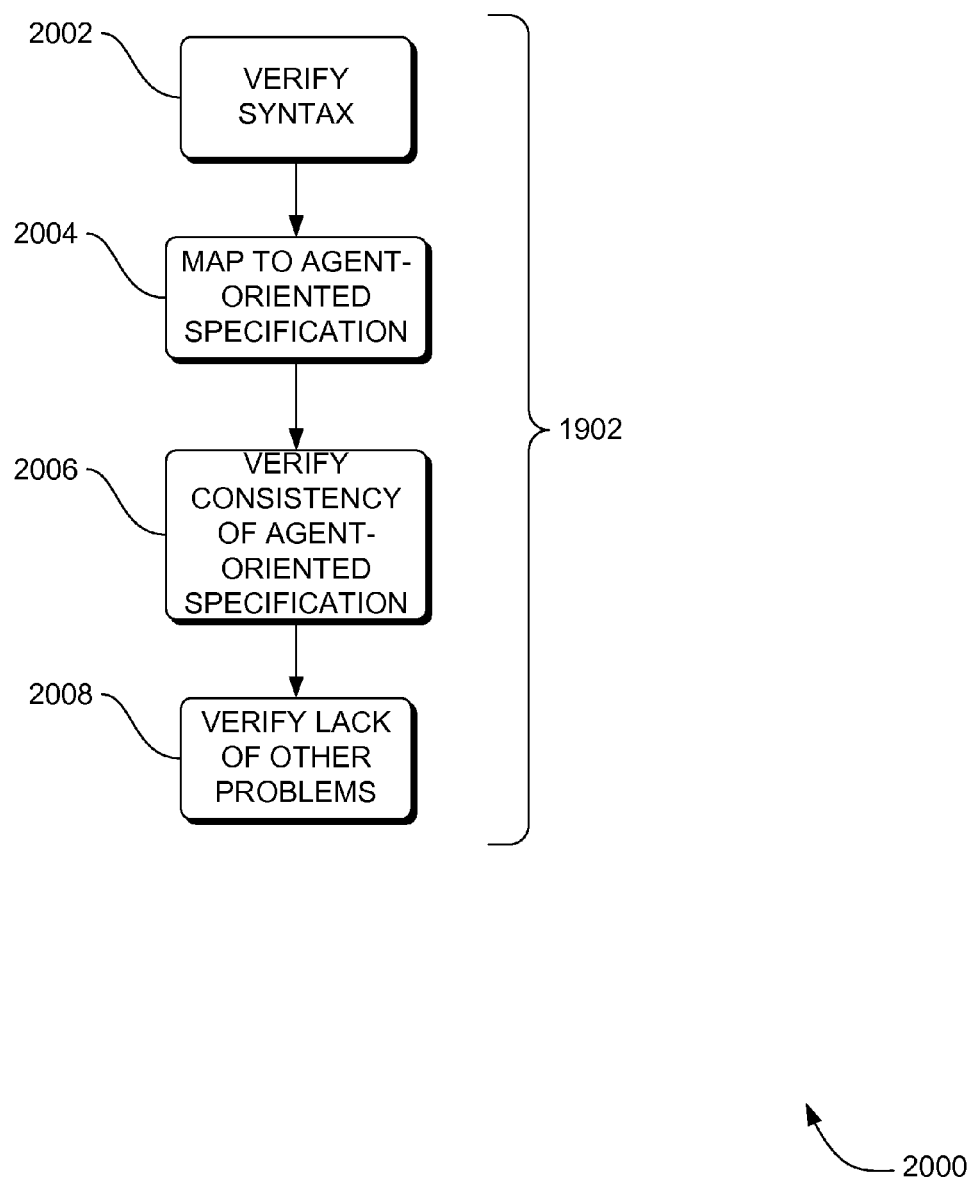
FIG. 20 is a flowchart of a method to translate policies into agent-oriented specification segments, according to an embodiment.

Method 1900 can include mechanically translating 1902 each of a plurality of policies to a plurality of segments of agent-oriented specification modeled with MaCMAS. The translation can be done without human intervention. One embodiment of translating 1902 is shown in FIG. 20 below.

Thereafter, method 1900 can include aggregating 1904 the plurality of agent-oriented specification segments modeled with MaCMAS into a single agent-oriented specification modeled with MaCMAS.

Subsequently, method 1900 can include translating 1906 the single agent-oriented specification modeled with MaCMAS to multiple implementations. Thereafter, method 1900 can include generating 1908 a singular implementation from the implementations. Thus, method 1900 can provide an embodiment of a method to convert a policy 102 to an application system without involvement from a computer programmer.

In some embodiments, method 1900 may not include invoking a theorem-prover or any other automated logic engine to infer the agent-oriented specification segments modeled with MaCMAS from the policies.

FIG. 20 is a flowchart of a method 2000 to verify syntax of a set of policies, translate the set of policies to an agent-oriented specification modeled with MaCMAS, verify the consistency of the agent-oriented specification modeled with MaCMAS, and verify the absence of other problems in the agent-oriented specification modeled with MaCMAS, according to an embodiment. Method 2000 can be one embodiment of translating 1802 in FIG. 18 and translating 1902 in FIG. 19. As indicated, such translation can be accomplished without human intervention.

In some embodiments, the method 2000 can include verifying 2002 the syntax of the plurality of policies. Thereafter, method 2000 can include mapping 2004 the plurality of policies to an agent-oriented specification modeled with MaCMAS.

In some embodiments, method 2000 subsequently can also include verifying 2006 consistency of the agent-oriented specification modeled with MaCMAS. In some embodiments, method 2000 subsequently may also include verifying 2008 a lack of other problems in the agent-oriented specification modeled with MaCMAS. One example of other problems can be unreachable states in the process defined in the formal specification, although one skilled in the art will understand that yet other problems are contemplated.

Hardware and Operating Environment

FIG. 21 is a block diagram of a hardware and operating environment 2100 in which different embodiments can be practiced. The description of FIG. 21 can provide an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks can be linked through a communications network. Program modules can be located in both local and remote memory storage devices in a distributed computing environment. Some embodiments can also be at least partially implemented in a quantum mechanical computing and communications environment.

Computer 2102 may include a processor 2104, commercially available from Intel, Motorola, Cyrix and others. Computer 2102 may also include random-access memory (RAM) 2106, read-only memory (ROM) 2108, and one or more mass storage devices 2110, and a system bus 2112, that operatively couples various system components to the processing unit 2104. The memory 2106, 2108, and mass storage devices, 2110, are types of computer-accessible media. Mass storage devices 2110 can be more specifically types of nonvolatile computer-accessible media and can include one or more hard disk drives, floppy disk drives, optical disk drives, and tape cartridge drives. The processor 2104 can execute computer programs stored on the computer-accessible media.

Computer 2102 can be communicatively connected to the Internet 2114 (or any communications network) via a communication device 2116. Internet 2114 connectivity is well known within the art. In one embodiment, a communication device 2116 can be a modem that responds to communication drivers to connect to the Internet via what is known in the art as a "dial-up connection." In another embodiment, a communication device 2116 can be an Ethernet® or similar hardware network card connected to a local-area network (LAN) that can be connected to the Internet via what is known in the art as a "direct connection" (e.g., T1 line, etc.).

A user can enter commands and information into the computer 2102 through input devices such as a keyboard 2118 or a pointing device 2120. The keyboard 2118 can permit entry of textual information into computer 2102, as known within the art, and embodiments are not limited to any particular type of keyboard. Pointing device 2120 can permit the control of the screen pointer provided by a graphical user interface (GUI) of operating systems such as versions of Microsoft Windows®. Embodiments are not limited to any particular pointing device 2120. Such pointing devices may include mice, touch pads, trackballs, remote controls and point sticks. Other input devices (not shown) can include a microphone, joystick, game pad, gesture-recognition or expression recognition devices, or the like.

In some embodiments, computer 2102 can be operatively coupled to a display device 2122. Display device 2122 can be connected to the system bus 2112. Display device 2122 can permit the display of information, including computer, video and other information, for viewing by a user of the computer. Embodiments are not limited to any particular display device 2122. Such display devices may include cathode ray tube (CRT) displays (monitors), as well as flat panel displays such as liquid crystal displays (LCD's) or image and/or text projection systems or even holographic image generation devices. In addition to a monitor, computers may typically include other peripheral input/output devices such as printers (not shown). Speakers 2124 and 2126 (or other audio device) can provide audio output of signals. Speakers 2124 and 2126 can also be connected to the system bus 2112.

Computer 2102 may also include an operating system (not shown) that can be stored on the computer-accessible media RAM 2106, ROM 2108, and mass storage device 2110, and can be executed by the processor 2104. Examples of operating systems may include Microsoft Windows®, Apple MacOS®, Linux®, UNIX®. Examples are not limited to any particular operating system, however, and the construction and use of such operating systems are well known within the art.

Embodiments of computer 2102 are not limited to any type of computer 2102. In varying embodiments, computer 2102 may comprise a PC-compatible computer, a MacOS®-compatible computer, a Linux®-compatible computer, or a UNIX®-compatible computer. The construction and operation of such computers are well known within the art.

Computer 2102 can be operated using at least one operating system to provide a graphical user interface (GUI) including a user-controllable pointer. Computer 2102 can have at least one web browser application program executing within at least one operating system, to permit users of computer 2102 to access an intranet, extranet or Internet world-wide-web pages as addressed by Universal Resource Locator (URL) addresses. Examples of browser application programs include Netscape Navigator® and Microsoft Internet Explorer®.

The computer 2102 can operate in a networked environment using logical connections to one or more remote computers, such as remote computer 2128. These logical connections can be achieved by a communication device coupled to, or a part of, the computer 2102. Embodiments are not limited to a particular type of communications device. The remote computer 2128 can be another computer, a server, a router, a network PC, a client, a peer device or other common network node. The logical connections depicted in FIG. 21 may include a local-area network (LAN) 2130 and a wide-area network (WAN) 2132. Such networking environments are commonplace in offices, enterprise-wide computer networks, intranets, extranets and the Internet.

When used in a LAN-networking environment, the computer 2102 and remote computer 2128 can be connected to the local network 2130 through network interfaces or adapters 2134, which can be one type of communications device 2116. Remote computer 2128 may also include a network device 2136. When used in a conventional WAN-networking environment, the computer 2102 and remote computer 2128 can communicate with a WAN 2132 through modems (not shown). The modem, which can be internal or external, may be connected to the system bus 2112. In a networked environment, program modules depicted relative to the computer 2102, or portions thereof, can be stored in the remote computer 2128.

Computer 2102 may also includes power supply 2138. Each power supply can be a battery.

Figure 22:
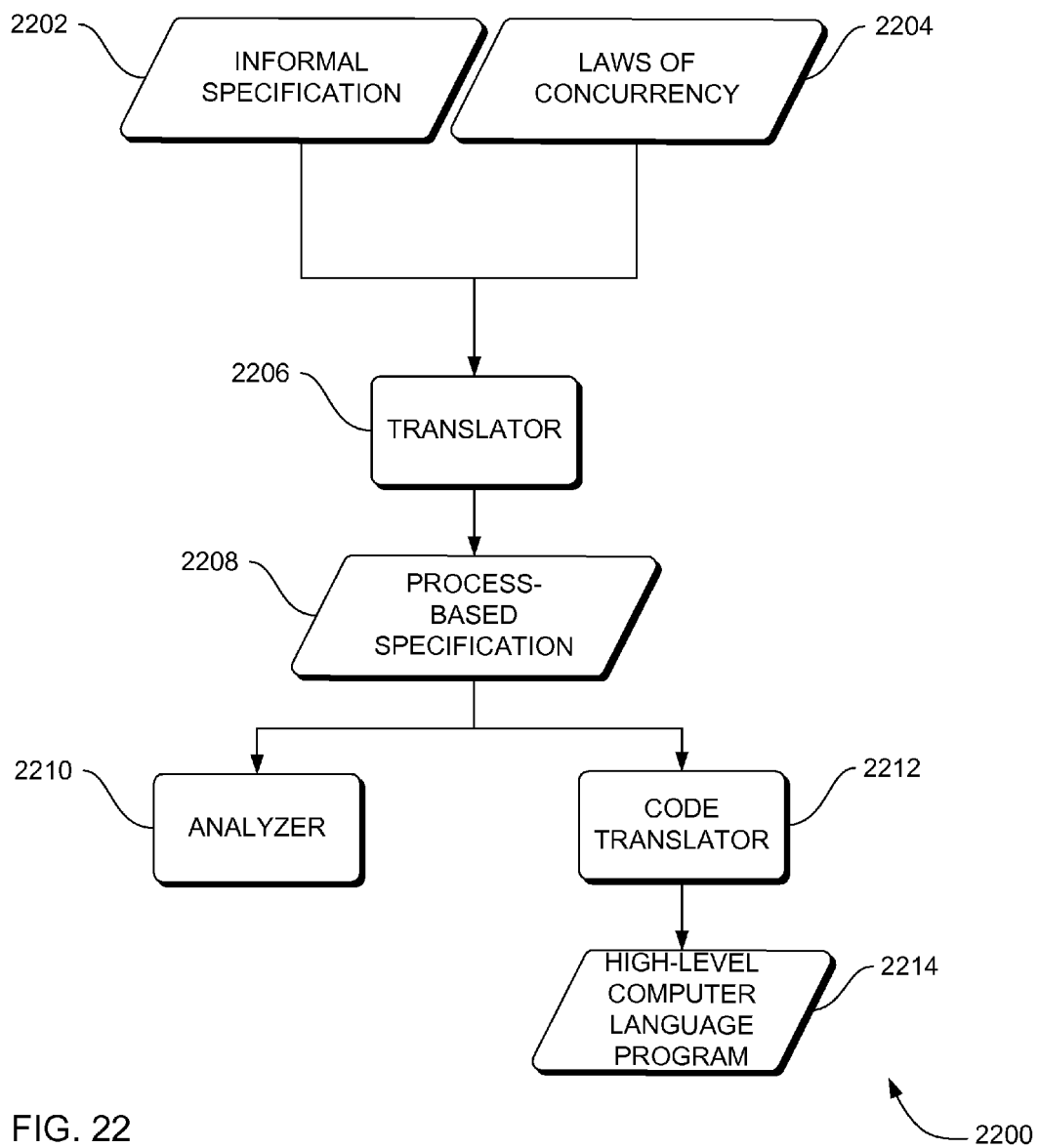
FIG. 22 is a block diagram of an apparatus to generate a high-level computer source code program from an informal specification, according to an embodiment.
Figure 23:
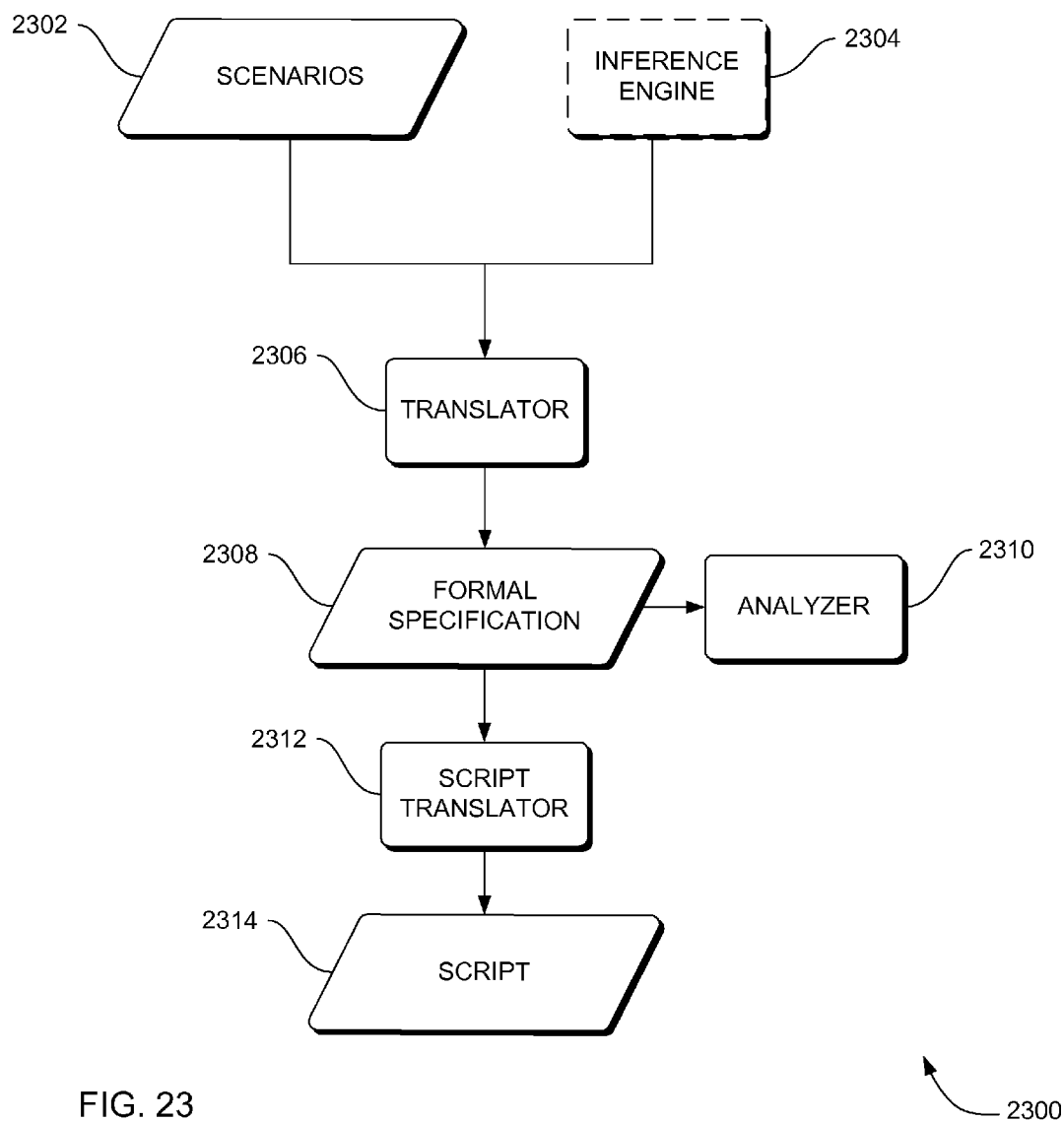
FIG. 23 is a block diagram of an apparatus to engineer a script or procedure from scenarios, according to an embodiment.
Figure 24:
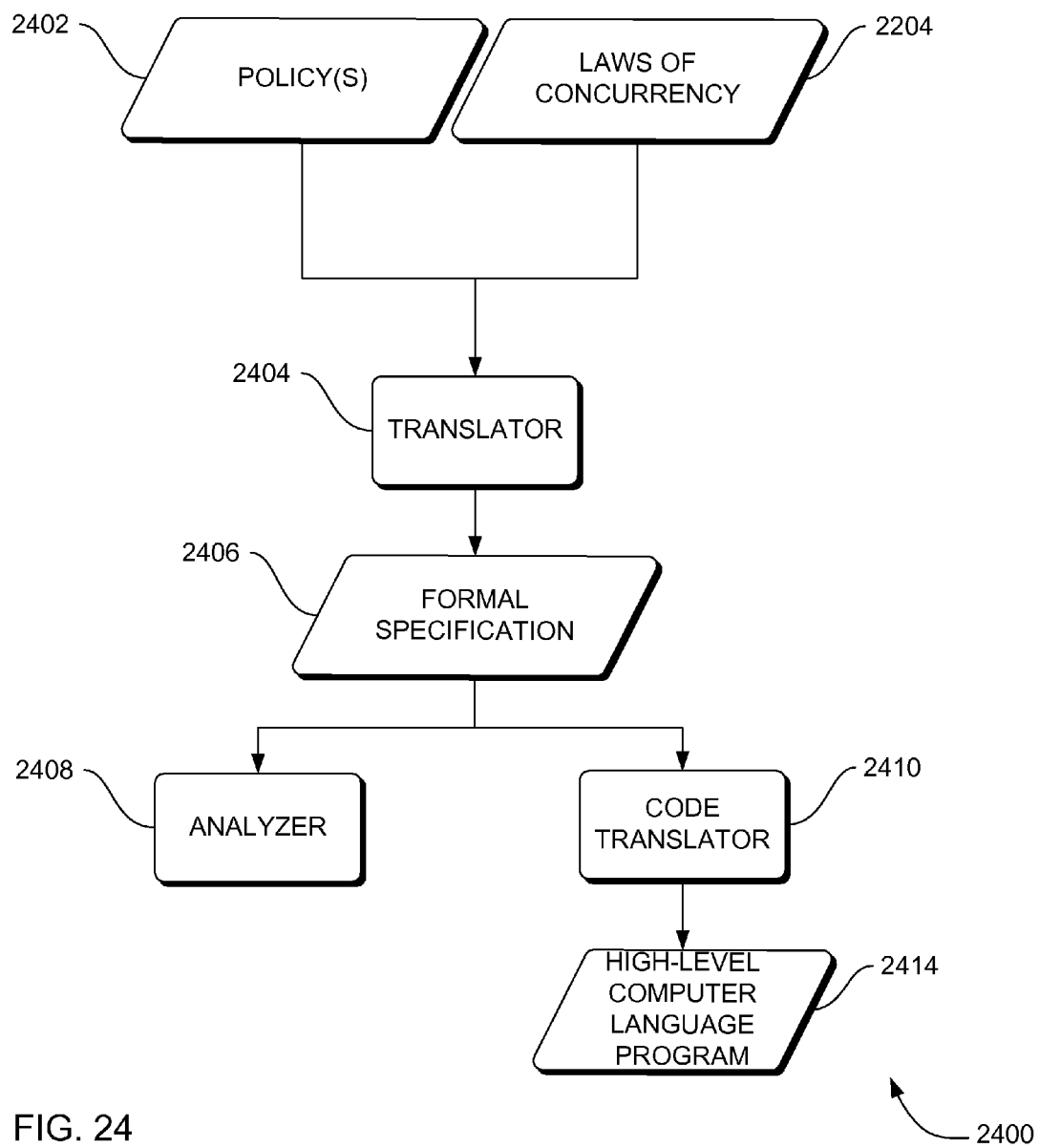
FIG. 24 is a block diagram of an apparatus to generate a high-level computer source code program from a policy, according to an embodiment.

FIG. 22 is a block diagram of an apparatus 2200 to generate a high-level computer source code program from an informal specification, according to an embodiment. FIG. 23 is a block diagram of an apparatus 2300 to generate a formal specification and an implementation from descriptions of a system, according to an embodiment. FIG. 24 is a block diagram of an apparatus to generate a high-level computer source code program from a policy, according to an embodiment. FIG. 25 is a block diagram of an apparatus to engineer a script or procedure from one or more policies, according to an embodiment.

FIG. 22 is a block diagram of an apparatus 2200 to generate a high-level computer source code program from an informal specification. System 2200 may solve the need in the art for an automated, generally applicable way to produce a system that can be a provably correct implementation of an informal design specification that does not require, in applying the system to any particular problem or application, the use of a theorem-prover.

According to an embodiment, system 2200 may be a software development system that includes a data flow and processing points for the data. System 2200 may be representative of (i) computer applications and electrical engineering applications such as chip design and other electrical circuit design, (ii) business management applications in areas such as workflow analysis, (iii) artificial intelligence applications in areas such as knowledge-based systems and agent-based systems, (iv) highly parallel and highly-distributed applications involving computer command and control and computer-based monitoring, and (v) any other area involving process, sequence or algorithm design. According to the disclosed embodiments, system 2200 can mechanically convert different types of specifications (either natural language scenarios or descriptions which are effectively pre-processed scenarios) into process-based formal specifications on which model checking and other mathematics-based verifications are performed, and then optionally convert the formal specification into code.

In some embodiments, system 2200 may include an informal specification 2202 having a plurality of rules or requirements. The informal specification can be expressed in restricted natural language, graphical notations, English language, programming language representations, scenarios or even using semi-formal notations such as unified modeling language (UML) use cases. One skilled in the art will recognize that other languages and graphic indicators may exist that fall within the scope of this invention.

A scenario may be natural language text (or a combination of any (possibly graphical) representations of sequential steps or events) that describes the software's actions in response to incoming data and the internal goals of the software. Scenarios also may describe communication protocols between systems and between the components within the systems. Scenarios also may be known as use-cases. A scenario typically describes one or more potential executions of a system, describing what happens in a particular situation, and what range of behaviors is expected from or omitted by the system under various conditions.

According to some embodiments, system 2200 may also include a set of laws of concurrency 2204. Laws of concurrency 2204 are rules detailing equivalences between sets of processes combined in various ways, and/or relating process-based descriptions of systems or system components to equivalent sets of traces. An example of the laws of concurrency 2204 is given in "Concurrent Systems: Formal Development in CS by M. G. Hinchey, an S. A. Jarvis, McGraw-Hill International Series in Software Engineering, New York and London, 1995, which is herein incorporated by reference in its entirety. Laws of concurrency 2204 may be expressed in any suitable language for describing concurrency. These languages may include, but are not limited to, CSP (Communicating Sequential Processes), CCS (Calculus of Communicating Systems) and variants of these languages.

The informal specification 2202 and a set of laws of concurrency 2204 can be received by a mechanical translator 2206. The plurality of rules or requirements of the informal specification 2202 may be translated mechanically to a process-based specification 2208 or other formal specification language representation. The mechanical designation can mean that no manual intervention in the direct translation is provided. In some embodiments, the process-based specification 2208 may be an intermediate notation or language of sequential process algebra such as Hoare's language of Communicating Sequential Processes (CSP).

The process-based specification 2208 may be mathematically and provably equivalent to the informal specification 2202. Mathematically equivalent does not necessarily mean mathematically equal. Mathematical equivalence of A and B means that A implies B and B implies A. Note that applying the laws of concurrency 2204 to the process-based specification 2208 would allow for the retrieval of a trace-based specification that may be equivalent to the informal specification 2202. Note that the process-based specification may be mathematically equivalent to rather than necessarily equal to the original informal specification 2208. This indicates that the process may be reversed, allowing for reverse engineering of existing systems, or for iterative development of more complex systems.

In some embodiments, the system may include an analyzer 2210 to determine various properties such as existence of omissions, deadlock, livelock, and race conditions in the process-based specification 2208.

According to some embodiments, system 2200 may also include a code translator 2212 to translate the plurality of process-based specification segments 2208 to a set of instructions in a high-level computer language program 2214, such as the Java language.

System 2200 may be operational for a wide variety of informal specification languages and applications, and thus system 2200 can be considered generally applicable. Such applications will be apparent to one skilled in the art and may include distributed software systems, sensor networks, robot operation, complex scripts for spacecraft integration and testing, chemical plant operation and control, and autonomous systems.

Some embodiments indicate that system 2200 can provide mechanical regeneration of the executable system when requirements dictate a change in the high level specification. In system 2200, all that may be required to update the generated application may be a change in the informal specification 2202, and then the changes and validation can ripple through in a mechanical process when system 2200 operates. This also can allow the possibility of cost effectively developing competing designs for a product and implementing each to determine the best one.

In some embodiments, system 2200 may not include a theorem-prover to infer the process-based specification segments from the informal specification. However, the plurality of process-based specification segments 2208 may be provably correct implementations of the informal specification 2202, provided the developer of an instance of system 2200 has properly used a theorem-prover (not shown) to prove that the mechanical translator 2206 correctly translates informal specifications into formal specifications.

Some embodiments of system 2200 can operate in a multi-processing, multi-threaded operating environment on a computer, such as computer 2102 in FIG. 21. While the system 2200 is not limited to any particular informal specification 2202, plurality of rules or requirements, set of laws of concurrency 2204, mechanical translator 2206, process-based specification 2208, analyzer 2210, code translator 2212 and high-level computer language program 2214, for sake of clarity a simplified informal specification 2202, plurality of rules or requirements, set of laws of concurrency 2204, mechanical translator 2206, process-based specification 2208, analyzer 2210, code translator 2212, and high-level computer language program 2214 are described.

System 2200 may relate to the fields of chemical or biological process design or mechanical system design, and, generally to any field where the behaviors exhibited by a process to be designed is described by a set of scenarios expressed in natural language, or some appropriate graphical notation or textual notation.

FIG. 23 is a block diagram of an apparatus 2300 to engineer a script or procedure from scenarios, according to an embodiment. System 2300 may solve the need in the art for an automated, generally applicable way to verify that an implemented script is a provably correct implementation of a set of scenarios.

One embodiment of the system 2300 may be a software development system that includes a data flow and processing points for the data. According to some of the disclosed embodiments, system 2300 can convert scenarios into a script on which model checking and other mathematics-based verifications can then be performed.

The system 2300 can include a plurality of scenarios 2302. The scenarios 2302 can be written in a particular syntax, such as constrained natural language or graphical representations. The scenarios 2302 can embody software applications, although one skilled in the art will recognize that other systems fall within the purview of this invention.

In some embodiments, the scenarios 2302 may be received by a translator 2306. The optional inference engine 2304 might be referenced by the translator 2306 when the scenarios 2302 are translated by the translator 2306 into a formal specification 2308. Subsequently, the formal specification 2308 can be translated by script translator 2312 into a script 2314 in some appropriate scripting language. In some embodiments no manual intervention in the translation is provided. Those skilled in the art will readily understand that other appropriate notations and/or languages exist that are within the scope of this invention.

In some embodiments, system 2300 can include an analyzer 2310 to determine various properties of the formal specification, such as the existence of omissions, deadlock, livelock, and race conditions, as well as other conditions, in the formal specification 2308, although one skilled in the art will recognize that other additional properties can be determined by the analyzer 2310. The analyzer 2310 may solve the need in the prior art to reduce errors.

In some embodiments, the script 2314 can be mathematically and provably equivalent to the scenarios 2302. Mathematically equivalent does not necessarily mean mathematically equal. Mathematical equivalence of A and B means that A implies B and B implies A. Note that the script 2314 of some embodiments can be mathematically equivalent to, rather than necessarily equal to, the scenarios 2302.

In some embodiments, the formal specification 2308 can be a process-based specification, such as process algebra encoded notation. The process algebra encoded notation can be a mathematically notated form. This embodiment may satisfy the need in the art for an automated, mathematics-based process for requirements validation that does not require large computational facilities.

In some embodiments, the scenarios 2302 of system 2300 can specify allowed situations, events and/or results of a software system. In that sense, the scenarios 2302 can provide an abstract specification of the software system.

Some embodiments of system 2300 can be operational for a wide variety of rules, computer instructions, computer languages and applications; thus, system 2300 may be generally applicable. Such applications can include, without limitation, space satellite control systems, distributed software systems, sensor networks, robot operations, complex scripts for spacecraft integration and testing, chemical plant operation and control, autonomous systems, electrical engineering applications such as chip design and other electrical circuit design, business management applications in areas such as workflow analysis, artificial intelligence applications in areas such as knowledge-based systems and agent-based systems, highly parallel and highly-distributed applications involving computer command and control and computer-based monitoring, and any other area involving process, sequence or algorithm design. Hence, one skilled in the art will recognize that any number of other applications not listed can fall within the scope of this invention.

Some embodiments of the system 2300 can provide mechanical or automatic generation of the script 2314, in which human intervention is not required. In at least one embodiment of the system 2300, all that may be required to update the generated application is a change in the scenarios 2302, in which case the changes and validation can ripple through the entire system without human intervention when system 2300 operates. This may also allow the possibility of cost effectively developing competing designs for a product and implementing each to determine the best one.

Some embodiments of the system 2300 may not include an automated logic engine, such as a theorem-prover or an automated deduction engine, to infer the script 2314 from the scenarios 2302. However, the script 2314 can be a provably correct version of the scenarios 2302.

Thus, in regards to scripts and complex procedures, automatic code generation of system 2300 can generate procedures/scripts in suitable scripting language or device control language (such as for a robot) that would provide the procedures, once validated, to be automatically transformed into an implementation. Additionally, system 2300 can be used to "reverse engineer" existing procedures/scripts so that the existing procedures/scripts can be analyzed and corrected and recast in a format and form that can be more easily understood. System 2300 also can be used to reverse engineer multiple existing procedures/scripts (even written in different languages) to a single formal model by which the procedures/scripts are combined, analyzed for conflicts, and regenerated as a single procedure/script (in the same or a different procedure/scripting language).

Some embodiments of system 2300 may operate in a multi-processing, multi-threaded operating environment on a computer, such as the computer 2102 illustrated in FIG. 21. While the system 2300 is not limited to any particular scenarios 2302, inference engine 2304, translator 2306, formal specification 2308, analyzer 2310, script translator 2312 and script 2314, for sake of clarity, embodiments of simplified scenarios 2302, inference engine 2304, translator 2306, formal specification 2308, analyzer 2310, script translator 2312 and script 2314 are described.

In some embodiments, the system 2300 may be a software development system that can include a data flow and processing points for the data. System 2300 can be representative of (i) computer applications and electrical engineering applications such as chip design and other electrical circuit design, (ii) business management applications in areas such as workflow analysis, (iii) artificial intelligence applications in areas such as knowledge-based systems and agent-based systems, (iv) highly parallel and highly-distributed applications involving computer command and control and computer-based monitoring, and (v) any other area involving process, sequence or algorithm design. One skilled in the art, however, will recognize that other applications can exist that are within the purview of this invention. According to the disclosed embodiments, system 2300 can, without human intervention, convert different types of specifications (such as natural language scenarios or descriptions which are effectively pre-processed scenarios) into process-based scripts on which model checking and other mathematics-based verifications are performed, and then optionally convert the script into code.

System 2300 can be operational for a wide variety of languages for expressing requirements, and thus system 2300 may be considered generally applicable. Such applications may include, without limitation, distributed software systems, sensor networks, robot operation, complex scripts for spacecraft integration and testing, chemical plant operation and control, and autonomous systems. One skilled in the art will understand that these applications are cited by way of example and that other applications can fall within the scope of the invention.

According to some embodiments, a scenario is natural language text (or a combination of any, such as possibly graphical, representations of sequential steps or events) that describes the software's actions in response to incoming data and the internal goals of the software. Scenarios also can describe communication protocols between systems and between the components within the systems. Scenarios also can be known as use cases. A scenario can describe one or more potential executions of a system, such as describing what happens in a particular situation and what range of behaviors is expected from or omitted by the system under various conditions.

Natural language scenarios can be constructed in terms of individual scenarios written in a structured natural language. Different scenarios can be written by different stakeholders of the system, corresponding to the different views the stakeholders can have of how the system will perform, including alternative views corresponding to higher or lower levels of abstraction. Natural language scenarios can be generated by a user with or without mechanical or computer aid. Such a set of natural language scenarios can provide the descriptions of actions that occur as the software executes. Some of these actions can be explicit and required, while others can be due to errors arising or as a result of adapting to changing conditions as the system executes.

For example, if the system involves commanding space satellites, scenarios for that system can include sending commands to the satellites and processing data received in response to the commands. Natural language scenarios may be specific to the technology or application domain to which the natural language scenarios are applied. A fully automated general purpose approach covering all domains can be technically prohibitive to implement in a way that is both complete and consistent.

To ensure consistency, the domain of application can often be purpose-specific. For example, scenarios for satellite systems may not be applicable as scenarios for systems that manufacture agricultural chemicals.

System 2400 may solve the need in the art for an automated, generally applicable way to produce a system that is a provably correct implementation of one or more policies that does not require, in applying the system to any particular problem or application, the use of a theorem-prover.

In some embodiments, system 2400 may be a software development system that includes a data flow and processing points for the data. System 2400 thus may be representative of (i) computer applications and electrical engineering applications such as chip design and other electrical circuit design (ii) business management applications in areas such as workflow analysis, (iii) artificial intelligence applications in areas such as knowledge-based systems and agent-based systems, (iv) highly parallel and highly-distributed applications involving computer command and control and computer-based monitoring, (v) any other area involving process, sequence or algorithm design, (vi) remote space vehicles such as autonomous nanotechnology swarm (ANTS) and moon and Mars exploration vehicles. According to some of the disclosed embodiments, system 2400 can mechanically convert different types of specifications (either natural language scenarios or descriptions which are effectively pre-processed scenarios) into formal specifications on which model checking and other mathematics-based verifications are performed, and then optionally convert the formal specification into code.

System 2400 may include one or more policies 2402 having a plurality of rules or requirements. The policy 2402 can be an informal specification that can be expressed in restricted natural language, graphical notations, English language, programming language representations, or even using semi-formal notations such as unified modeling language (UML) use cases.

In some embodiments, policies may be a set of business considerations or a business policy that is designed to guide decisions of courses of action, and policy-based management may be viewed as an administrative approach to systems management that establishes rules in advance to deal with situations that are likely to occur. From this perspective, policy-based management can work by controlling access to, and setting priorities for, the use of information and communications technology (ICT) resources, for instance, where a (human) manager can simply specify the business objectives and the system will make it so in terms of the needed ICT. For example:

1. "The customer database must be backed up nightly between 1 a.m. and 4 a.m."

2. "Platinum customers are to receive no worse than 1-second average response time on all purchase transactions."

3. "Only management and the HR senior staff can access personnel records." and

4. "The number of connections requested by the Web application server cannot exceed the number of connections supported by the associated database."

These examples highlight the wide range and multiple levels of policies available, the first being concerned with system protection through backup, the second being concerned with system optimization to achieve and maintain a level of quality of service for key customers; while the third and forth examples are concerned with system configuration and protection. If one definition of autonomic computing could be self-management based on high level guidance from humans, and considering IBM's high-level set of self-properties (self-CHOP: configuration, healing, optimization and protection) against the types of typical policies mentioned previously (optimization, configuration and protection), the importance and relevance of polices for achieving autonomicity become clear.

Some application areas of policy-based management (PBM) may include networking as a way of managing IP-based multi-service networks with quality of service guarantees, the telecom industry for next generation networking which is driven by the fact that policy has been recognized as a solution to manage complexity and to guide the behavior of a network or distributed system through high-level user-oriented abstractions, and product and system management by providing uniform cross-product policy definition and management infrastructure.

System 2400 may also include a set of laws of concurrency 2204. According to some embodiments, the policy 2402 and a set of laws of concurrency 2204 may be received by a mechanical translator 2404. The plurality of rules or requirements of the policy 2402 may be translated mechanically to a formal specification 2406 or other formal specification language representation, such as a process-based specification. The mechanical characterization means that no manual intervention in the direct translation is provided. In some embodiments, the formal specification 2406 may be an intermediate notation or language of sequential process algebra such as Hoare's language of Communicating Sequential Processes (CSP).

The formal specification 2406 can be mathematically and provably equivalent to the policy 2402. Mathematically equivalent does not necessarily mean mathematically equal. Mathematical equivalence of A and B means that A implies B and B implies A. Note that applying the laws of concurrency 2204 to the formal specification 2406 would allow for the retrieval of a trace-based specification that is equivalent to the policy 2402. Note that the formal specification 2406 could be mathematically equivalent to rather than necessarily equal to the original policy 2402. Thus, in some embodiments, the process may be reversed, allowing for reverse engineering of existing systems, or for iterative development of more complex systems.

In some embodiments, the system may include an analyzer 2408 to determine various properties such as existence of omissions, deadlock, livelock, and race conditions in the formal specification 2406.

System 2400 may also include a code translator 2410 to translate the plurality of formal specification segments 2406 to a set of instructions in a high-level computer language program 2414, such as the Java language.

System 2400 can be operational for a wide variety of policy languages and applications, and thus system 2400 can be considered generally applicable. Such applications may include distributed software systems, sensor networks, robot operation, complex scripts for spacecraft integration and testing, chemical plant operation and control, and autonomous systems.

In some embodiments, system 2400 may provide mechanical regeneration of the executable system when requirements dictate a change in the high level specification. In system 2400, updating the generated application may require a change in the policy 2402, and then the changes and validation can ripple through in a mechanical process when system 2400 operates. This also allows the possibility of cost effectively developing competing designs for a product and implementing each to determine the best one.

Some embodiments of system 2400 may not include a theorem-prover to infer the formal specification 2406 segments from the policy 2402. However, the plurality of formal specification segments 2406 can be provably correct implementations of the policy 2402, provided the developer of an instance of system 2400 has properly used a theorem-prover (not shown) to prove that the mechanical translator 2404 correctly translates policies into formal specifications.

Some embodiments of system 2400 can operate in a multi-processing, multi-threaded operating environment on a computer, such as computer 2102 in FIG. 21. While the system 2400 may not be limited to any particular policy 2402, plurality of rules or requirements, set of laws of concurrency 2204, mechanical translator 2404, formal specification 2406, analyzer 2408, code translator 2410 and high-level computer language program 2414, for sake of clarity a simplified policy 2402, plurality of rules or requirements, set of laws of concurrency 2204, mechanical translator 2404, formal specification 2406, analyzer 2408, code translator 2410, and high-level computer language program 2414 are described by way of example.

According to some embodiments, system 2400 can relate to the fields of chemical or biological process design or mechanical system design, and, generally to any field where the behaviors exhibited by a process to be designed are described or constrained by a set of policies expressed in natural language, or some appropriate graphical notation or textual notation.

FIG. 25 is a block diagram of an apparatus to generate or engineer a script or procedure from policies, according to an embodiment. System 2500 can alleviate a need in the art for an automated, generally applicable way to verify that an implementation is a provably correct implementation of one of more policies.

At least one embodiment of the system 2500 may be a software development system that includes a data flow and processing points for the data. According to the disclosed embodiments, system 2500 can convert one or more policies into a script on which model checking and other mathematics-based verifications can then be performed.

The system 2500 can include one or more policies 2502. The policies 2502 can be written in a particular syntax, such as constrained natural language, graphical representations, etc. The policies 2502 can embody software applications, although one skilled in the art will recognize that other systems fall within the purview of this invention.

In some embodiments, the policies 2502 may be received by a translator 2504. The optional inference engine 2304 might be referenced by the translator 2504 when the policies 2502 are translated by the translator 2504 into a formal specification 2406. Subsequently, the formal specification 2406 can be translated by translator 2508 into a script in some appropriate scripting language. In some embodiments, no manual intervention in the translation is provided. Those skilled in the art readily will understand that other appropriate notations and/or languages exist that are within the scope of this invention.

In some embodiments, system 2500 can include an analyzer 2506 to determine various properties of the formal specification, such as the existence of omissions, deadlock, livelock, and race conditions, as well as other conditions, in the formal specification 2406, although one skilled in the art will recognize that other additional properties can be determined by the analyzer 2506. The analyzer 2506 may solve the need in the prior art to reduce errors.

In some embodiments, the implementation 2510 can be mathematically and provably equivalent to the policies 2502. Mathematically equivalent does not necessarily mean mathematically equal. Mathematical equivalence of A and B means that A implies B and B implies A. Note that the implementation 2312 of some embodiments may be mathematically equivalent to, rather than necessarily equal to, the policies 2502.

In some embodiments, the formal specification 2406 can be a process-based specification, such as process algebra encoded notation. The process algebra encoded notation can be a mathematically notated form. This embodiment may satisfy the need in the art for an automated, mathematics-based process for policy validation that does not require large computational facilities.

In some embodiments, the policies 2502 of system 2500 can specify allowed situations, events and/or results of a software system. In that sense, the policies 2502 can provide an abstract specification of the software system.

Some embodiments of system 2500 can be operational for a wide variety of rules, computer instructions, computer languages and applications; thus, system 2500 can be generally applicable. Such applications can include, without limitation, space satellite control systems, distributed software systems, sensor networks, robot operations, complex scripts for spacecraft integration and testing, chemical plant operation and control, autonomous systems, electrical engineering applications such as chip design and other electrical circuit design, business management applications in areas such as workflow analysis, artificial intelligence applications in areas such as knowledge-based systems and agent-based systems, highly parallel and highly-distributed applications involving computer command and control and computer-based monitoring, and any other area involving process, sequence or algorithm design. Hence, one skilled in the art will recognize that any number of other applications not listed can fall within the scope of this invention.

Some embodiments of the system 2500 can provide mechanical or automatic generation of the implementation 2510, in which human intervention is not required. In at least one embodiment of the system 2500, all that may be required to update the generated application is a change in the policies 2502, in which case the changes and validation can ripple through the entire system without human intervention when system 2500 operates. This also allows the possibility of cost effectively developing competing designs for a product and implementing each to determine the best one.

Some embodiments of the system 2500 may not include an automated logic engine, such as a theorem-prover or an automated deduction engine, to infer the script implementation from the policies 2502. However, the script implementation can be a provably correct version of the policies 2502 provided the developer of an instance of system 2500 has properly used a theorem-prover (not shown) to prove that the mechanical translator 2504 correctly translates policies into formal specifications.

Thus, in regards to scripts and complex procedures, automatic code generation of system 2500 can generate procedures/scripts in suitable scripting language or device control language (such as for a robot) that would provide the procedures, once validated, to be automatically transformed into an implementation. Additionally, system 2500 can be used to "reverse engineer" existing procedures/scripts so that the existing procedures/scripts can be analyzed and corrected and recast in a format and form that can be more easily understood. System 2500 also can be used to reverse engineer multiple existing procedures/scripts (even written in different languages) to a single formal model by which the procedures/scripts are combined, analyzed for conflicts, and regenerated as a single procedure/script (in the same or a different procedure/scripting language).

Some embodiments of system 2500 may operate in a multi-processing, multi-threaded operating environment on a computer, such as the computer 2102 illustrated in FIG. 21. While the system 2500 is not limited to any particular policies 2502, inference engine 2304, translator 2504, formal specification 2406, analyzer 2506, translator 2508, and implementation 2312, for sake of clarity, embodiments of simplified policies 2502, inference engine 2304, translator 2504, formal specification 2406, analyzer 2506, translator 2508 and implementation 2312 are described by way of example.

In some embodiments, the system 2500 may be a software development system that can include a data flow and processing points for the data. System 2500 can be representative of (i) computer applications and electrical engineering applications such as chip design and other electrical circuit design, (ii) business management applications in areas such as workflow analysis, (iii) artificial intelligence applications in areas such as knowledge-based systems and agent-based systems, (iv) highly parallel and highly-distributed applications involving computer command and control and computer-based monitoring, and (v) any other area involving process, sequence or algorithm design. One skilled in the art, however, will recognize that other applications can exist that are within the purview of this invention. According to the some of the disclosed embodiments, system 2500 can, without human intervention, convert different types of policies into formal specifications on which model checking and other mathematics-based verifications are performed, and then optionally convert the specification into code.

System 2500 can be operational for a wide variety of languages for expressing requirements, and thus system 2500 can be considered generally applicable. Such applications may include, without limitation, distributed software systems, sensor networks, robot operation, complex scripts for spacecraft integration and testing, chemical plant operation and control, and autonomous systems. One skilled in the art will understand that these applications are cited by way of example and that other applications can fall within the scope of the invention.

According to some embodiments, a policy can describe one or more potential executions of a system, such as describing what happens in a particular situation and what range of behaviors is expected from or omitted by the system under various conditions.

Different policies can be written by different stakeholders of the system, corresponding to the different views the stakeholders can have of how the system will perform, including alternative views corresponding to higher or lower levels of abstraction. Policies can be generated by a user with or without mechanical or computer aid. Policies can provide the descriptions of actions that occur as the software executes. Some of these actions can be explicit and required, while others can be due to errors arising, including those that are as a result of adapting to changing conditions as the system executes.

Figure 26:
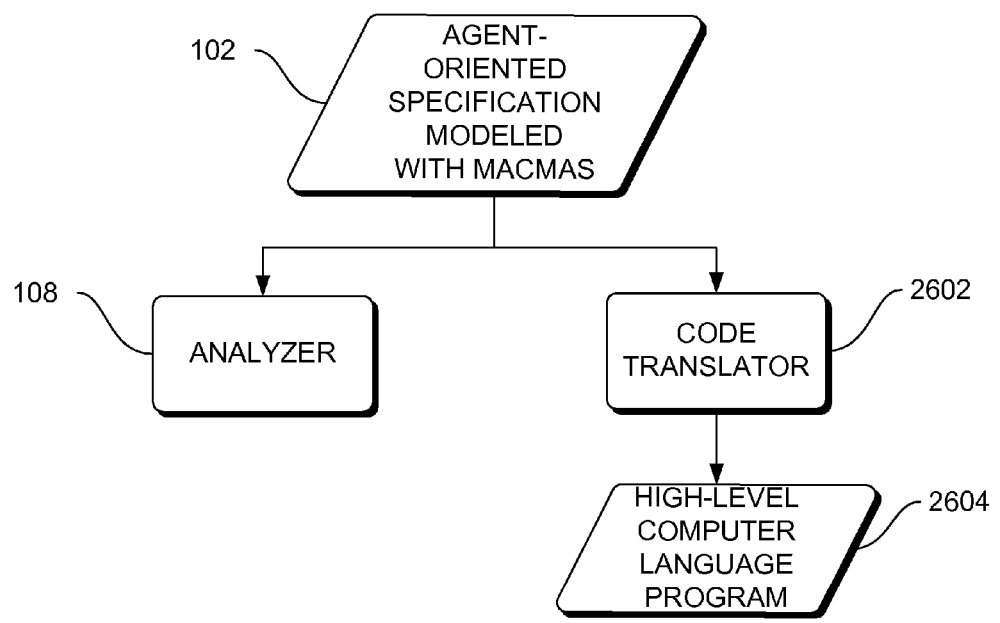
FIG. 26 is a block diagram of a system to generate a high-level computer source code program from an agent-oriented specification modeled with MaCMAS, according to an embodiment.

FIG. 26 is a block diagram of a system 2600 to generate a high-level computer source code program from an agent-oriented specification modeled with MaCMAS, according to an embodiment. System 2600 may solve the need in the art for an automated, generally applicable way to produce a system that can be a provably correct implementation of an agent-oriented specification modeled with MaCMAS that does not require, in applying the system to any particular problem or application, the use of a theorem-prover.

System 2600 can be a software development system that includes a data flow and processing points for the data. System 2600 can be representative of (i) computer applications and electrical engineering applications such as chip design and other electrical circuit design (ii) business management applications in areas such as workflow analysis, (iii) artificial intelligence applications in areas such as knowledge-based systems and agent-based systems, (iv) highly parallel and highly-distributed applications involving computer command and control and computer-based monitoring, and (v) any other area involving process, sequence or algorithm design. According to the disclosed embodiments, system 2600 can mechanically convert different types of agent-oriented specifications modeled with MaCMAS into high-level computer language code.

System 2600 may include one or more agent-oriented specifications modeled with MaCMAS 102.

In some embodiments, the system can include an analyzer 108 to determine various properties such as existence of omissions, deadlock, livelock, and race conditions in the agent-oriented specification(s) modeled with MaCMAS 102.

System 2600 can also include a code translator 2602 to translate the agent-oriented specification(s) modeled with MaCMAS 102 to a set of instructions in a high-level computer language program 2604, such as the Java language.

System 2600 can be operational for a wide variety of languages and applications for agent-oriented specification(s) modeled with MaCMAS, and thus system 2600 may be considered generally applicable. Such applications may include distributed software systems, sensor networks, robot operation, complex scripts for spacecraft integration and testing, chemical plant operation and control, and autonomous systems.

System 2600 may provide mechanical regeneration of the executable system when requirements dictate a change in the agent-oriented specification(s) modeled with MaCMAS. In system 2600, the generated application can be regenerated by changing the agent-oriented specification modeled with MaCMAS 102, and then the changes and validation can ripple through in a mechanical process when system 2600 operates to regenerate the application. Thus, competing designs of the application can be cost effectively developed for a product and implemented to determine the best design.

Some embodiments of system 2600 can operate in a multi-processing, multi-threaded operating environment on a computer, such as computer 2102 in FIG. 21. While the system 2600 is not limited to any particular agent-oriented specification modeled with MaCMAS 102, analyzer 108, code translator 2602 and high-level computer language program 2604, for sake of clarity a simplified agent-oriented specification modeled with MaCMAS 102, analyzer 108, code translator 2602, and high-level computer language program 2604 are described.

System 2600 may relate to the fields of chemical or biological process design or mechanical system design, and, generally to any field where the behaviors exhibited by a process to be designed can be described by means of agent-oriented specification(s) modeled with MaCMAS.

FIG. 27 is a block diagram of a system 2700 to engineer a script or procedure from agent-oriented specification(s) modeled with MaCMAS, according to an embodiment. System 2700 may solve the need in the art for an automated, generally applicable way to verify that an implemented script can be a provably correct implementation of a set of agent-oriented specifications modeled with MaCMAS.

One embodiment of the system 2700 can be a software development system that includes a data flow and processing points for the data. According to the disclosed embodiments, system 2700 can convert agent-oriented specifications modeled with MaCMAS into a script and perform model checking and other mathematics-based verifications on the agent-oriented specifications modeled with MaCMAS.

In some embodiments, system 2700 can include an analyzer 108 to determine various properties of the agent-oriented specifications modeled with MaCMAS 102, such as the existence of omissions, deadlock, livelock, and race conditions, as well as other conditions, in the agent-oriented specification(s) modeled with MaCMAS 102, although one skilled in the art will recognize that other additional properties can be determined by the analyzer 108. The analyzer 108 may solve the need in the prior art to reduce errors.

Subsequently, the agent-oriented specification(s) modeled with MaCMAS 102 can be translated by script translator 2702 into a script 2704 in some appropriate scripting language. In some embodiments, no manual intervention in the translation may be provided. Those skilled in the art will readily understand that other appropriate notations and/or languages exist that are within the scope of the systems, methods and apparatus described herein.

In some embodiments, the script 2704 can be mathematically and provably equivalent to the agent-oriented specification(s) modeled with MaCMAS 102. Mathematically equivalent does not necessarily mean mathematically equal. Mathematical equivalence of A and B means that A implies B and B implies A. Note that the script 2704 of some embodiments can be mathematically equivalent to, rather than necessarily equal to, the agent-oriented specifications modeled with MaCMAS 102.

In some embodiments, the agent-oriented specification(s) modeled with MaCMAS 102 can be a process-based specification, such as process algebra encoded notation. The process algebra encoded notation can be a mathematically notated form. System 100 may satisfy the need in the art for an automated, mathematics-based process for requirements validation that does not require large computational facilities.

In some embodiments, the agent-oriented specification(s) modeled with MaCMAS 102 of system 2700 can specify allowed situations, events and/or results of a software system. In that sense, the agent-oriented specification(s) modeled with MaCMAS 102 can provide an abstract specification of the software system.

Some embodiments of system 2700 can be operational for a wide variety of rules, computer instructions, computer languages and applications; thus, system 2700 can be generally applicable. Such applications can include, without limitation, space satellite control systems, distributed software systems, sensor networks, robot operations, complex scripts for spacecraft integration and testing, chemical plant operation and control, autonomous systems, electrical engineering applications such as chip design and other electrical circuit design, business management applications in areas such as workflow analysis, artificial intelligence applications in areas such as knowledge-based systems and agent-based systems, highly parallel and highly-distributed applications involving computer command and control and computer-based monitoring, and any other area involving process, sequence or algorithm design. Hence, one skilled in the art will recognize that any number of other applications not listed can fall within the scope of the systems, methods and apparatus described herein.

Some embodiments of the system 2700 can provide mechanical or automatic generation of the script 2704, in which human intervention is not required. In at least one embodiment of the system 2700, the generated application can be regenerated by changing the agent-oriented specification(s) modeled with MaCMAS 102, and then the changes and validation will ripple through the entire system without human intervention which system 2700 operates to regenerate the application. Thus, competing designs of the application for a product can be cost effectively developed and implemented to determine the best design.

Some embodiments of the system 2700 may not include an automated logic engine, such as a theorem-prover or an automated deduction engine, to infer the script 2704 from the agent-oriented specification(s) modeled with MaCMAS 102.

Thus, in regards to scripts and complex procedures, automatic code generation of system 2700 can generate procedures/scripts in suitable scripting language or device control language (such as for a robot) that provides the procedures, once validated, to be automatically transformed into an implementation. Additionally, system 2700 can be used to "reverse engineer" existing procedures/scripts so that the existing procedures/scripts can be analyzed and corrected and recast in a format and form that can be more easily understood. System 2700 also can be used to reverse engineer multiple existing procedures/scripts (even written in different languages) to a single agent-oriented specification modeled with MaCMAS 102 by which the procedures/scripts can be combined, analyzed for conflicts, and regenerated as a single procedure/script (in the same or a different procedure/scripting language).

Some embodiments of system 2700 can operate in a multi-processing, multi-threaded operating environment on a computer, such as the computer 2102 illustrated in FIG. 21. While the system 2700 is not limited to any particular agent-oriented specification(s) modeled with MaCMAS 102, analyzer 108, script translator 2702 and script 2704, for sake of clarity, embodiments of simplified s agent-oriented specification(s) modeled with MaCMAS 102, analyzer 108, script translator 2702 and script 2704 are described.

In some embodiments, the system 2700 can be a software development system that can include a data flow and processing points for the data. System 2700 can be representative of (i) computer applications and electrical engineering applications such as chip design and other electrical circuit design, (ii) business management applications in areas such as workflow analysis, (iii) artificial intelligence applications in areas such as knowledge-based systems and agent-based systems, (iv) highly parallel and highly-distributed applications involving computer command and control and computer-based monitoring, and (v) any other area involving process, sequence or algorithm design. One skilled in the art, however, will recognize that other applications can exist that are within the purview of system 2700. According to the disclosed embodiments, system 2700 can, without human intervention, convert different types of agent-oriented specification(s) modeled with MaCMAS 102 into scripts on which model checking and other mathematics-based verifications can be performed, and then optionally convert the script into code.

System 2700 can be operational for a wide variety of languages for expressing requirements, and thus system 2700 can be considered generally applicable. Such applications may include, without limitation, distributed software systems, sensor networks, robot operation, complex scripts for spacecraft integration and testing, chemical plant operation and control, and autonomous systems. One skilled in the art will understand that these applications are cited by way of example and that other applications can fall within the scope of the invention.

For example, if the system involves commanding space satellites, agent-oriented specification(s) modeled with MaCMAS 102 for that system can include sending commands to the satellites and processing data received in response to the commands. Agent-oriented specification(s) modeled with MaCMAS 102 may be specific to the technology or application domain to which the agent-oriented specification(s) modeled with MaCMAS 102 can be applied. A fully automated general purpose approach covering all domains may be technically prohibitive to implement in a way that can be both complete and consistent.

To ensure consistency, the domain of application can be often purpose-specific. For example, agent-oriented specification(s) modeled with MaCMAS 102 for satellite systems may not be applicable as scenarios for systems that manufacture agricultural chemicals.

CSP Implementation

Figure 28:
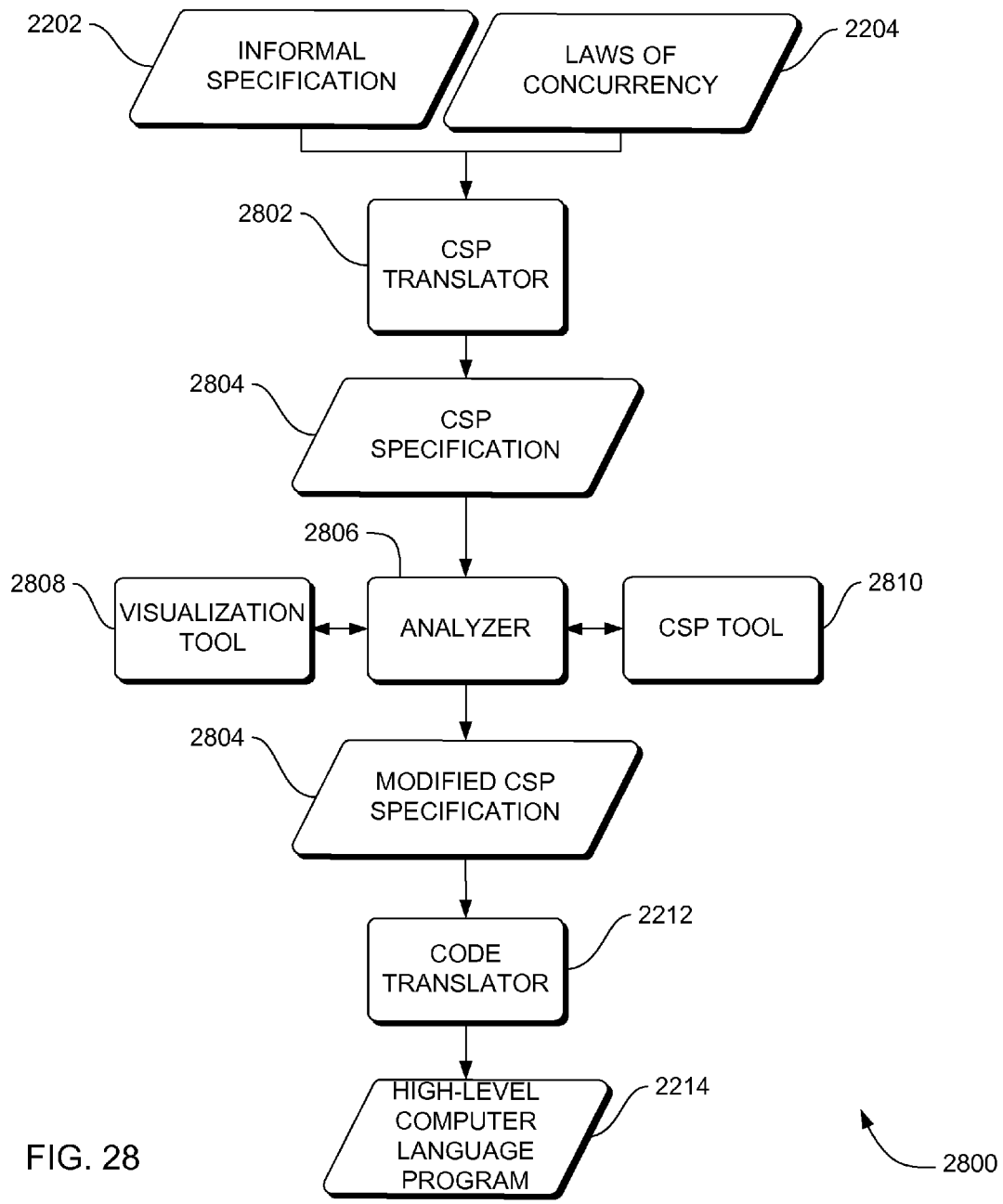
FIG. 28 is a block diagram of a CSP implementation of an apparatus to generate a high-level computer source code program from an informal specification, according to an embodiment.

Referring to FIG. 28, a particular CSP implementation 2800 is described in conjunction with the apparatus in FIG. 22 and the methods described in conjunction with FIG. 2 and FIG. 3, according to an embodiment.

FIG. 28 is a block diagram of a particular CSP implementation of an apparatus 2800 to generate a high-level computer source code program from an informal specification, according to an embodiment. Apparatus 2800 may solve the need in the art for an automated, generally applicable way to produce a system that is a provably correct implementation of an informal design specification that does not require use of a theorem-prover.

Apparatus 2800 may include an informal specification 2202 having a plurality of rules or requirements. The informal specification 2202 can be expressed in restricted natural language, graphical notations, or even using semi-formal notations such as unified modeling language (UML) use cases. Apparatus 2800 may also include a set of laws of concurrency 2204.

The informal specification 2202 and a set of laws of concurrency 2204 may be received by a mechanical CSP translator 2802. The plurality of rules or requirements of the informal specification 2202 can be translated mechanically to a specification 2804 encoded in Hoare's language of Communicating Sequential Processes (CSP). In some embodiments, the mechanical CSP translator 2802 can perform actions 202 and 204 in FIG. 2.

In some embodiments, the system may include a formal specification analyzer 2806 to perform model verification/checking and determine existence of omissions, deadlock, livelock and race conditions in the CSP specification 2804. In some embodiments, the formal specification analyzer 2806 may receive and transmit information from and to a visualization tool 2808 that provides a way to modify the CSP specification 2804. In some embodiments, the formal specification analyzer 2806 can receive and transmit information from and to a tool 2810 designed for CSP that provides a way to modify the CSP specification 2804.

The formal specification analyzer 2806 can generate a modified CSP specification 2804 that may in turn be received by a code translator 2212 or compiler to translate the plurality of process-based specification segments 2208 to a set of instructions in a high-level computer language program 2214, such as Java language.

Formal specification analyzer 2806 may allow the user to manipulate the formal specification 2804 in various ways. The formal specification analyzer 2806 may allow the user to examine the system described by the informal specification 2202, and to manipulate it. The CSP specification 2804 may be analyzed to highlight undesirable behavior, such as race conditions, and equally important, to point out errors of omission in the informal specification 2202. The formal specification analyzer 2806 may be an optional but useful stage in the disclosed embodiments of the present invention. If the formal specification analyzer 2806 is not used, then the process-based specification 2208 and the modified CSP specification 2804 can be identical. Hence, if the formal specification analyzer 2806 is not used, then all references to the modified CSP specification 2804 disclosed below may also apply to the CSP specification 2804.

Some embodiments of apparatus 2800 may not include a theorem-prover to infer the process-based specification segments from the informal specification.

Apparatus 2800 can be operational for a wide variety of informal specification languages and applications, and thus apparatus 2800 can be generally applicable. Such applications may include distributed software systems, sensor networks, robot operation, complex scripts for spacecraft integration and testing, and autonomous systems.

Apparatus 2800 components of the mechanical CSP translator 2802, the formal specification analyzer 2806, visualization tool 2808, CSP tool 2810 and the code translator 2212 can be embodied as computer hardware circuitry or as a computer-readable program, or a combination of both, such as shown in FIG. 28. In another embodiment, apparatus 2800 may be implemented in an application service provider (ASP) system.

Figure 29:
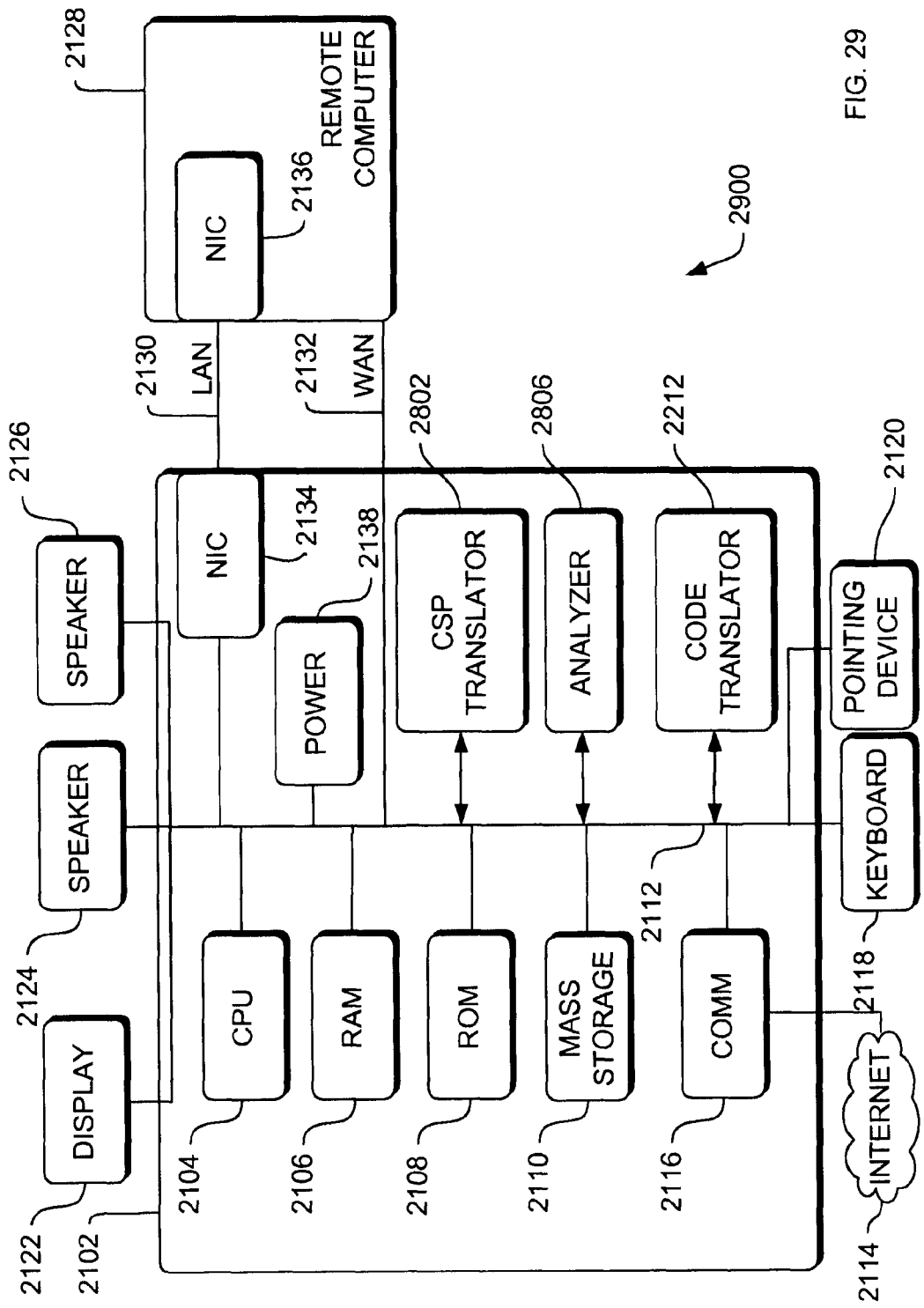
FIG. 29 is a block diagram of a hardware and operating environment in which a particular CSP implementation of FIG. 28 can be implemented, according to an embodiment.

FIG. 29 is a block diagram of a hardware and operating environment 2900 in which a particular CSP implementation of FIG. 28 is implemented, according to an embodiment.

Script Implementation

Figure 30:
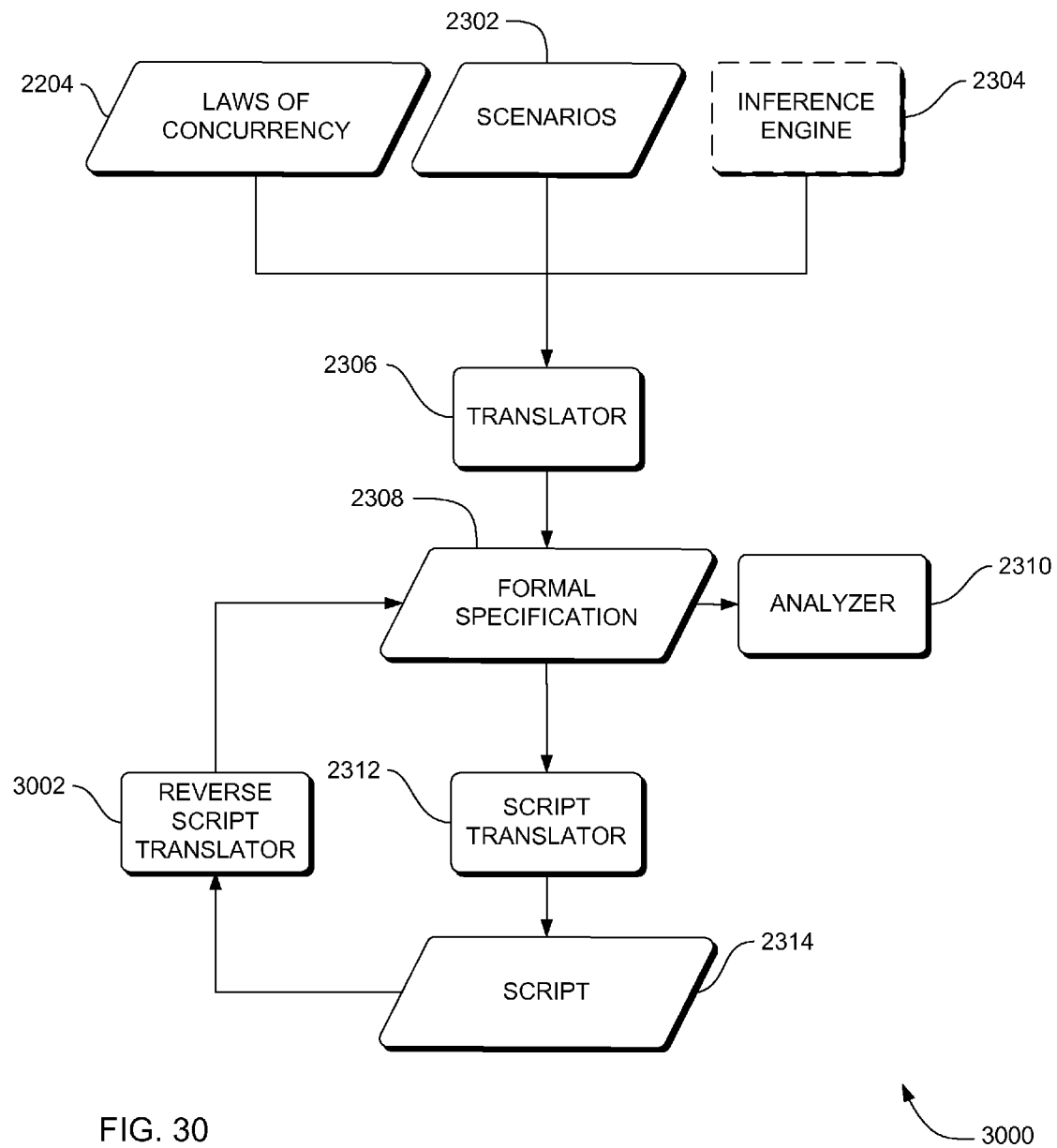
FIG. 30 is a block diagram of a particular implementation of an apparatus capable of translating scenarios to a formal specification, according to an embodiment.
Figure 31:
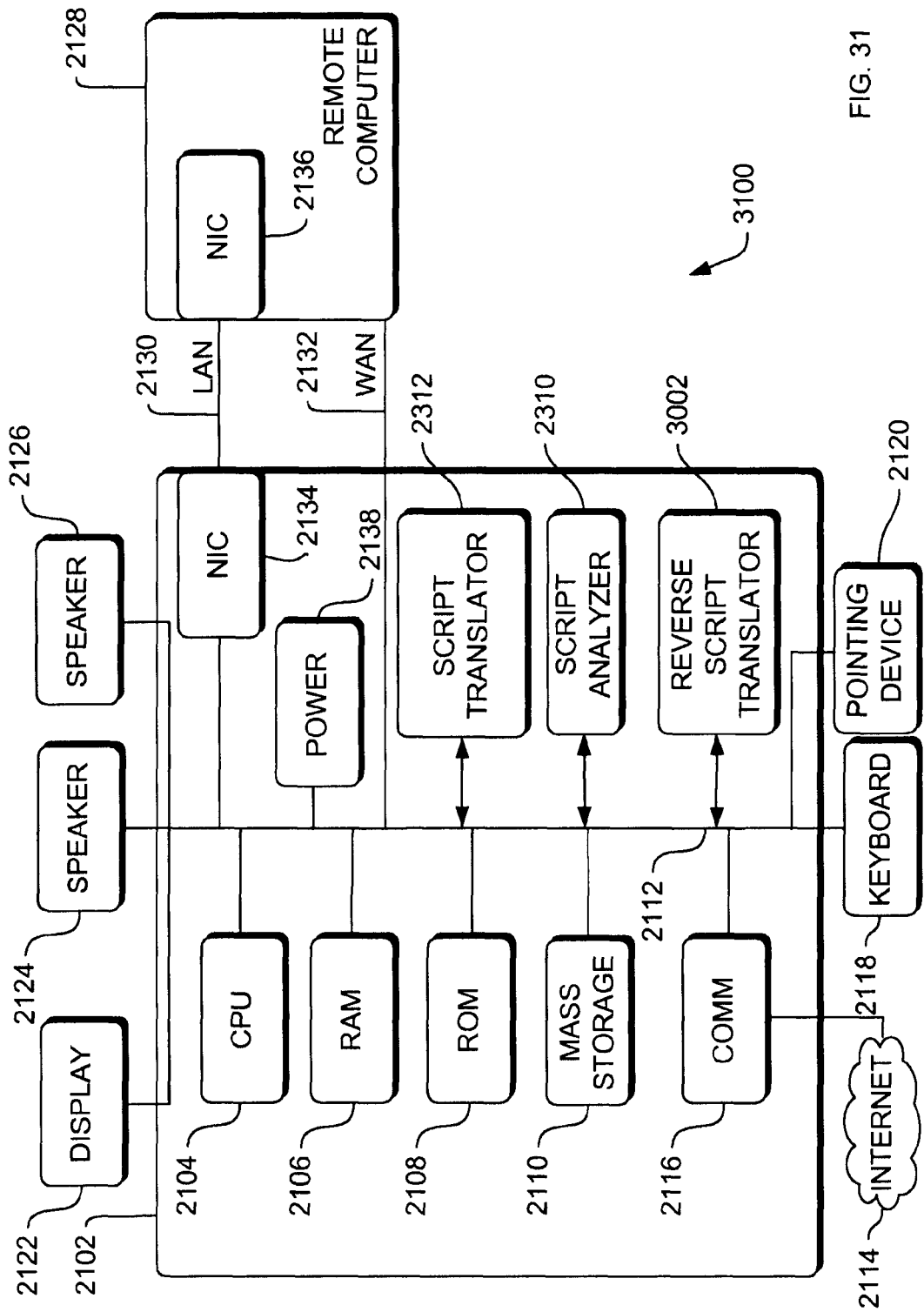
FIG. 31 is a block diagram of a hardware and operating environment in which components of FIG. 30 can be implemented, according to an embodiment.

Referring to FIGS. 30 and 31, a particular scripting language implementation 3000 is described in conjunction with the apparatus in FIG. 23 and the methods described in conjunction with FIGS. 2-20, according to embodiments.

FIG. 30 is a block diagram of a particular implementation of an apparatus capable of translating scenarios to a formal specification, according to an embodiment. Apparatus 3000 may solve the need in the art for an automated, generally applicable way to verify that implemented scripts are a provably correct implementation of a scenario(s).

Apparatus 3000 can include a translator 2306 that generates a formal specification 2308 from the laws of concurrency 2204 and the scenario(s) 2302 in reference to the optional inference engine 2304.

Subsequently, the formal specification 2308 may be translated by script translator 2312 into a script 2314 in some appropriate scripting language. In some embodiments, no manual intervention in the translation may be provided. Those skilled in the art will readily understand that other appropriate notations and/or languages exist that are within the scope of this invention.

In some embodiments, apparatus 3000 can include an analyzer 2310 to determine various properties of the formal specification, such as the existence of omissions, deadlock, livelock, and race conditions, as well as other conditions, in the formal specification 2308, although one skilled in the art will recognize that other additional properties can be determined by the analyzer 2310. The analyzer 2310 may solve the need in the prior art to reduce errors.

In some embodiments, a reverse script translator 3002 receives the script 2314 and generates a formal specification 2308. The output of the reverse script translator 3002 can be a different formal specification than formal specification 2308. In some embodiments, there can be some small differences between the formal specification generated by reverse script translator 3002 and formal specification 2308, but the formal specifications generated by the reverse script translator 3002 can be substantially functionally equivalent to the formal specification 2308.

Apparatus 3000 can operate for a wide variety of languages and applications, and thus apparatus 3000 can be generally applicable. Such applications can include, without limitation, distributed software systems, sensor networks, robot operation, complex scripts for spacecraft integration and testing, and autonomous systems, but those skilled in the art will understand that other applications are contemplated.

Apparatus 3000 components such as the translator 2306, script translator 2312, the analyzer 2310, and the reverse script translator 3002 can be embodied as computer hardware circuitry or as a computer-readable program, or a combination of both, such as shown in FIG. 31. In other embodiments, apparatus 3000 can be implemented in an application service provider (ASP) system.

FIG. 31 illustrates an environment 3100 similar to that of FIG. 21, but with the addition of the script translator 2312, the analyzer 2310 and the reverse script translator 3002 that correspond to some of apparatus 3100.

R2D2C Implementation

Figure 32:
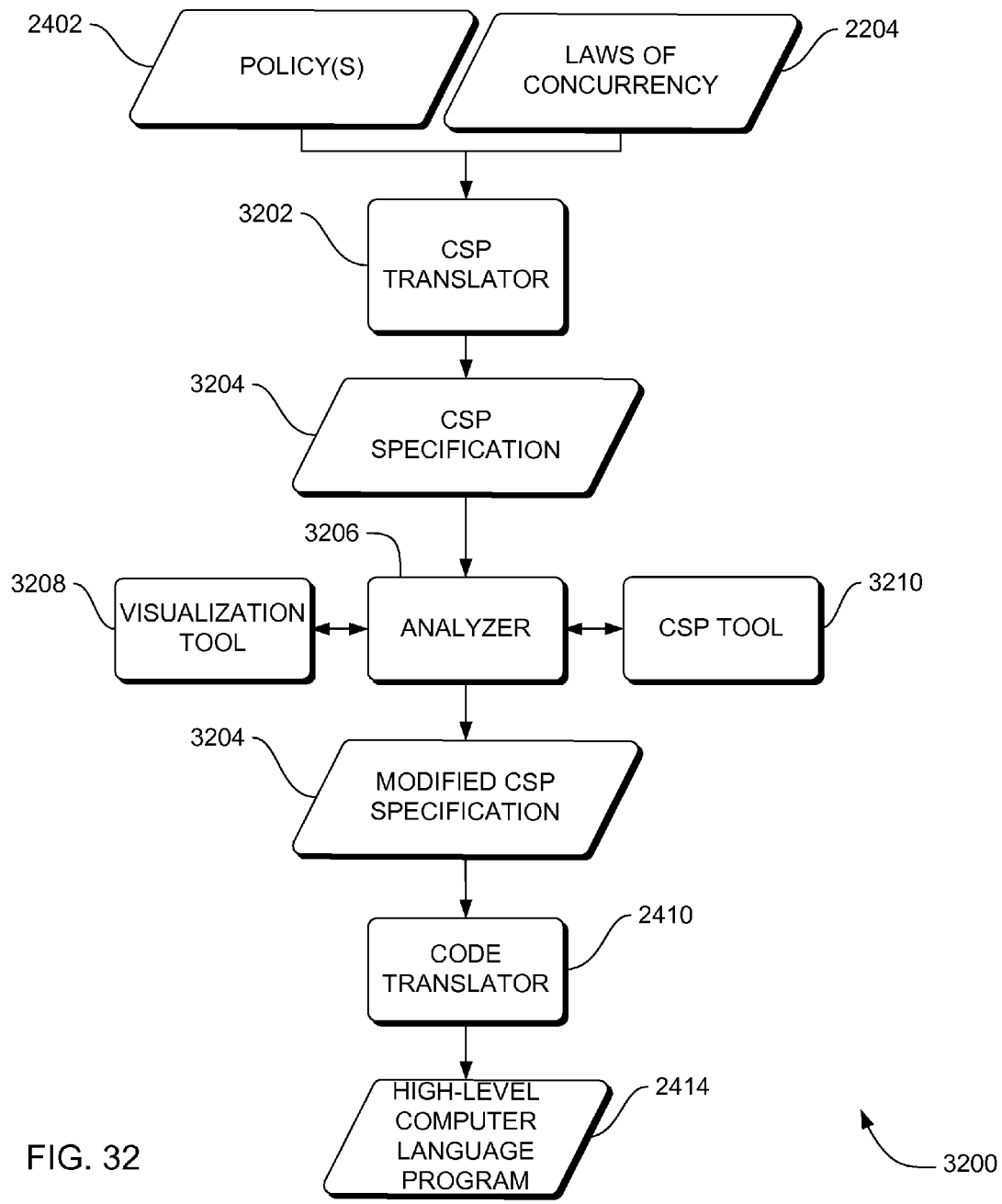
FIG. 32 is a block diagram of a R2D2C implementation of an apparatus to generate a high-level computer source code program from a policy, according to an embodiment.

Referring to FIG. 32, a particular R2D2C implementation 3200 is described in conjunction with the apparatus in FIG. 24 and the methods described in conjunction with FIG. 8 and FIG. 9.

FIG. 32 is a block diagram of a particular R2D2C implementation of an apparatus 3200 to generate a high-level computer source code program from a policy, according to an embodiment. Apparatus 3200 may solve the need in the art for an auto-mated, generally applicable way to produce a system that is a provably correct implementation of one or more policies that does not require use of a theorem-prover.

Apparatus 3200 may include a policy 2402 having a plurality of rules or requirements. The policy 2402 can be expressed in restricted natural language, graphical notations, or even using semi-formal notations such as unified modeling language (UML) use cases. Apparatus 3200 may also include a set of laws of concurrency 2204.

The policy 2402 and a set of laws of concurrency 2204 can be received by a mechanical CSP translator 3202. The plurality of rules or requirements of the policy 2402 can be translated mechanically to a specification 3204 encoded in Hoare's language of Communicating Sequential Processes (CSP). In some embodiments, the mechanical CSP translator 3202 can perform actions 802 and 804 in FIG. 8.

In some embodiments, the system may include a formal specification analyzer 3206 to perform model verification/checking and determine existence of omissions, deadlock, livelock and race conditions in the CSP specification 3204. In some embodiments, the formal specification analyzer 3206 can receive and transmit information from and to a visualization tool 3208 that can provide a way to modify the CSP specification 3204. In some embodiments, the formal specification analyzer 3206 can receive and transmit information from and to a tool 3210 designed for CSP that provides a way to modify the CSP specification 3204.

The formal specification analyzer 3206 may generate a modified CSP specification 3204 that is in turn received by a code translator 2410 or compiler to translate the plurality of formal specification segments 2406 to a set of instructions in a high-level computer language program 2414, such as Java language.

In some embodiments, formal specification analyzer 3206 may allow the user to manipulate the formal specification 3204 in various ways. The formal specification analyzer 3206 may allow the user to examine the system described by the policy 2402, and to manipulate it. The CSP specification 3204 may be analyzed to highlight undesirable behavior, such as race conditions, and equally important, to point out errors of omission in the policy 2402. The formal specification analyzer 3206 may be an optional but useful stage in the disclosed embodiments of the present invention. If the formal specification analyzer 3206 is not used, then the formal specification 2406 and the modified CSP specification 3204 can be identical. Hence, if the formal specification analyzer 3206 is not used, then all references to the modified CSP specification 3204 disclosed below may also apply to the CSP specification 3204.

In some embodiments, apparatus 3200 may not include a theorem-prover to infer the formal specification segments from the policy.

Apparatus 3200 can be operational for a wide variety of policy languages and applications, and thus apparatus 3200 can be generally applicable. Such applications may include distributed software systems, sensor networks, robot operation, complex scripts for spacecraft integration and testing, and autonomous systems.

Figure 33:
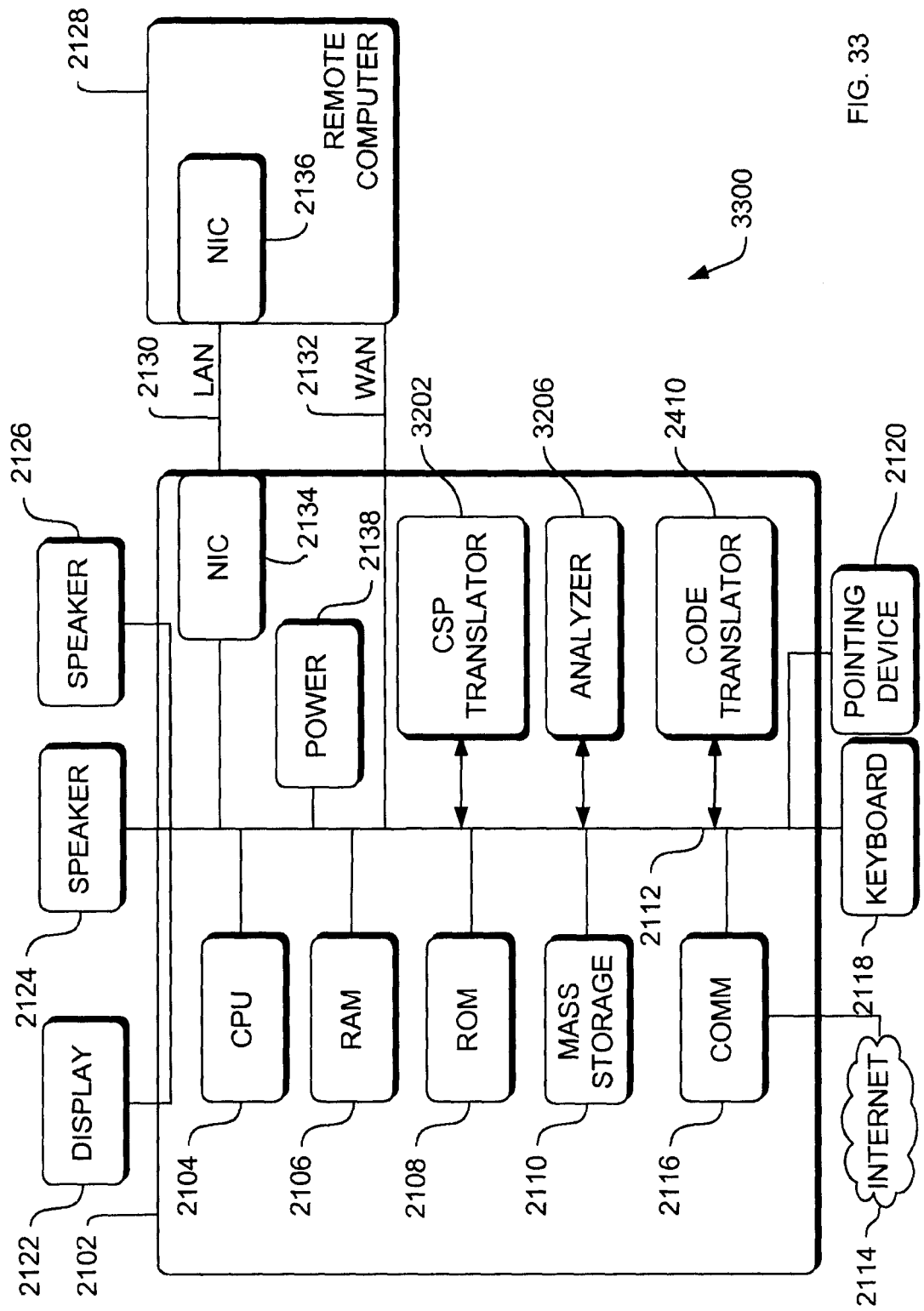
FIG. 33 is a block diagram of a hardware and operating environment in which a particular CSP implementation of FIG. 32 may be implemented, according to an embodiment.

Apparatus 3200 components of the mechanical CSP translator 3202, the formal specification analyzer 3206, visualization tool 3208, CSP tool 3210 and the code translator 2410 can be embodied as computer hardware circuitry or as a computer-readable program, or a combination of both, such as shown in FIG. 33. In another embodiment, apparatus 3200 may be implemented in an application service provider (ASP) system.

One approach to requirements-based programming may be requirements-to-design-to-code (R2D2C), which provides a mathematically tractable round-trip engineering approach to system development. In R2D2C, engineers (or others) write specifications as scenarios in constrained (domain-specific) natural language, or in a range of other notations (including UML use cases), which is integrated to derive a formal model that can be guaranteed to be equivalent to the requirements stated at the outset, and which might subsequently be used as a basis for code generation. The formal model can be expressed using a variety of formal methods such as CSP. The R2D2C approach can generate a formal model with automatic reverse engineering.

R2D2C may be unique in that the methodology allows for full formal development from the outset, and maintains mathematical soundness through all phases of the development process, from requirements through to automatic code generation. The approach may also be used for reverse engineering, that is, in retrieving models and formal specifications from existing code. R2D2C can also be used to "paraphrase" (in natural language, etc.) formal descriptions of existing systems. This approach is not limited to generating high-level code. R2D2C can also be used to generate business processes and procedures, and to generate instructions for robotic devices such as those used on the Hubble Robotic Servicing Mission (HRSM). R2D2C can also be used as a basis for an expert system verification tool, and as a way of capturing domain knowledge for expert systems, and for generating policies from requirements.

The R2D2C approach can involve a number of phases. The following describes each of these phases as understood in the prior art. The entire process, with D1 thru D5 illustrating the development approach, is suitable for various types of analysis and investigation, and as the basis for fully formal implementations as well as for use in automated test case generation and so forth.

D1 Scenarios Capture: Engineers, end users, and others write scenarios describing intended system operation. The input scenarios may be represented in a constrained natural language using a syntax-directed editor, or may be represented in other textual or graphical forms.

D2 Traces Generation: Traces and sequences of atomic events are derived from the scenarios defined in phase D1.

D3 Model Inference: A formal model, or formal specification, expressed in CSP is inferred by an automatic theorem-prover, in this case using the traces derived in phase D2. A deep embedding of the laws of concurrency in the theorem-prover gives it sufficient knowledge of concurrency and of CSP to perform the inference.

D4 Analysis: Based on the formal model, various analyses can be performed, using currently available commercial or public domain tools, and specialized tools that are planned for development. Because of the nature of CSP, the model may be analyzed at different levels of abstraction using a variety of possible implementation environments.

D5 Code Generation: The techniques of automatic code generation from a suitable model are reasonably well understood. The present modeling approach may be suitable for the application of existing code generation techniques, whether using a tool specifically developed for the purpose, or existing tools such as FDR, or converting to other notations suitable for code generation (e.g., converting CSP to B and then using the code generating capabilities of the B Toolkit).

In some embodiments, an exemplary system for automatic control of ground stations of overhead satellites may include both autonomous and autonomic properties and operate by having a community of distributed autonomous software modules work cooperatively based on policies to perform the functions previously undertaken by human operators using traditional software tools, such as orbit generators and command sequence planners. In an example, a pager agent and a mapping from natural language descriptions through to the CSP model can be used to generate code.

Based on defined policies, the pager agent can send pages to engineers and controllers when there is a spacecraft anomaly. For example, the pager agent receives requests from a user interface agent that no analyst is logged on, so it gets paging information from a database agent and pages an appropriate analyst, and, when instructed by the user interface agent stops paging the analyst. These policies can be stated as follows:

When the pager agent receives a request from the user interface agent, the pager agent sends a request to the database agent for an analyst's pager information and puts the message in a list of requests to the database agent. When the pager agent receives a pager number from the database agent, then the pager agent removes the message from the paging queue and sends a message to the analyst's pager and adds the analyst to the list of paged people. When the pager agent receives a message from the user interface agent to stop paging a particular analyst, the pager agent sends a stop-paging command to the analyst's pager and removes the analyst from the paged list. When the pager agent receives another kind of message, it replies to the sender that the message was not recognized.

The above policies could then be translated into CSP. The following could be a partial CSP description of the pager agent:

```
PAGER_BUSdbwaiting,paged = pager. Iin?msg→
  case
    GET_USER_INFOdb_waiting,paged,pagee,text
      if msg = (STARTPAGING, specialist, text)
          BEGIN_PAGINGdb_waiting,paged,in_reply_to_id(msg),
            pager-num
      if msg = (RETURN_DATA.pager_num)
    STOP_CONTACTdb_waiting,paged,pagee
      if msg = (STOP_PAGING, pagee)
    pager.Iout!(head(msg), UNRECOGNIZED)
      →PAGER_BUSdb_waiting,paged
    otherwise
```

The above pseudo-language description states that the process PAGER_BUS receives a message on its "Iin" channel and stores it in a variable called "msg". Depending on the contents of the message, one of four different processes is executed based on the policies. If the message is of type START_PAGING, then the GET_USER_INFO process is called with parameters of the specialist to page (pagee) and the text to send. If the message is of type RETURN_DATA with a pagee's pager number, then the database has returned a pager number and the BEGIN_PAGING process is executed with a parameter containing the original message id (used as a key to the db-waiting set) and the passed pager number. The third type of message that the pager agent might receive is one of type STOP_PAGING. This message contains a request to stop paging a particular specialist (stored in the pagee parameter). When this message is received, the STOP_PAGING process is executed with the parameter of the specialist type. If the pager agent receives any other message than the above three messages, an error message is returned to the sender of the message (which is the first item of the list) stating that the message is "UNRECOGNIZED". After this, the PAGER_BUS process is again executed.

Some of the benefits of using R2D2C, and hence of using Formal Requirements-Based Programming in system development may include increasing assurance of system success by ensuring completeness and consistency of requirements, by ensuring that implementations are true to the requirements, by ensuring that automatically coded systems are bug-free; and by ensuring that implementation behavior is as expected. Another benefit may be decreased costs and schedule impacts of ultra-high dependability systems through automated development and yet another benefit could be decreased re-engineering costs and delays.

FIG. 33 is a block diagram of a hardware and operating environment 3300 in which a particular CSP implementation of FIG. 32 is implemented.

Policy Implementation

Figure 34:
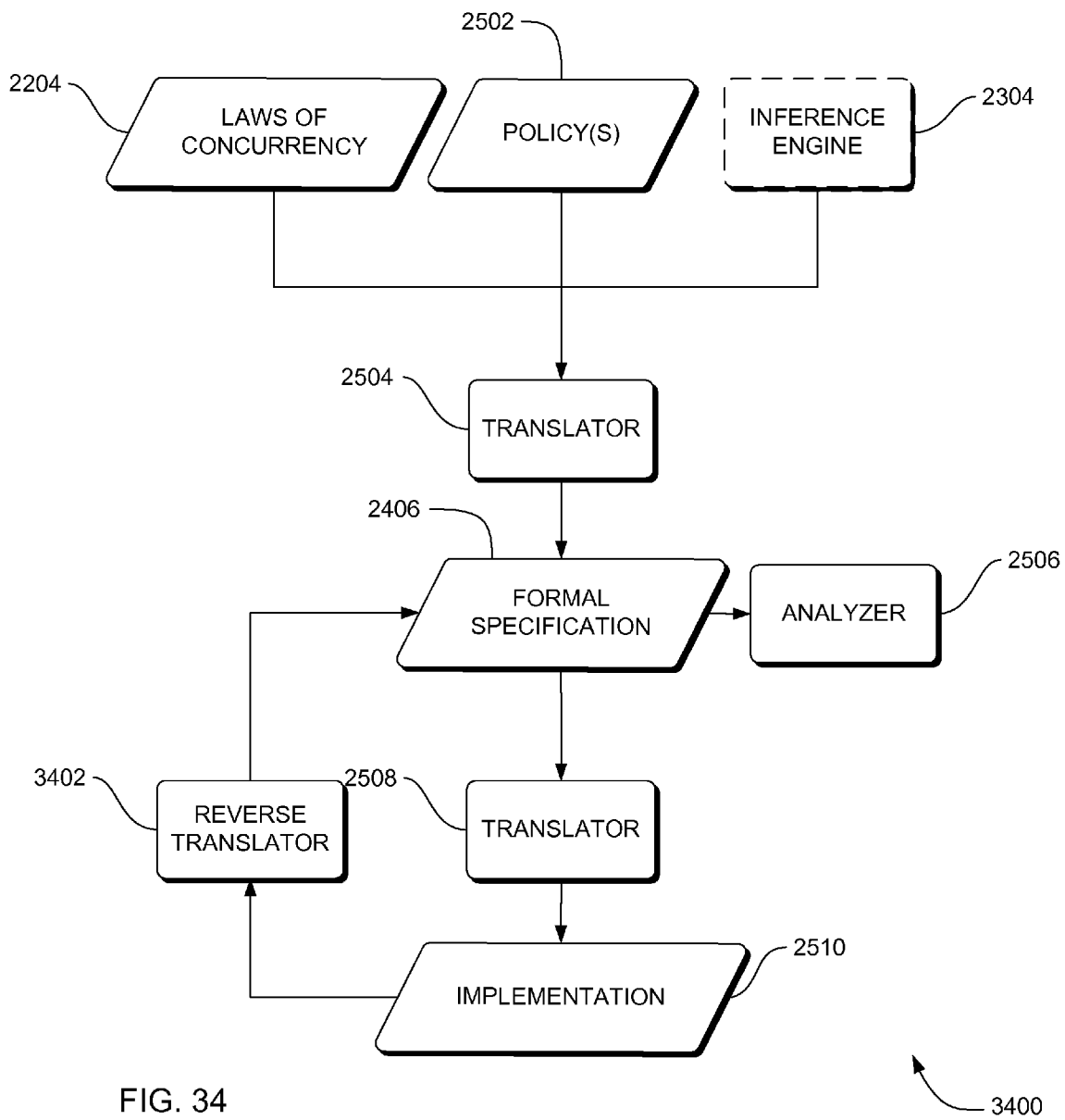
FIG. 34 is a block diagram of an implementation of an apparatus capable of translating one or more policies to a formal specification, according to an embodiment.
Figure 35:
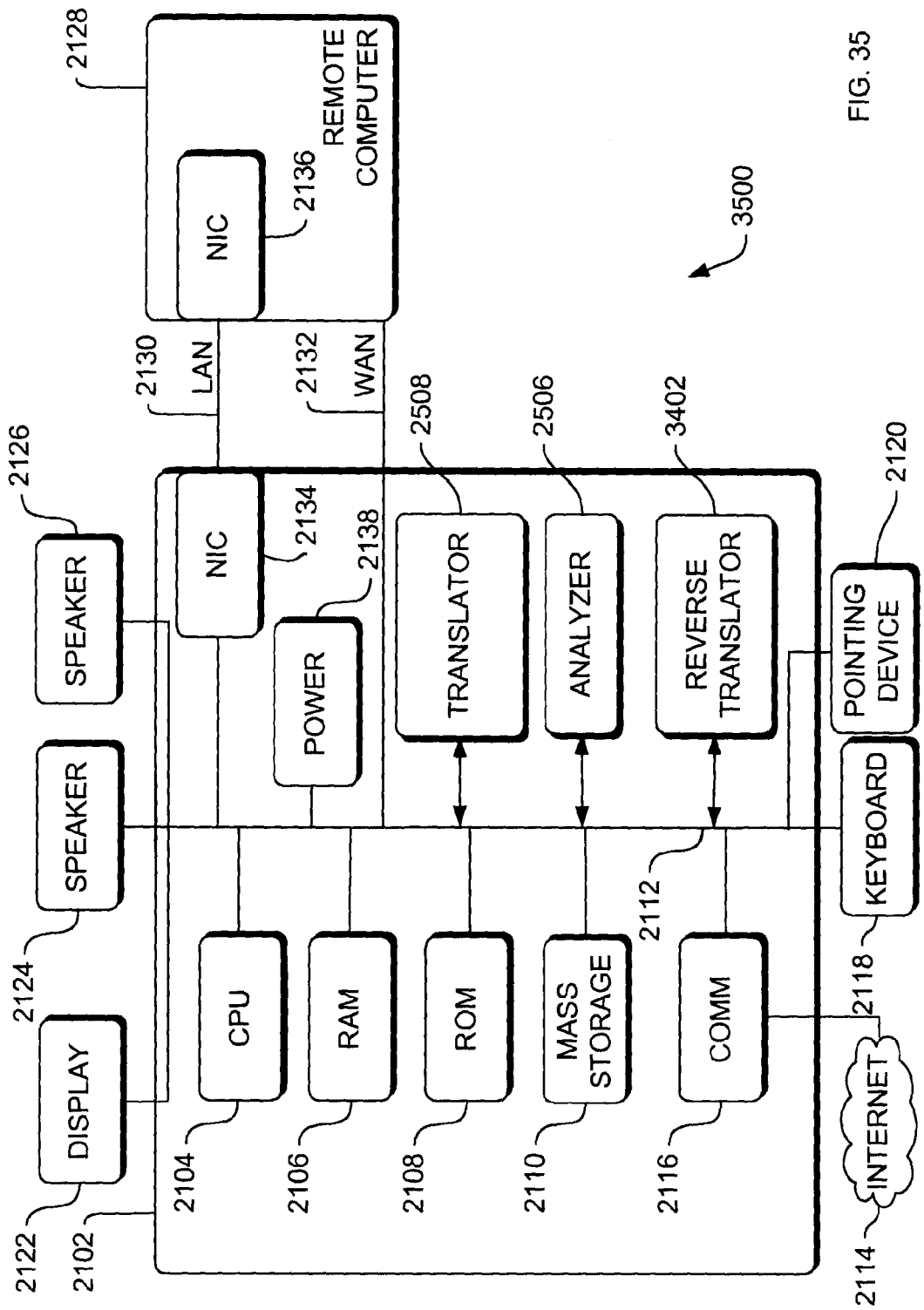
FIG. 35 is a block diagram of a hardware and operating environment in which components of FIG. 34 can be implemented, according to an embodiment.

Referring to FIGS. 34 and 35, a particular scripting language implementation 3400 is described in conjunction with the apparatus in FIG. 23 and the methods described in conjunction with FIGS. 2-20.

FIG. 34 is a block diagram of a particular implementation of an apparatus 3400 capable of translating policies to a formal specification, according to an embodiment. Apparatus 3400 may solve the need in the art for an automated, generally applicable way to verify that implementations are a provably correct implementation of a policy.

Apparatus 3400 can include a translator 2504 that generates a formal specification 2406 from the laws of concurrency 2204 and the policy(s) 2502 in reference to the optional inference engine 2304.

Subsequently, the formal specification 2406 may be translated by translator 2508 into an implementation 2510, such as some appropriate scripting language. In some embodiments, no manual intervention in the translation is provided. Those skilled in the art will readily understand that other appropriate notations and/or languages exist that are within the scope of this invention.

In some embodiments, apparatus 3400 can include an analyzer 2506 to determine various properties of the formal specification, such as the existence of omissions, deadlock, livelock, and race conditions, as well as other conditions, in the formal specification 2406, although one skilled in the art will recognize that other additional properties can be determined by the analyzer 2506. The analyzer 2506 may solve the need in the prior art to reduce errors.

In some embodiments, a reverse translator 3402 receives the implementation 2510 and generates a formal specification. The output of the reverse translator 3402 is a different formal specification than formal specification 2406. There can be some small differences between the formal specification generated by reverse translator 3402 and formal specification 2406, but the formal specifications generated by the reverse translator 3402 can be substantially functionally equivalent to the formal specification 2406.

Apparatus 3400 can operate for a wide variety of languages and applications, and thus apparatus 3400 can be generally applicable. Such applications can include, without limitation, distributed software systems, sensor networks, robot operation, complex scripts for spacecraft integration and testing, and autonomous systems, but those skilled in the art will understand that other applications are contemplated.

Apparatus 3400 components such as the translator 2504, translator 2508, the analyzer 2506, and the reverse translator 3402 can be embodied as computer hardware circuitry or as a computer-readable program, or a combination of both, such as shown in FIG. 35. In another embodiment, apparatus 3400 can be implemented in an application service provider (ASP) system.

FIG. 35 illustrates an environment 3500 similar to that of FIG. 21, but with the addition of the translator 2508, the analyzer 2506 and the reverse translator 3402 that correspond to some of apparatus 3400.

Figure 36:
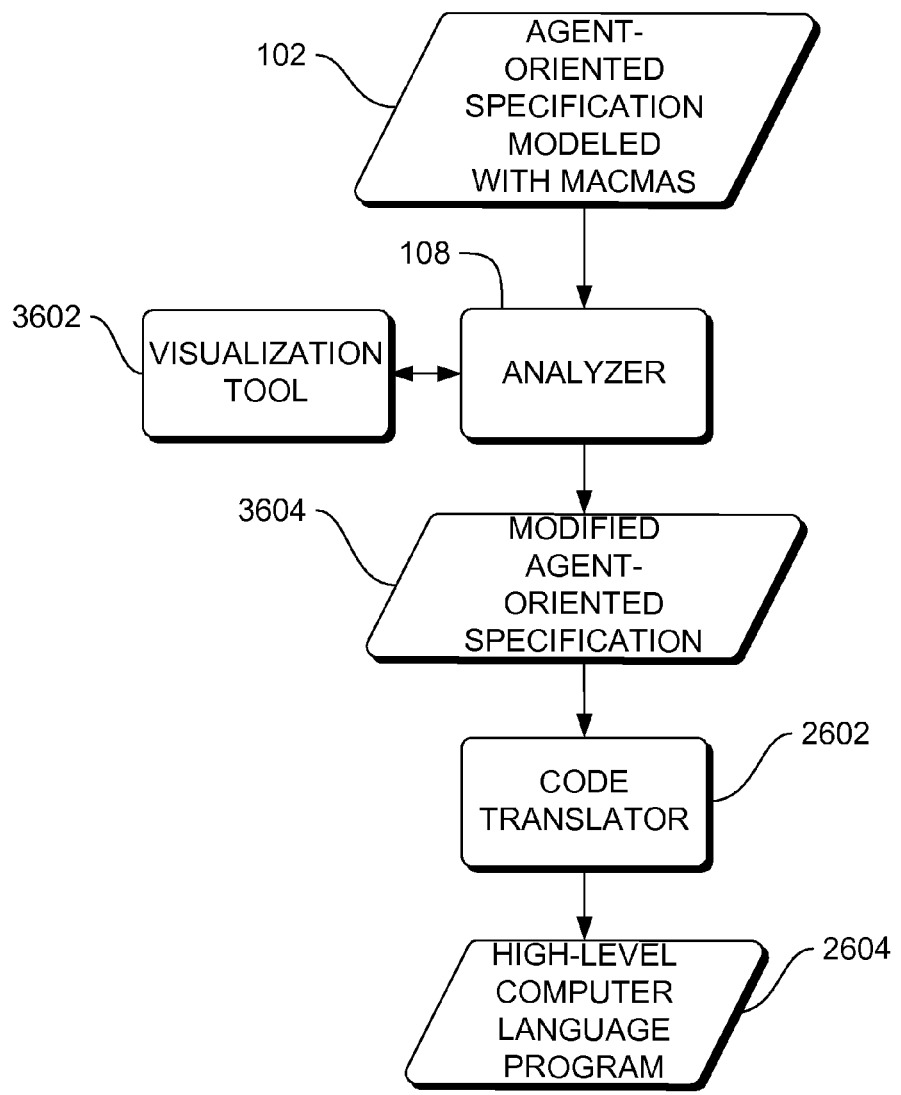
FIG. 36 is a block diagram of a particular implementation of an apparatus to generate a high-level computer source code program from an agent-oriented specification modeled with MaCMAS, according to an embodiment.

FIG. 36 is a block diagram of a particular implementation of an apparatus 3600 to generate a high-level computer source code program from an agent-oriented specification(s) modeled with MaCMAS, according to an embodiment. Apparatus 3600 may solve the need in the art for an automated, generally applicable way to produce a system that can be a provably correct implementation of an agent-oriented specification(s) modeled with MaCMAS 102 that does not require use of a theorem-prover.

Apparatus 3600 may include an analyzer 108 of agent-oriented specification(s) modeled with MaCMAS 102 that can receive and transmit information from and to a visualization tool 3602 that can provide a way to generate a modified agent-oriented specification modeled with MaCMAS 3604. In some embodiments, the analyzer 108 can receive and transmit information from and to a tool designed for agent-oriented specification(s) modeled with MaCMAS 102 that can provide a way to modify the agent-oriented specification(s) modeled with MaCMAS 102.

The analyzer 108 can generate a modified agent-oriented specification(s) modeled with MaCMAS 3604 that can be in turn be received by a code translator 2602 or other compiler to translate the plurality of modified agent-oriented specification segment(s) modeled with MaCMAS 3604 to a set of instructions in a high-level computer language program 2604, such as Java language.

Analyzer 108 may provide a way to the user to manipulate the agent-oriented specification(s) modeled with MaCMAS 102 in various ways. The agent-oriented specification(s) modeled with MaCMAS 102 can be analyzed to highlight undesirable behavior, such as race conditions and to point out errors of omission in the agent-oriented specification modeled with MaCMAS 102. The analyzer 108 can be an optional but useful stage in the disclosed embodiments of the present invention. If the analyzer 108 is not used, then the modified agent-oriented specification(s) modeled with MaCMAS 3604 can be identical. Hence, if the analyzer 108 is not used then all references to the modified agent-oriented specification(s) modeled with MaCMAS 3604 disclosed below can also apply to the agent-oriented specification(s) modeled with MaCMAS 102.

Apparatus 3600 can be operational for a wide variety of agent-oriented specification(s) modeled with MaCMAS languages and applications, thus apparatus 3600 can be generally applicable. Such applications may include distributed software systems, sensor networks, robot operation, complex scripts for spacecraft integration and testing, and autonomous systems.

Figure 37:
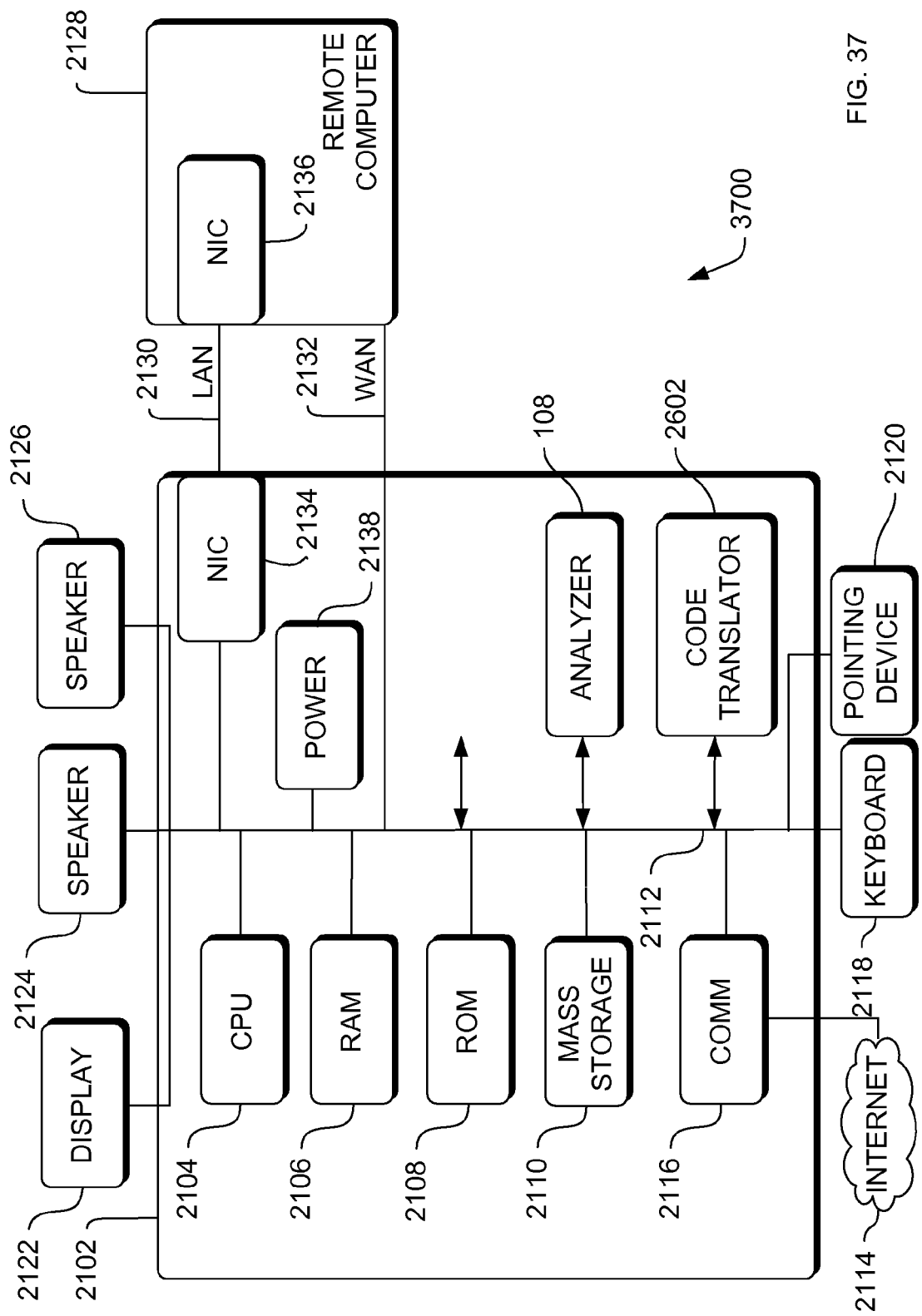
FIG. 37 is a block diagram of a hardware and operating environment of a particular implementation of FIG. 36, according to an embodiment.

Apparatus 3600 components of the analyzer 108, visualization tool 3602, and the code translator 2602 can be embodied as computer hardware circuitry or as a computer-readable program, or a combination of both, such as shown in FIG. 37. In another embodiment, apparatus 3600 may be implemented in an application service provider (ASP) system. In some embodiments, apparatus 3600 may not include a theorem-prover to infer the process-based specification segments from the informal specification.

FIG. 37 is a block diagram of a hardware and operating environment of a particular implementation of FIG. 36.

Script Implementation

Referring to FIGS. 38 and 39, a particular scripting language implementation 3800 is described in conjunction with the system overview in FIG. 27 and the methods described in conjunction with FIGS. 2-20.

FIG. 38 is a block diagram of a particular implementation of an apparatus capable to translate agent-oriented specification(s) modeled with MaCMAS to a script and reverse engineer (translate) a script into an agent-oriented specification(s) modeled with MaCMAS (and optionally analyze the agent-oriented specification(s) modeled with MaCMAS), according to an embodiment. Apparatus 3800 may solve the need in the art for an automated, generally applicable way to verify that implemented scripts can be a provably correct implementation of agent-oriented specification(s) modeled with MaCMAS.

Apparatus 3800 can include an agent-oriented specification modeled with MaCMAS 2708 that can be translated by script translator 2702 into a script 2704 in some appropriate scripting language. In some embodiments, no manual intervention in the translation may be provided. Those skilled in the art will readily understand that other appropriate notations and/or languages exist that can be within the scope of apparatus 3800.

In some embodiments, apparatus 3800 can include an analyzer 108 to determine various properties of the agent-oriented specification(s) modeled with MaCMAS 102, such as the existence of omissions, deadlock, livelock, and race conditions, as well as other conditions, in the agent-oriented specification(s) modeled with MaCMAS 102, although one skilled in the art will recognize that other additional properties can be determined by the analyzer 108. The analyzer 108 may solve the need in the prior art to reduce errors.

In some embodiments, a reverse script translator 3802 can receive the script 2704 and generate an agent-oriented specification(s) modeled with MaCMAS. The output of the reverse script translator 3802 can be a different agent-oriented specification(s) modeled with MaCMAS than agent-oriented specification(s) modeled with MaCMAS 102. There can be some small differences between the agent-oriented specification(s) modeled with MaCMAS generated by reverse script translator 3802 and agent-oriented specification(s) modeled with MaCMAS 102, but the agent-oriented specification(s) modeled with MaCMAS generated by the reverse script translator 3802 can be a substantially functionally equivalent to the agent-oriented specification(s) modeled with MaCMAS 102.

Apparatus 3800 can operate for a wide variety of languages and applications, and thus apparatus 3800 can be generally applicable. Such applications can include, without limitation, distributed software systems, sensor networks, robot operation, complex scripts for spacecraft integration and testing, and autonomous systems, but those skilled in the art will understand that other applications are contemplated.

Apparatus 3800 components such as the script translator 2702, the analyzer 108, and the reverse script translator 3802 can be embodied as computer hardware circuitry or as a computer-readable program, or a combination of both, such as shown in FIG. 39. In another embodiment, apparatus 3800 can be implemented in an application service provider (ASP) system.

FIG. 39 illustrates an environment 3900 similar to that of FIG. 21, but with the addition of the script translator 2702, the analyzer 108 and the reverse script translator 3802 that correspond to some of apparatus 3800.

In a computer-readable program embodiment, the programs can be structured in an object-orientation using an object-oriented language such as Java, Smalltalk or C++, and the programs can be structured in a procedural-orientation using a procedural language such as COBOL or C. The software components can communicate in any of a number of ways that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components can execute on as few as one computer as in computer 2102 in FIG. 21, or on at least as many computers as there are components.

Figure 40:
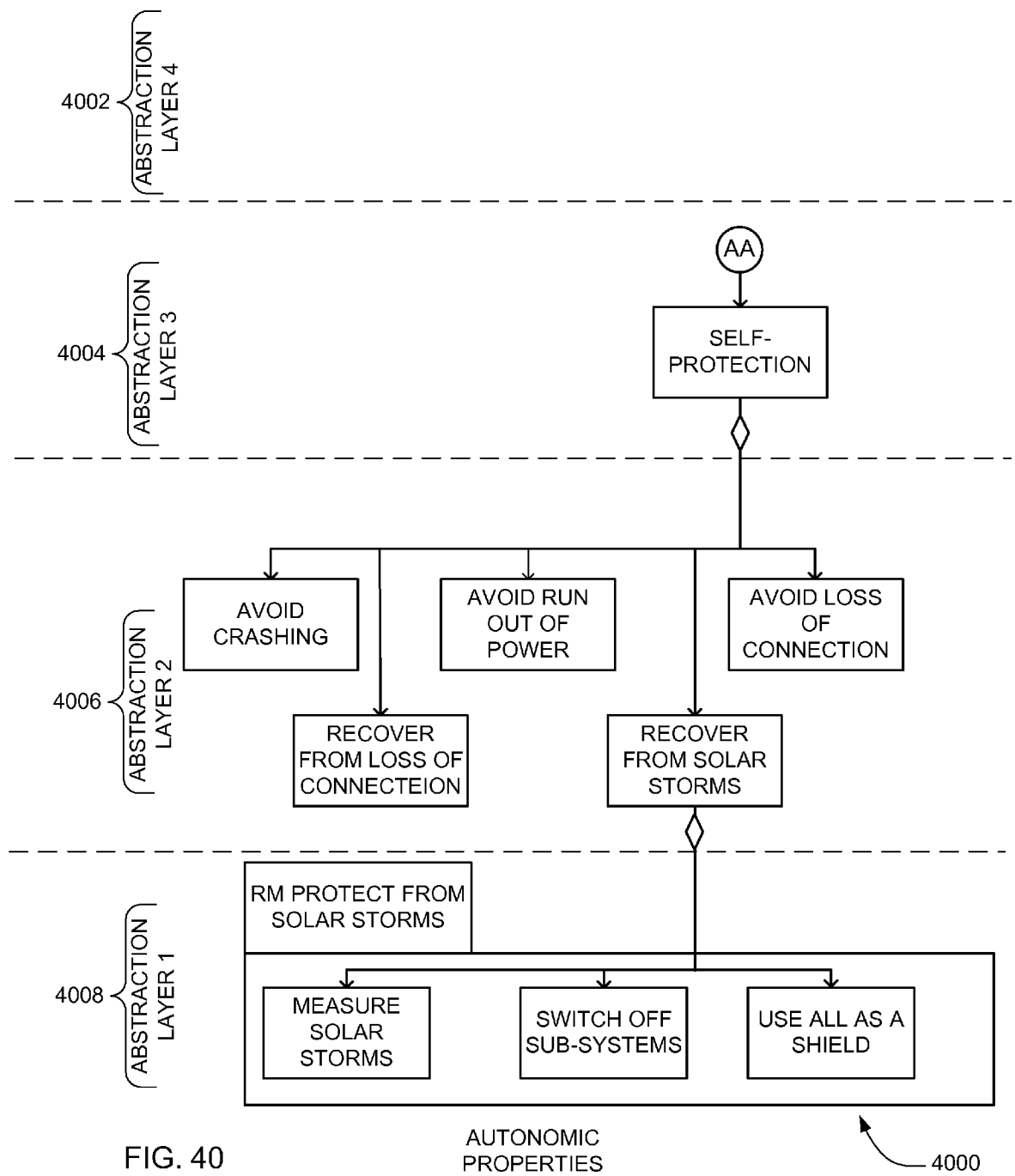
FIGS. 40-42 are traceability diagrams of MaCMAS implementations in autonomous nano-technology swarms, according to specific embodiments.
Figure 41:
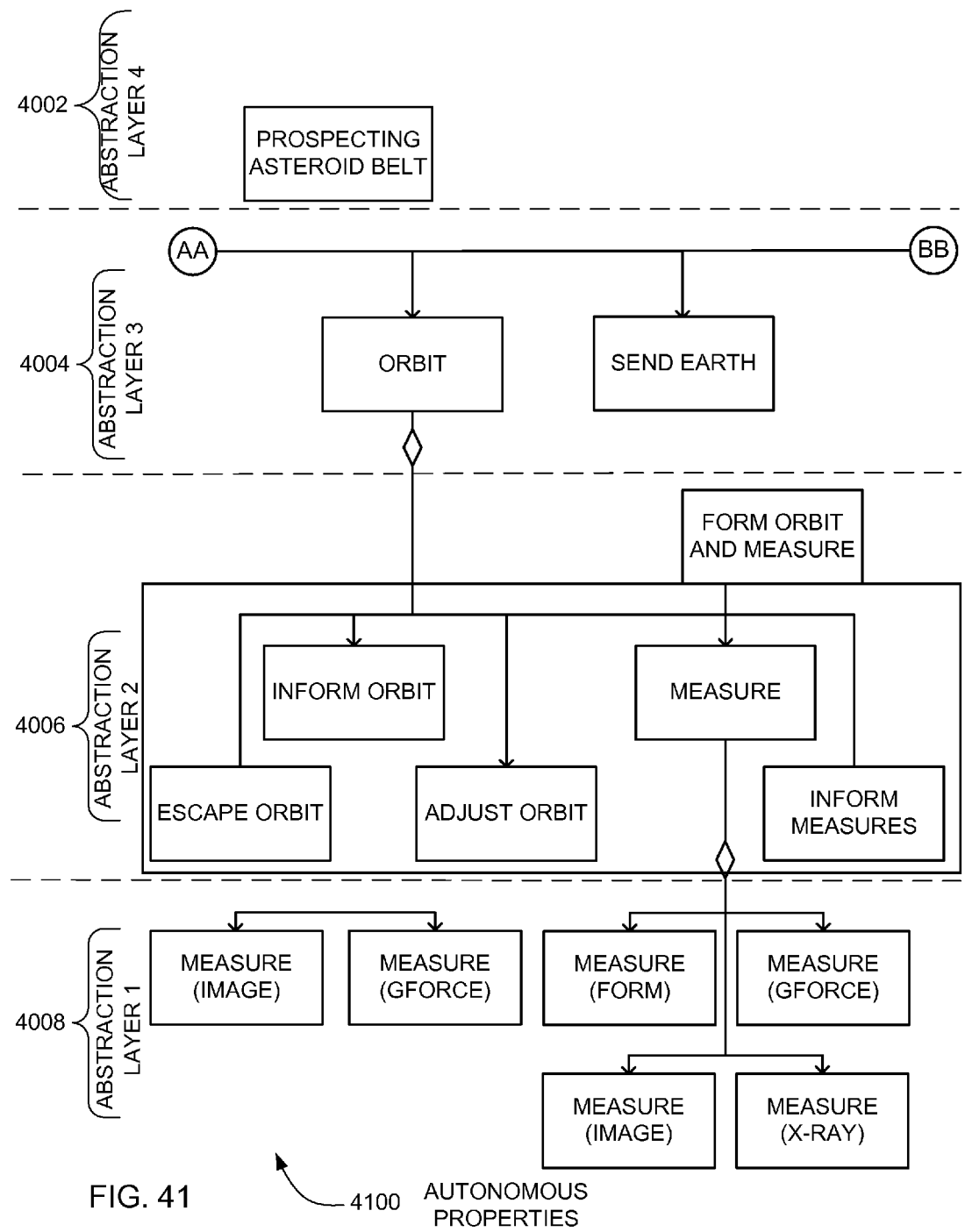
Figure 42:
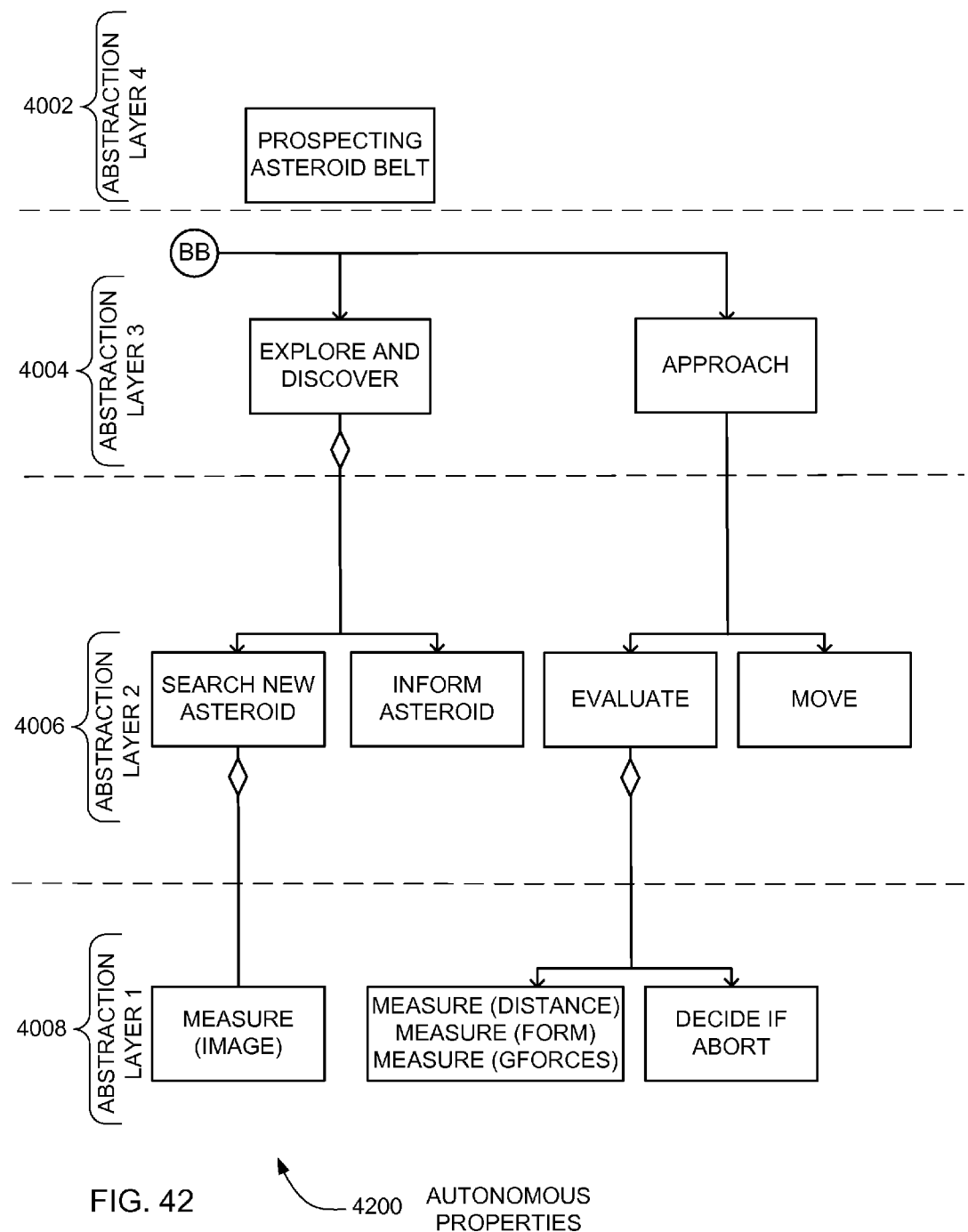

FIGS. 40-42 are traceability diagrams of MaCMAS implementations in autonomous nano-technology (ANT) swarms, according to specific embodiments. After applying MaCMAS to an ANTS system, the traceability diagram of FIGS. 40-42 can be obtained. The diagrams of FIGS. 40-42 can summarize the mRIs in the system structured by layers of abstraction. In the diagrams of FIGS. 40-42, the top layer 4002 (abstraction layer 4) may be the most abstract. As each node can represent a system-goal also, the division of tasks that can be undertaken to develop the system are shown in FIGS. 40-42. As each mRI can be inside a role model, which roles determined to carry out by observing the role models may be evident. In the model shown, several sub-regions are depicted. Horizontal subdivisions are shown to depict layers of abstraction 4002, 4004, 4006 and 4008. In addition to mRIs, MaCMAS also can use UML packages to represent role models that contain several mRIs. Diagrams of FIGS. 40-42 identify two of these packages, which group the mRIs used in the example that follows.

To foster reuse, to model an autonomous or an autonomic property in a sufficiently generic and generalized way, and to enable a policy to be deployed at runtime, properties can be independent of the concrete agents over which the properties will be deployed. The features required to have an appropriate description may correlate with the features of an acquaintance sub-organization. To represent organization, MaCMAS can propose two kinds of models—one for showing the relationships between roles, that is, role models, and another to show how these relationships evolve over time, in other words, plan models.

Figure 45:
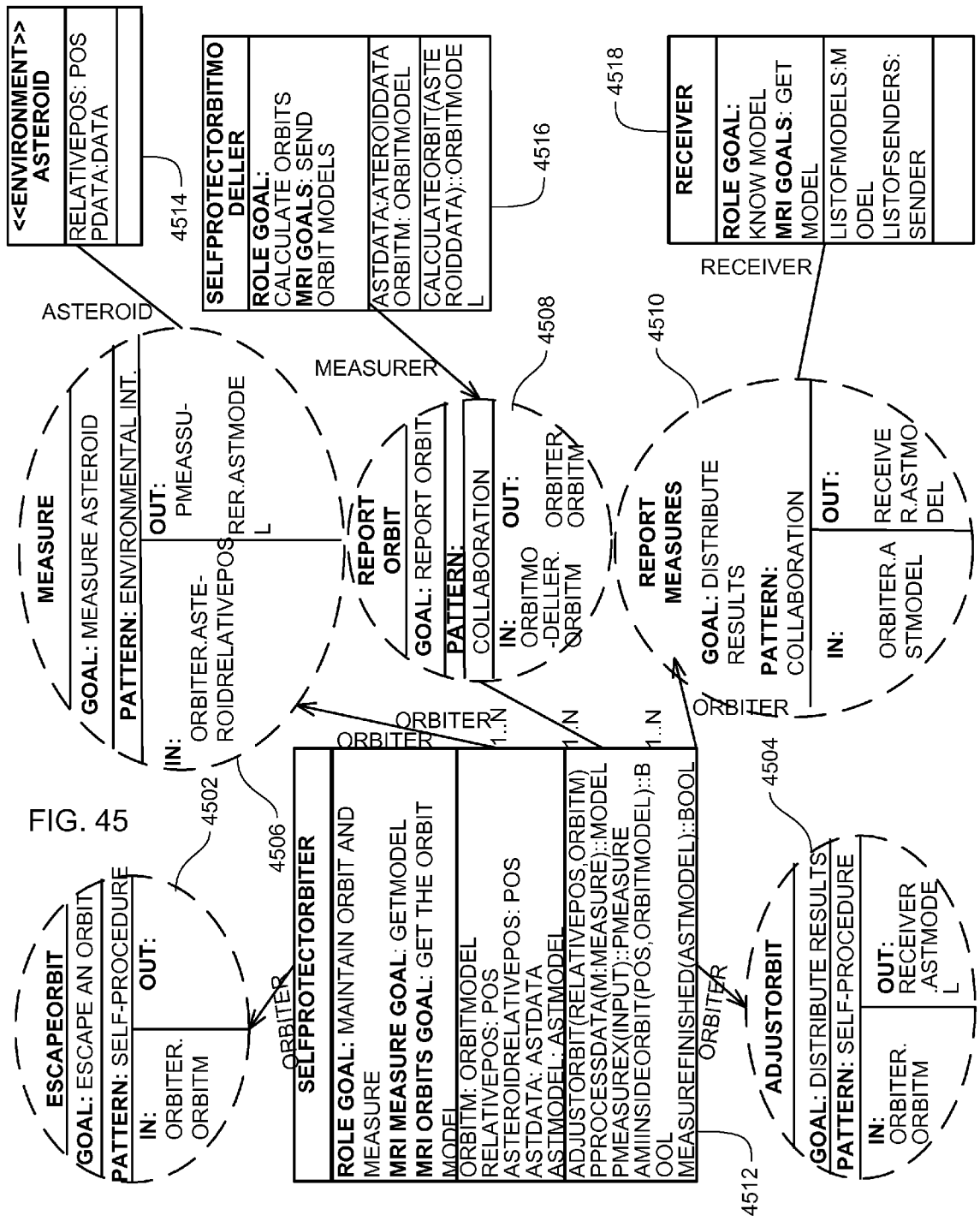
FIG. 45 and FIG. 46 are block diagrams of behavior of acquaintance organization views, according to embodiments.

For example, showing the autonomous process of orbiting an asteroid to take a measurement can require at least two models—its role model and its plan model. FIG. 45 below shows the role model for the autonomous process of orbiting an asteroid to take a measurement case. The models form the third layer 4004 of abstraction of FIGS. 40-42. The model can include two kinds of elements: roles, which are represented using interface-like icons, and mRIs, which are represented as collaboration-like icons. Roles in the model show which can be a general goal and particular goals of the roles when participating in a certain interaction with other roles or with some part of the environment (represented using interfaces with the <<environment>> stereotype). Roles can also represent the knowledge (middle compartment) and services (bottom compartment). For example, the goal of the orbiter role can be "maintain the orbit and measure [the asteroid]", while its goal when participating in the Report Orbit interaction can be to obtain a model of the orbit it must follow. In addition to roles, mRIs can also present some important information. The mRIs can also show the system-goal achieved by the mRIs when executed, the kind of coordination that can be carried out when executed, the knowledge used as input to achieve the goal, and the knowledge produced. For example, the goal of the mRI Report Orbit can be to "Report the Orbit." The goal can be achieved by taking as input the knowledge of the OrbitModeler regarding the orbit; and producing as output the model for the orbit (orbitM) in the Orbiter role.

Figure 43:
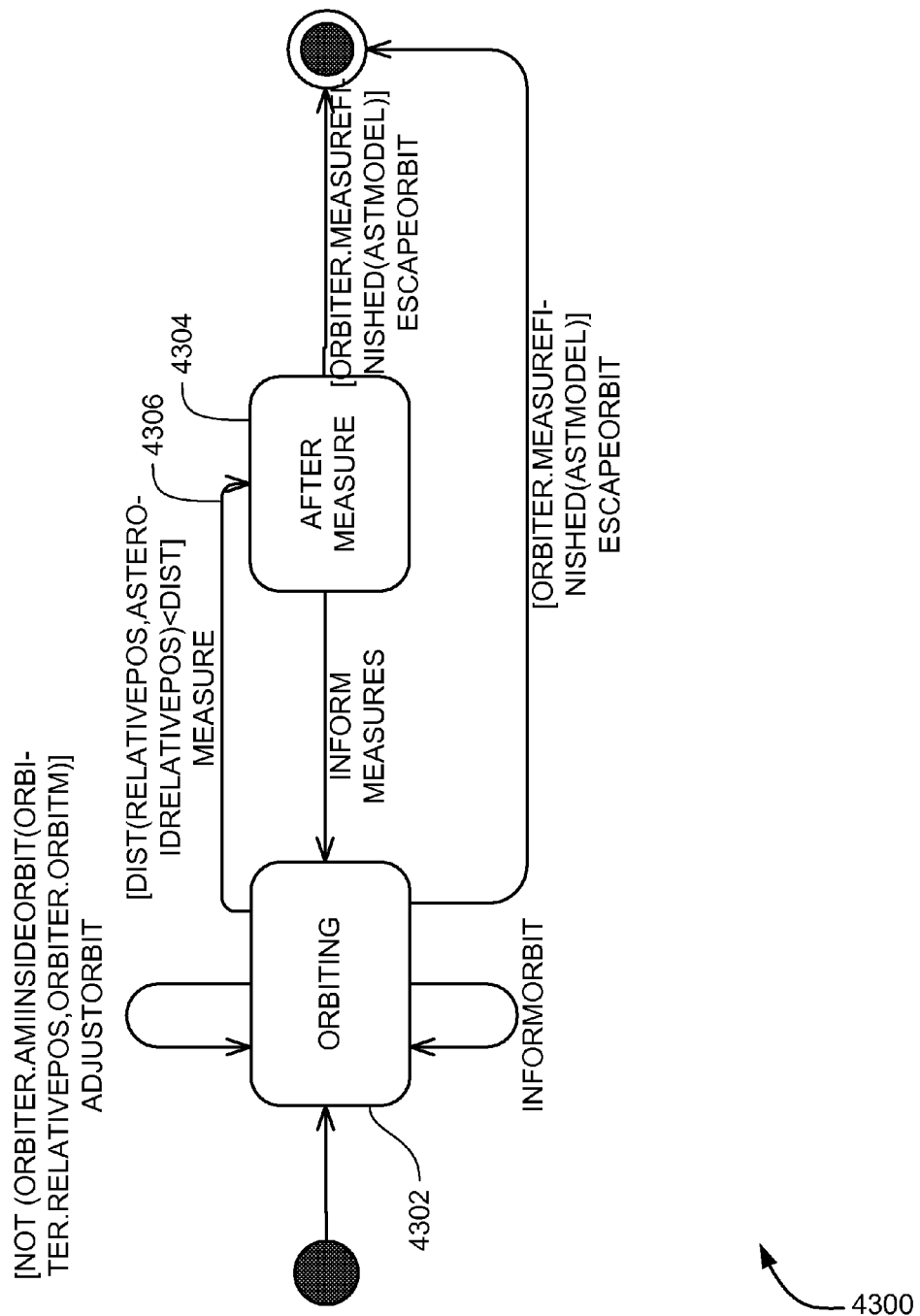
FIG. 43 is a diagram of a role model showing the order of execution of all multi-Role Interactions, according to an embodiment.

Continuing with the example, FIG. 43 shows a plan model of a role model where the order of execution of all its mRIs is illustrated. The Orbiter, while in orbit, can adjust its orbit and measuring and reporting measures. And when the Orbiter has completed constructing a model of the asteroid, the Orbiter can escape the orbit using knowledge of the orbit model (orbitM).

Autonomic properties can be similarly modeled. Because role models can be used at any level of abstraction, the role models can specify autonomic properties that concern a single agent, or even a group of agents when dealing with autonomic properties at the swarm level. Thus, as shown in the traceability model, a role model at abstraction layer 2 4006 can show the swarm autonomic behavior, while at abstraction layer 4 4002, an autonomic property may be at the level of individual spacecraft.

Figure 46:
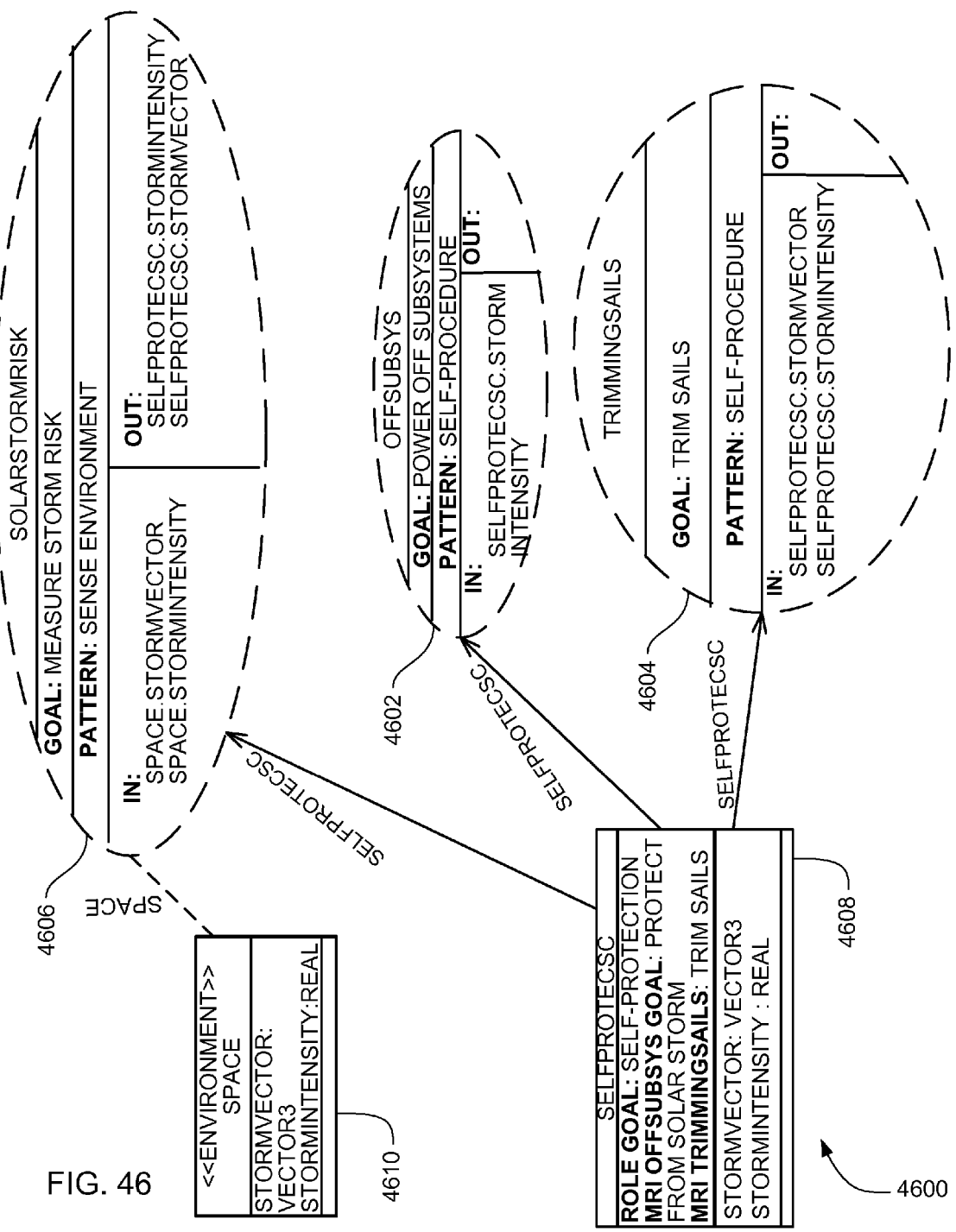

FIG. 46 illustrates a model at abstraction layer 4 4002 for self-protection autonomic properties protecting from solar storms. The role model for the self-protection autonomic properties is shown in FIG. 46. Because the role model can be a property at the individual level, a single role is shown (SelfProtectSpaceCraft). A plan model is shown in FIG. 45. As all the spacecraft can be affected by solar storms, the role model can be applied to all the spacecraft in the swarm, thus adding the self-protection autonomic properties to all of spacecraft in the swarm.

In building and structural organization used at runtime, role models can be composed. Since the MaCMAS methodology proposes several methods for composition, the methods can be used to modify the policies taken into account in the system at runtime or at design time. Policies can be added to a system as follows:

1. Specifying the policy using a sub-set of a natural language.
2. Analyzing the policy to find out which role models or interactions and consequently which autonomic and autonomous properties can be involved in the policy.
3. Composing the role models, both static and dynamic aspects of the role model.
4. Deploying the changes in the system using role model composition. The running system can have a set of role models mapped over structural organization of the running system. Thus, adding a new policy can include composing the role models involved in the new policy following its prescriptions.

FIGS. 43-51 are diagrams of MaCMAS implementations in autonomous nano-technology (ANT) swarms, according to specific embodiments. FIGS. 43-51 use the MaCMAS extension of the Unified Modeling Language (UML) 2.0, which is the industry-standard language to specify, visualize, construct, and document the object-oriented artifacts of software systems. In the figures, traceability diagrams are shown. The diagrams are based on a modification of UML class diagrams. In the diagrams, classes can represent system goals (requirements of the system). As shown, each class may be related with a set of classes. This may represent that a system goal can be decomposed into several system goals. Thus, an aggregation or composition association between system goals can be used to indicate that a system goal, represented by class, may be composed of the lower depicted classes. Composition defines the attributes of an instance of a class/role, in other words, an agent, as containing an instance of one or more existing instances of other classes/roles in which the composing object/agents does not inherit from the object(s)/agent(s) it can be composed of.

In FIGS. 40-51, an embodiment of an evolutionary MAS is modeled. As discussed above, each product in a MAS-PL can be defined as a set of features. Given that all the products present a set of features that remain unchanged, the core architecture can be defined as the part of all of the products that implement these common features. Thus, a system can evolve by changing, or evolving, the set of non-core features.

A product or a state in an evolutionary system can be defined as a set of features. Let $F=\{f1 \ldots fn\}$ be the set of all features of a MAS-PL. Let $cF \subset F$ be the set of core features and $ncF=F\backslash CF$ be the set of non-core features. A valid state of the system can be defined as the set of core features and a set of non-core features, in other words, $S=cF \cup sF$, where $sF \subset ncF$ can be a subset of non-core features.

Given that, the evolution from one state $S_{i-1}$ to another $S_i$ can be defined as: $S_i=S_{i-1} \cup nF_{i,i-1}\backslash dF_{,i-1}$ where $nF_{i,i-1} \subset ncF$ can be the set of new features and $dF_{i,i-1} \subset ncF$ can be the set of deleted features. $\Delta_{i,i-1}$ describes the variation between the product of the state i−1 and the product of the state i, that can be to say, $nF_{i,i-1}\backslash dF_{i,i-1}$.

In some embodiments, a feature can correlate with a role model. Thus, for a system to evolve from one state to another, the role models in nF and dF can be composed or decomposed. Specifically, the role models can be composed corresponding to the features in nF with the role models corresponding to the features that remain unchanged from the initial state $S_{i-1}$, in other words, $S_i\backslash dF_{i,i-1}$. Decomposition can be used for role models that must be eliminated. In FIGS. 43-51, role models, and the operations for composition and decomposition can be described.

In FIGS. 43-51, role models, and the operations for composition and decomposition are described. In the illustrated embodiments, the Methodology for Analyzing Complex Multiagent Systems (MaCMAS) can be implemented.

A static acquaintance organization view can show static interaction relationships between roles in the system and knowledge processed by the roles. The static acquaintance organization may include models for representing the ontology managed by agents, models for representing dependencies, and role models of the agents.

FIGS. 43-51 can be used to describe a swarm of pico-spacecrafts that can be used to prospect the asteroid belt. The enterprise architecture of the system can change at run-time depending on the environment and the state of the swarm. From all the possible evolutions, only two states of the system are shown in FIGS. 43-51.

FIG. 43 is a state diagram that describes a plan 4300 of a role model, the role model described in FIG. 45. Plan 4300 shows an order of execution of a multi-Role Interaction (mRI). In FIG. 43, a first state 4302 can depict the swarm orbiting an asteroid in order to analyze the asteroid. In the second state 4304, a solar storm can occur in the environment and the system can change 4306 the state of the system to protect the system.

Figure 44:
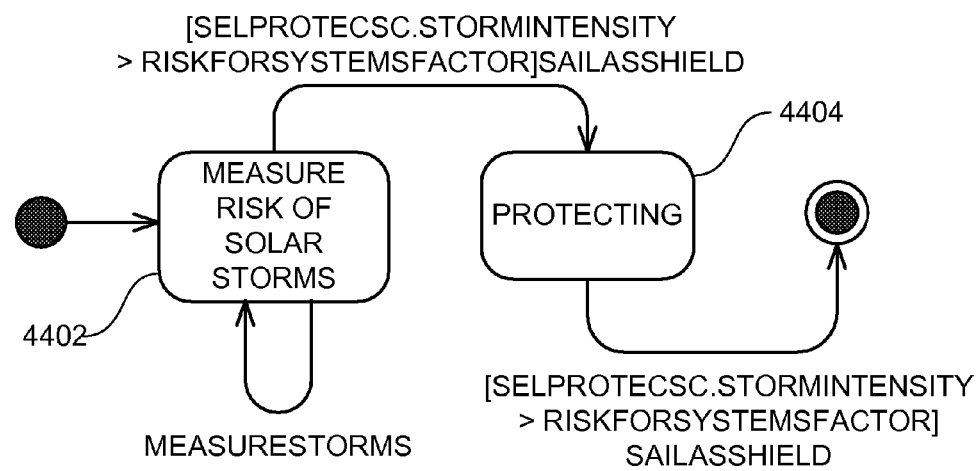
FIG. 44 is a block diagram of an acquaintance sub-organization as a set of roles collaborating by way of several multi-role interactions, according to an embodiment.

FIG. 44 is a state diagram that describes a plan 4400 of a role model, the role model described in FIG. 46. Plan 4400 shows an order of execution of a mRI. In FIG. 44, examples of role models for both states are shown and an example of composition of both states, since both features of the system may not be completely orthogonal. To protect from a solar storm the spacecraft can take two basic actions: (a) measure 4402 risk of solar storms and (b) power-off 4404 all possible electronic components. Action (a) can minimize the forces from impinging solar-storm particles, which could affect the spacecraft's orbit. Both actions 4402 and 4404 can minimize potential damage from the charged particles in the storm, which can degrade sensors, detectors, electronic circuits, and solar energy collectors.

FIG. 45 and FIG. 46 are block diagrams of a static acquaintance sub-organization as a set of static roles 4500 and 4600, respectively. Roles 4500 and 4600 can collaborate by use of several multi-Role Interactions (mRI), according to embodiments. Roles 1800 and 1900 can show all roles, in comparison to plans 4300 and 4400 that can show the order of execution of multi-Role Interactions (mRI). Such mRIs can be used to abstract the acquaintance relationships among roles in the system. As mRIs allow abstract representation of interactions, these models can be implemented at one or more levels.

In FIG. 45, a static role model represents how a swarm of spacecraft orbits an asteroid and measures the asteroid, according to an embodiment. In FIG. 46, static role model 4600 represents how a swarm of spacecraft protects from a solar storm while the swarm spacecraft continues in orbit, according to an embodiment. In FIG. 45 and FIG. 46, interfaces, represented as boxes, can represent the static features of roles showing goals, the knowledge managed, and services provided by the roles. The mRIs, represented as dashed ellipses in FIG. 45 and FIG. 46, can represent the interactions between the roles linked to the roles, showing the goal when collaborating, the pattern of collaboration, and the knowledge consumed, used, and obtained from the collaboration. Static role model 4500 may include mRIs EscapeOrbit 4502, AdjustOrbit 4504, Measure 4506, ReportOrbit 4508 and ReportMeasures 4510. Static role model 4500 may also include role Orbiter 4512 and Environment<<Asteroid>>4514 OrbitModeler 4516. Static role model 4600 may include mRIs OffSubsys 4602, TrimmingSails 4604 and SolarStormRisk 4606. Static role model 4600 may also include role SelfProtectSC 4608 and EnvironmentSpace 4610. These roles can be part of an object.

FIG. 45 and FIG. 46 are block diagrams of behavior of acquaintance organization view. The behavioral aspect of an organization can show the sequencing of mRIs in a particular role model. The role model may be represented by two equivalent models:

A plan of a role can separately represent the plan of each role in a role model, showing how the mRIs of the role sequence. The plan is represented using UML 2.0 ProtocolStateMachines. ProtocolStateMachines can be used to focus on a certain role, while ignoring others.

In FIGS. 45 and 46, a plan of a role model can represent the order of mRIs in a role model with a centralized description. The plan of the role model is herein represented using UML 2.0 StateMachines. StateMachines can be used to facilitate easy understanding of the whole behavior of a sub-organization.

Adding a new model to MaCMAS can represent the evolutions of the system. This new model can be called the evolution plan.

FIG. 46 is a block diagram of an evolution plan, according to an embodiment. The evolution plan can be represented by a UML state machine where each state can represent a product, and each transition can represent the addition or elimination of a set of features, in other words, Δ. In addition, the conditions in the transitions can represent the properties that must hold in the environment and in the system in order to evolve to the new product. In FIG. 46, the risk of a solar storm can also be measured.

FIGS. 47-51 are block diagrams of an evolution from one plan to another plan, according to an embodiment. Evolution from one plan to another plan can involve two general actions, composing role models and decomposing role models. FIGS. 47-51 depict the roles and plans of FIGS. 43-46.

The composition of role models may be used to map an acquaintance organization onto a set of agents; or in other words, a structural organization. The mapping may not always be orthogonal between all role models—applying two or more related features to a product may require integration of the related features. Composition of role model can be the process required to perform integration of the related features. In the case of having orthogonal features, and thus orthogonal role models, only the prescribed roles can be assigned to the corresponding agents.

When composing several role models that are not independent, artifacts such as emergent roles and mRIs, can appear in the composition that do not belong to any of the initial role models. Composed roles and mRIs, the roles and mRIs in the resultant models that represent several initial roles or mRIs as a single element, and unchanged roles and mRIs can be left unchanged and imported directly from the initial role models.

Once the role models to be used for the core architecture have been determined, the core architecture can be completed by composing role models. Composing role models may also be performed to obtain a certain product. Importing an mRI or a role may require only its addition to the composite role model. The following can show by way of example how to compose roles and plans.

In some embodiments, when several roles are merged in a composite role model, elements of the role can be merged as follows:

GOAL OF THE ROLE: The new goal of the role may abstract all the goals of the role to be composed. The goals of the role can be found in requirements hierarchical goal diagrams or the goals of the role can be added as the 'and' (conjunction) of the goals to be composed. In addition, the role goal for each mRI can be obtained from the goal of the initial roles for that mRI.

CARDINALITY OF THE ROLE: The cardinality of the role can be the same as in the initial role for the corresponding mRI.

INITIATOR(S) ROLE(S): If mRI composition is not performed, as in the instant case, initiators of the roles may not change.

INTERFACE OF A ROLE: All elements in the interfaces of roles to be merged can be added to the composite interface. Notice that there may be common services and knowledge in these interfaces. When common services and knowledge exists in the interfaces, the common services and knowledge can be included in the composite interface, or renamed, depending on the composition of the ontologies.

GUARD OF A ROLE/MRI: The new guards can be the 'and' (conjunction) of the corresponding guards in initial role models if roles composed participate in the same mRI. Otherwise, guards may remain unchanged.

Evolution from the product orbiting, that also has the feature measure storms, to the product protecting from solar storms, can require the addition of the feature to protect from a solar storm. This may be true for two reasons: first, the features orbiting and measure asteroid and measure storms may belong to the core architecture, and second, the protection from solar storms can happen in whichever moment, and the last-made measurements of the asteroid must, in some embodiments, be reported before powering-off subsystems. Thus, as these role models may not be orthogonal, a composition of the roles models can be performed. This composition, represented in FIG. 47, can be done following the rule prescribed above. As can be observed, all the mRIs and most roles can be imported. In addition, a composition of roles Self-ProtecSC and the rest in the role models Orbit and measure asteroids have been performed.

The composition of plans may include setting the order of execution of mRIs in the composite model and using the role model plan or role plans. One of several algorithms can be implemented to assist in this task, for example, extraction of a role plan from the role model plan and vice versa, and aggregation of several role plans.

Because of these algorithms, both plan views may be maintained as consistent without any prompting. Depending on the number of roles that have to be merged, the composition of the plan of the composite role model can be based on the plan of roles or on the plan of the role model. Several types of plan composition can be used for role plans and for role model plans, for example:

SEQUENTIAL: The plan can be executed atomically in sequence with others. The .nal state of each state machine can be superimposed with the initial state of the state machine that represents the plan that is to be executed, except the initial plan that maintains the initial state unchanged and the final plan that maintains the final state unchanged.

INTERLEAVING: To interleave several plans, a new state machine can be built where all mRIs in all plans can be taken into account. Notice that usually the order of execution of each plan to be composed can be preserved. Algorithms can be implemented to check behavior inheritance to ensure that this constraint can be preserved, since to ensure this property, the composed plan may inherit from all the initial plans The composition of role model plans can be performed following one of the plan composition techniques described previously. Later, if the plan of one of the composed roles, as it may be needed to assign the new plan to the composed roles, may be of interest, the plan can be extracted using the algorithms mentioned previously.

A composition of role plans can be performed following one of the techniques to compose plans described previously. Later, if there is interest in the plan of the composite role model, for example for testing, the plan can be obtained using the algorithms mentioned previously.

Figure 48:
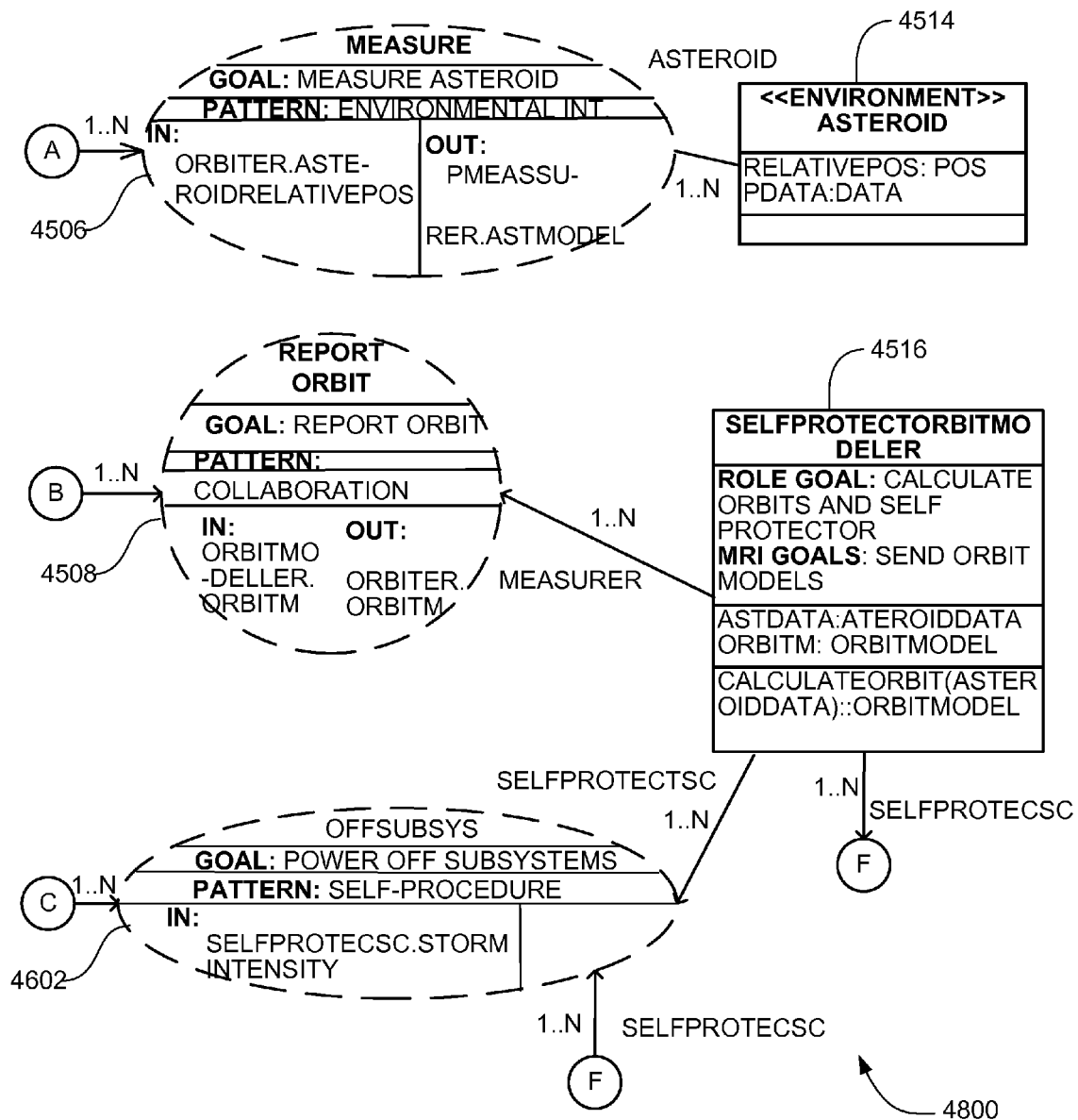
Figure 49:
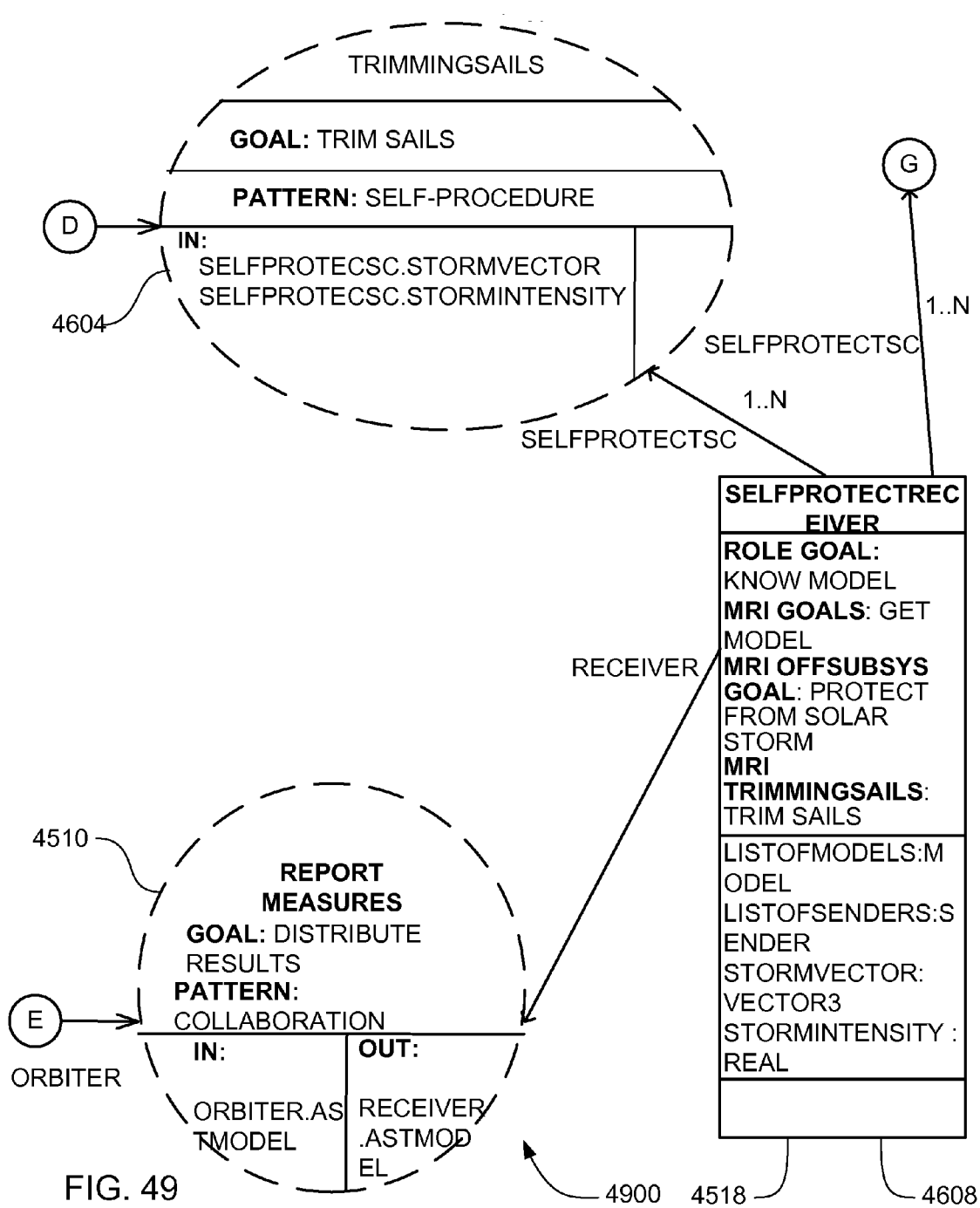

In FIG. 48, a composed plan is shown, according to an embodiment. The composed plan of FIG. 48 follows an interleaving composition in which the mRI report can measure before starting the protection from the solar storm. Notice that when finishing the solar storm, the system can evolve to the other product deleting the feature solar storm protection. Then, the plan of the feature orbiting and measure can start from its initial state, thus restarting the exploration of the asteroid.

Decomposing role models can be simpler than composition. When the role model to be eliminated is orthogonal to the rest, only the corresponding roles may be deleted from the agents that can be playing the roles. In the case where the role model is dependent with others, the elements of role models can be deleted and all the interactions that refer to the role models can be eliminated. Given that, in the software architecture described herein, the system can support the role concept and its changes at run-time, the above-mentioned changes can be made easily with a lower impact on the system.

However, features may appear whose role models involve a dependency. In these cases, some roles may have to be decomposed. These roles can be those whose mRIs belong to the scope of the role model(s) that may be eliminated. In these cases, the role can be decomposed into several roles in order to isolate the part of the role to be deleted.

In addition, the mRI(s) of the role model(s) can be eliminated from the role model plan or the role plans. This may be done starting from the plan of the initial dependent role models. Each separate role model usually can maintain the order of execution of mRIs determined in the initial model, but executes only a subset of mRIs of the initial role models. The behavior of the role model to be deleted can be extracted automatically. This algorithm may allow the extraction of the plan of remaining role models from the initial ones constraining this to the set of mRIs that remains in the model.

Figure 50:
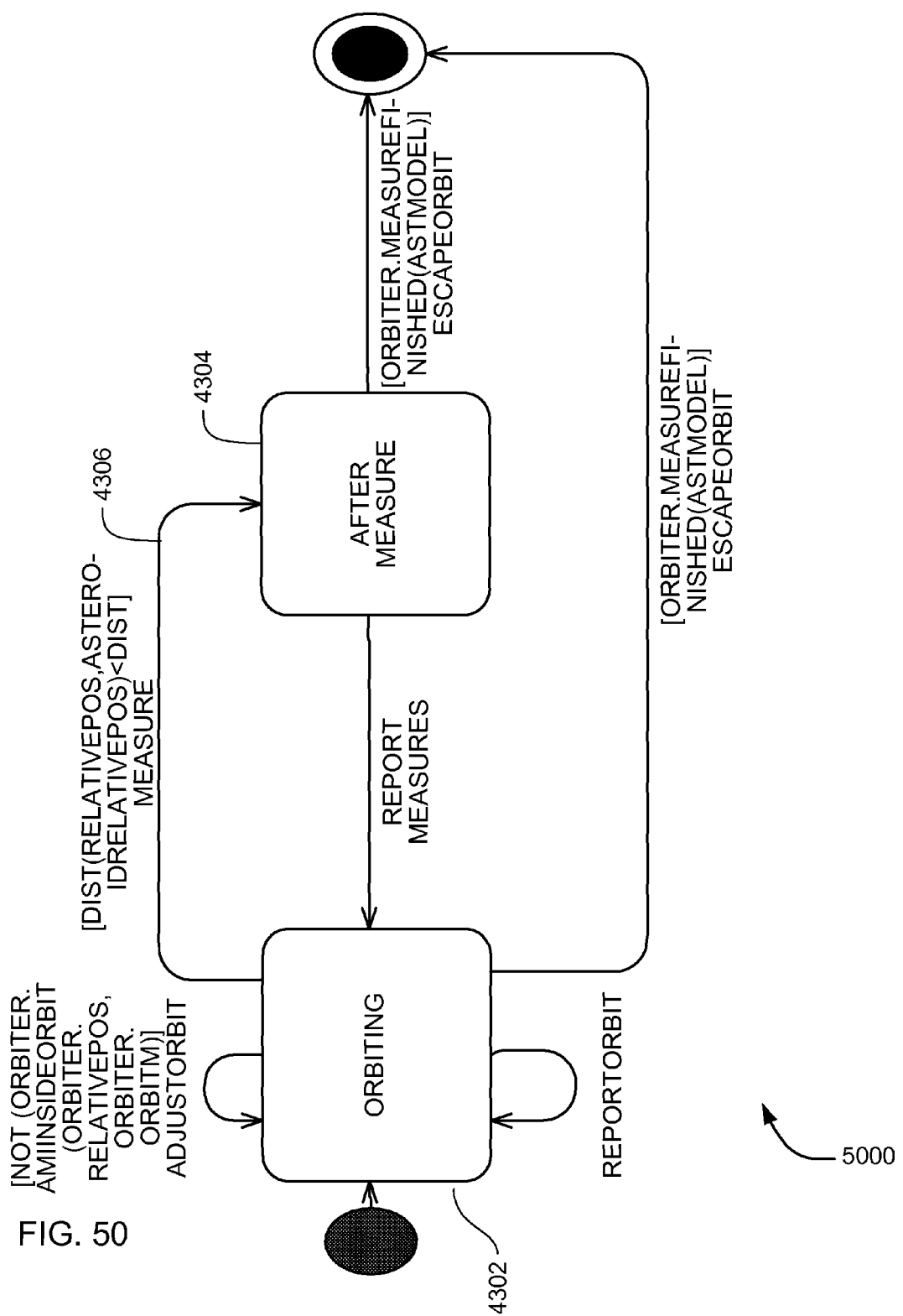
Figure 51:
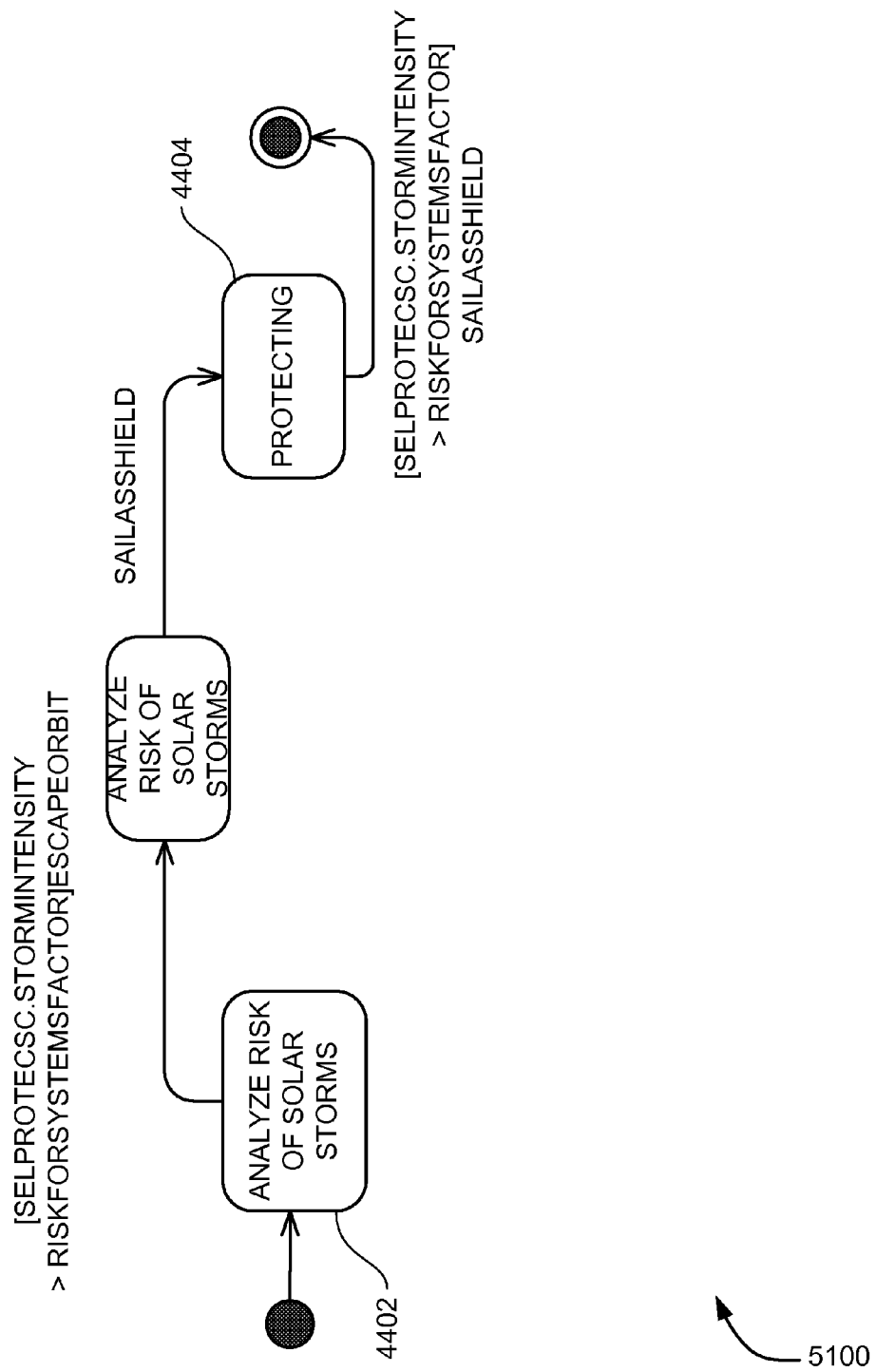

In FIGS. 50-51, the following circumstances can be involved: Several spacecraft have collided with an asteroid as a result of self-protection from a solar storm. As a result, protection from solar storms can be disabled while orbiting. If a spacecraft is orbiting and measuring an asteroid and the spacecraft determines a risk of a solar storm, the spacecraft may first escape the orbit and later power down subsystems and use the sail of the spacecraft as a shield. The policy can be limited to two role models to simplify, but in other circumstances, other autonomic properties and associated role model involved in orbiting an asteroid can be accounted.

The first part of the policy shows the context where the policy can be applied, determining the role models that should be taken into account. Note that although the second element denotes an interaction, the traceability diagram indicates the role model that the second element belongs to, namely ProtectfromSolar Storms, the second part shows a modification of the plans where a new order for the interaction can be specified.

Figure 47:
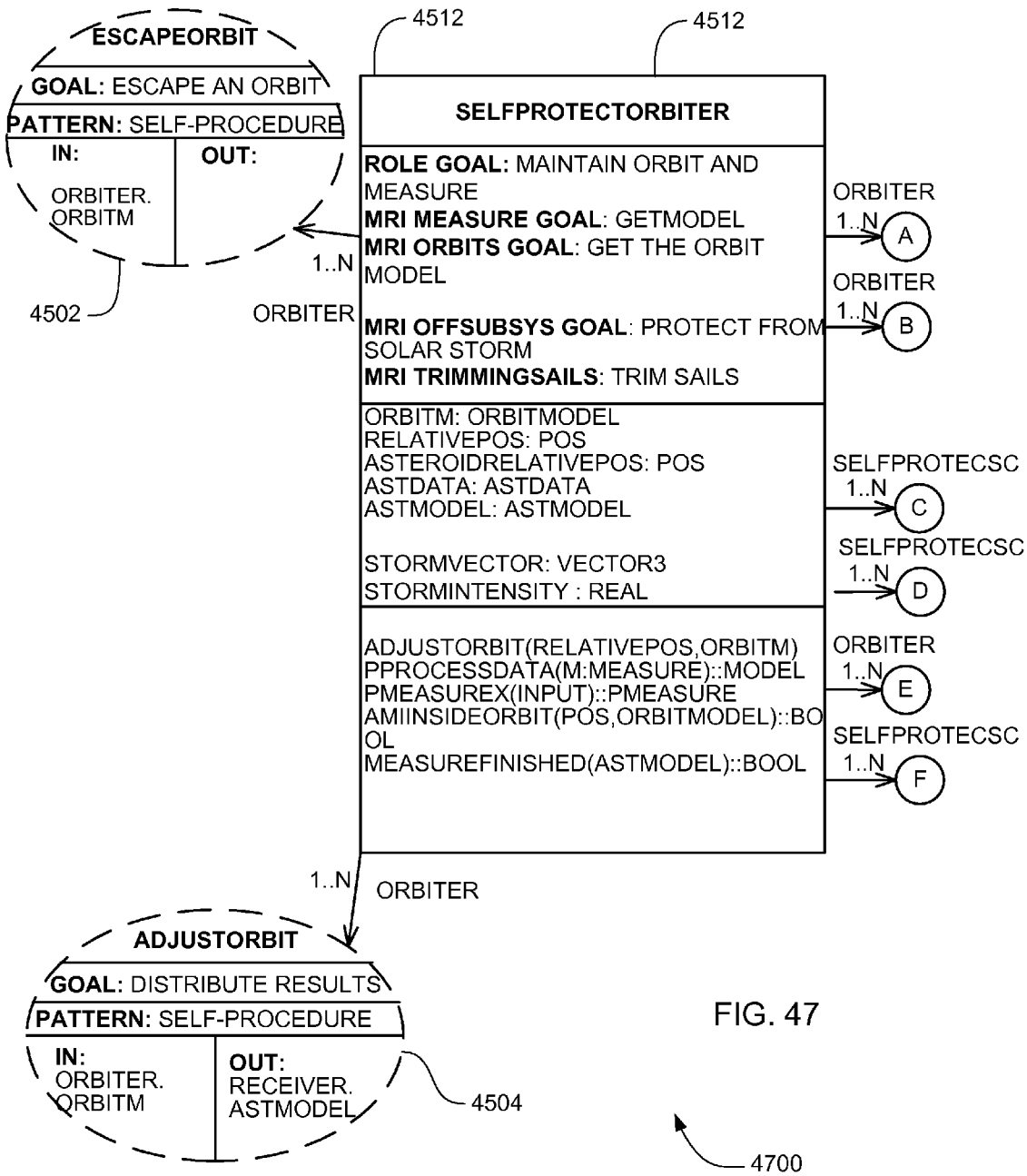
FIGS. 47-51 are block diagrams of an evolution from one plan to another plan, according to embodiments.

As a result, both models and plans can be composed following the constraints imposed by the policy. The composition of both role models is shown in FIG. 47. The roles Orbiter and SelfPotectSC are shown to have been composed into a single role called SelfProtectingOrbiter. The remainder of roles are shown to have been left unchanged and all mRIs have also been added without changes.

In addition, as the self protection is taken into account during the whole process orbiting and measuring, and not in a concrete state, we can perform a parallel composition, as it is shown in FIGS. 50-51. The policy indicates the order of mRIs for selfprotection, adding the Escape Orbit mRI before protection, which results in the new state machine shown.

CONCLUSION

In autonomic computing, self-managed systems based on high level guidance from humans, has been gaining ground as a significant new paradigm to facilitate the creation of self-managing systems to deal with the ever increasing complexity and costs inherent in today's (and tomorrow's) systems. Policies and policy based management can be a key enabling technology for achieving autonomicity. Described herein are systems, method and apparatus that produce fully (mathematically) tractable development of agent-oriented specification(s) modeled with methodology fragment for analyzing complex multiagent systems (MACMAS) and policies for autonomic systems from requirements through to code generation. The systems, method and apparatus described herein are illustrated through an example showing how user formulated policies can be translated into a formal mode which can then be converted to code. The requirements-based programming systems, method and apparatus described herein provide faster, higher quality development and maintenance of autonomic systems based on user formulation of policies.

The systems, method and apparatus described herein can provide a way of analyzing agent-oriented specification(s) modeled with MaCMAS for autonomic systems and facilitate the generation of provably correct implementations automatically, which in turn can provide reduced development time, reduced testing requirements, guarantees of correctness of the implementation with respect to the policies specified at the outset, and can provide a higher degree of confidence that the policies can be both complete and reasonable. The ability to specify the policy for the management of a system and then automatically generate an equivalent implementation can greatly improve the quality of software, the survivability of future missions, in particular when the system operates untended in very remote environments, and greatly reduce development lead times and costs.

A system and method for generating scripts from requirements expressed as policies, is described according to an embodiment. In some embodiments, the system and method also provide for "reverse engineering," analysis, and correction of errors found in existing implementations. In some embodiments, the method provides multiple existing implementations to be combined, discrepancies resolved and re-generated as a single implementation in which confidence can be placed in a correct implementation of the state requirements (which can be "captured" from the existing implementation). Although specific embodiments have been illustrated and described herein, those of ordinary skill in the art will appreciate that any arrangement which is calculated to achieve the same purpose can be substituted for the specific embodiments shown. The systems, method and apparatus described herein are intended to cover any adaptations or variations. For example, although described in procedural terms, one of ordinary skill in the art will appreciate that implementations can be made in an object-oriented design environment or any other design environment that provides the required relationships.

Existing agent-oriented specification(s) modeled with MaCMAS 102 can be combined, analyzed, and regenerated as a single agent-oriented specification modeled with MaCMAS in the same language, or another language, that increases accuracy and reduces common errors.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all object-oriented, database and communication environments and alternate technologies which provide the same functionality as described herein.

We claim:

1. A tangible computer-accessible medium having executable instructions to generate a system, the executable instructions capable of directing a processor to perform: receiving at least one agent-oriented specification modeled with MaCMAS; and translating the at least one agent-oriented specification modeled with MaCMAS of the system to an implementation.

2. The computer-accessible medium of claim 1, wherein the executable instructions capable of directing the processor to perform translating the at least one agent-oriented specification modeled with MaCMAS of the system to the implementation further comprises:
   translating the at least one agent-oriented specification modeled with MaCMAS of the system to the implementation, without the use of an automated inference engine.

3. The computer-accessible medium of claim 1, wherein the executable instructions capable of directing the processor to perform translating the at least one agent-oriented specification modeled with MaCMAS of the system to the implementation further comprises:
   translating the at least one agent-oriented specification modeled with MaCMAS of the system to the implementation, in reference to an inference engine.

4. The computer-accessible medium of claim 1, the medium further comprising executable instructions capable of directing the processor to perform:
   analyzing the agent-oriented specification modeled with MaCMAS.

5. The computer-accessible medium of claim 4, wherein the executable instructions capable of directing the processor to perform analyzing the agent-oriented specification modeled with MaCMAS further comprises:
   applying mathematical logic to the agent-oriented specification modeled with MaCMAS in order to identify a presence or absence of mathematical properties of the agent-oriented specification modeled with MaCMAS.

6. The computer-accessible medium of claim 5, the medium further comprising executable instructions capable of directing the processor to perform:
   correcting the absence of the mathematical properties in the agent-oriented specification modeled with MaCMAS if the mathematical properties are identified as absent in the agent-oriented specification modeled with MaCMAS.

7. The computer-accessible medium of claim 5, wherein the mathematical properties of the agent-oriented specification modeled with MaCMAS further comprise:
   whether the agent-oriented specification modeled with MaCMAS implies a system execution trace that includes a deadlock condition;
   whether the agent-oriented specification modeled with MaCMAS implies a system execution trace that includes a livelock condition; and
   whether the agent-oriented specification modeled with MaCMAS implies a system execution trace that exhibits or does not exhibit a plurality of other behaviors.

8. The computer-accessible medium of claim 1, wherein the implementation further comprises:
   a script encoded in PERL language.

9. The computer-accessible medium of claim 1, wherein the implementation further comprises:
   a script encoded in BIOPERL language.

10. The computer-accessible medium of claim 1, wherein the implementation further comprises:
    a script encoded in PYTHON language.

11. The computer-accessible medium of claim 1, wherein the implementation further comprises:
a script encoded in awk language.

12. A tangible computer-accessible medium having executable instructions to generate a system from at least one agent-oriented specification modeled with MaCMAS, the executable instructions capable of directing a processor to perform: translating the at least one agent-oriented specification modeled with MaCMAS to a formal specification; and translating the formal specification to scripts implementing the system.

13. The computer-accessible medium of claim 12, wherein the executable instructions capable of directing the processor to perform translating the at least one agent-oriented specification modeled with MaCMAS to the formal specification further comprise:
verifying the syntax of the at least one agent-oriented specification modeled with MaCMAS; and
mapping the at least one agent-oriented specification modeled with MaCMAS to a plurality of agent-oriented specification segments modeled with MaCMAS.

14. The computer-accessible medium of claim 12, wherein the executable instructions capable of directing the processor to perform translating at least one agent-oriented specification modeled with MaCMAS to the formal specification further comprise:
verifying consistency of the formal specification.

15. The computer-accessible medium of claim 12, the medium further comprising executable instructions capable of directing the processor to perform:
analyzing the agent-oriented specification modeled with MaCMAS.

16. The computer-accessible medium of claim 12, the medium further comprising executable instructions capable of directing the processor to perform:
determining mathematical and logical properties of the agent-oriented specification modeled with MaCMAS by an automated inference engine.

17. The computer-accessible medium of claim 12, wherein the executable instructions capable of directing the processor to perform translating each of a plurality of at least one agent-oriented specification modeled with MaCMAS further comprises:
translating the at least one agent-oriented specification modeled with MaCMAS to a separate formal specification without the use of an automated inference engine.

18. The computer-accessible medium of claim 12, wherein the script further comprises:
a script encoded in PERL language.

19. The computer-accessible medium of claim 12, wherein the script further comprises:
a script encoded in awk language.

20. The computer-accessible medium of claim 12, wherein the script further comprises:
a script encoded in PYTHON language.

21. A system including a processor and a memory storing software to validate a software system, the system comprising: an inference engine; a translator, operable to receive at least one agent-oriented specification modeled with MaCMAS of the software system and to generate in reference to the inference engine an implementation; and an analyzer operable to perform model verification/checking and determine existence of omissions, deadlock, livelock, and race conditions or other problems and inconsistencies in the agent-oriented specification modeled with MaCMAS.

22. The system of claim 21, wherein the translation of the at least one agent-oriented specification modeled with MaCMAS into an implementation is carried out without human intervention.

23. A computer-accessible medium having executable instructions to validate a system, the executable instructions capable of directing a processor to perform:
translating a plurality of policies to a plurality of agent-oriented specifications modeled with MaCMAS;
combining the plurality of agent-oriented specifications modeled with MaCMAS to a singular agent-oriented specification modeled with MaCMAS;
analyzing the singular agent-oriented specification modeled with MaCMAS;
correcting absence of the mathematical properties in the singular agent-oriented specification modeled with MaCMAS; and
translating the corrected agent-oriented specification modeled with MaCMAS to a policy.

24. The computer-accessible medium of claim 23, wherein the executable instructions capable of directing the processor to perform analyzing the singular agent-oriented specification modeled with MaCMAS further comprise:
applying mathematical logic to the singular agent-oriented specification modeled with MaCMAS in order to identify a presence or absence of mathematical properties of the singular agent-oriented specification modeled with MaCMAS.

25. The computer-accessible medium of claim 24, wherein the mathematical properties of the singular agent-oriented specification modeled with MaCMAS further comprise:
whether the singular agent-oriented specification modeled with MaCMAS implies a system execution trace that includes a deadlock condition;
whether the singular agent-oriented specification modeled with MaCMAS implies a system execution trace that includes a livelock condition; and
whether the singular agent-oriented specification modeled with MaCMAS implies a system execution trace that exhibits or does not exhibit a plurality of other behaviors.

26. A method of generating an executable system from an informal specification, the method comprising:
translating an informal specification into process-based specification segments;
aggregating the process-based specification segments into a single process-based specification;
translating the single process-based specification into high level computer language instructions; and
compiling the high level language instructions into an executable system.

27. The method of claim 26, wherein translating informal specifications into process-based specification segments further comprises:
verifying the syntax of a set of scenarios;
mapping the set of scenarios to a process-based specification;
verifying the consistency of the process-based specification; and
verifying a lack of other problems in the process-based specification.

* * * * *

UNITED STATES PATENT AND TRADEMARK OFFICE
CERTIFICATE OF CORRECTION

| | | |
|---|---|---|
| PATENT NO. | : 7,992,134 B2 | Page 1 of 1 |
| APPLICATION NO. | : 11/536969 | |
| DATED | : August 2, 2011 | |
| INVENTOR(S) | : Michael G. Hinchey et al. | |

It is certified that error appears in the above-identified patent and that said Letters Patent is hereby corrected as shown below:

Title Page item 75

PLEASE CORRECT THE SECOND NAMED INVENTOR ON THE ABOVE ISSUED PATENT FROM "JOAQUIN PENN" TO "JOAQUIN PEÑA." THE OTHER INVENTOR'S NAMES SHALL REMAIN THE SAME.

Signed and Sealed this

Twentieth Day of September, 2011

David J. Kappos
*Director of the United States Patent and Trademark Office*